(12) United States Patent
Kosaka et al.

(10) Patent No.: US 11,577,800 B2
(45) Date of Patent: Feb. 14, 2023

(54) OPERATING DEVICE

(71) Applicant: Shimano Inc., Osaka (JP)

(72) Inventors: Kentaro Kosaka, Osaka (JP);
Yasuyuki Komada, Osaka (JP);
Yuichiro Hidaka, Osaka (JP)

(73) Assignee: Shimano Inc., Osaka (JP)

( * ) Notice: Subject to any disclaimer, the term of this patent is extended or adjusted under 35 U.S.C. 154(b) by 269 days.

(21) Appl. No.: 17/106,537

(22) Filed: Nov. 30, 2020

(65) Prior Publication Data
US 2022/0169338 A1   Jun. 2, 2022

(51) Int. Cl.
| | |
|---|---|
| B62L 3/02 | (2006.01) |
| B62K 23/02 | (2006.01) |
| B62M 25/02 | (2006.01) |
| B62M 25/08 | (2006.01) |
| B62K 23/06 | (2006.01) |
| B62K 19/36 | (2006.01) |

(52) U.S. Cl.
CPC ............... *B62L 3/02* (2013.01); *B62M 25/08* (2013.01); *B62K 19/36* (2013.01); *B62K 23/06* (2013.01)

(58) Field of Classification Search
CPC ........ B62K 19/36; B62K 23/02; B62K 23/06; B62M 25/04; B62M 25/08; B62L 3/02; B60T 7/102
See application file for complete search history.

(56) References Cited

U.S. PATENT DOCUMENTS

| | | | |
|---|---|---|---|
| 8,955,863 B2 | 2/2015 | Kosaka et al. | |
| 9,056,651 B2* | 6/2015 | Tetsuka | B62K 23/00 |
| 9,145,183 B2 | 9/2015 | Kosaka et al. | |
| 9,394,031 B2 | 7/2016 | Oku et al. | |
| 10,370,056 B2 | 8/2019 | Komatsu et al. | |
| 10,889,348 B2* | 1/2021 | Miyazaki | B62L 3/02 |
| 2006/0162479 A1 | 7/2006 | Irie | |
| 2007/0034037 A1 | 2/2007 | Dal Pra et al. | |
| 2021/0371035 A1* | 12/2021 | Kosaka | B62L 3/023 |
| 2021/0371044 A1* | 12/2021 | Kosaka | B62K 23/06 |
| 2022/0172912 A1* | 6/2022 | Kosaka | B62J 45/00 |

FOREIGN PATENT DOCUMENTS

| | | | | |
|---|---|---|---|---|
| DE | 102020131635 A1 * | 6/2022 | | |
| TW | 202227313 A * | 7/2022 | | B62J 45/00 |

* cited by examiner

*Primary Examiner* — Adam D Rogers
(74) *Attorney, Agent, or Firm* — Global IP Counselors, LLP

(57) ABSTRACT

An operating device is provided for a human-powered vehicle. The operating device basically includes a base, a first operating member, a first electric switch, a first load generator and an operating load adjuster. The first operating member is movably arranged with respect to the base. The first electric switch is provided to the base and arranged to be activated by movement of the first operating member. The first load generator is configured to generate an operating load applied to the first operating member. The operating load adjuster is configured to adjust a transition of the operating load from a first load transition to a second load transition different from the first load transition.

23 Claims, 26 Drawing Sheets

OPERATING DEVICE

BACKGROUND

Technical Field

This disclosure generally relates to an operating device. More specifically, the present disclosure relates to an operating device for controlling a component of a human-powered vehicle.

Background Information

Human-powered vehicles such as bicycles, motorcycles, all-terrain vehicles (ATVs), personal watercrafts and snowmobiles are typically provided with one or more operating devices for controlling one or more components. These controlling devices include a user operating member that operates one or more the other components. Thus, the operating device is usually provided in a convenient place (e.g., on a bicycle handlebar) for a user to operate the operating device. In more recent years, some operating devices are provided with one or more switches that are activated by moving the operating member which in turn sends a control signal to operate a component. The switch or switches can send control signals either wirelessly or via an electrical wire. One example of an operating device for a human-powered vehicle (e.g., bicycle) is disclosed in in U.S. Pat. No. 9,145,183.

SUMMARY

Generally, the present disclosure is directed to various features of an operating device for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, a recumbent bike, and an electric assist bicycle (E-bike).

In view of the state of the known technology and in accordance with a first aspect of the present disclosure, an operating device is provided for a human-powered vehicle. The operating device basically comprises a base, a first operating member, a first electric switch, a first load generator and an operating load adjuster. The first operating member is movably arranged with respect to the base. The first electric switch is provided to the base and arranged to be activated by movement of the first operating member. The first load generator is configured to generate an operating load applied to the first operating member. The operating load adjuster is configured to adjust a transition of the operating load from a first load transition to a second load transition different from the first load transition.

With the operating device according to the first aspect, it is possible for a user to adjust an operating load of the first operating member according to riding conditions.

In accordance with a second aspect of the present disclosure, the operating device according to the first aspect is configured so that the operating load adjuster includes a first cam part that contacts the first load generator and an operating part that protrudes outwardly relative to the first cam part.

With the operating device according to the second aspect, it is possible for a user to adjust the operating load of the first operating member without using tools.

In accordance with a third aspect of the present disclosure, the operating device according to the second aspect is configured so that the first cam part is pivotally arranged with respect to the base about a pivot axis between a first orientation that establishes the first load transition and a second orientation that establishes the second load transition.

With the operating device according to the third aspect, it is possible to adjust the operating load of the first operating member with relatively few additional parts.

In accordance with a fourth aspect of the present disclosure, the operating device according to the third aspect is configured so that the first cam part includes a first contact surface and a second contact surface. The first contact surface contacts the first load generator where the first cam part is in the first orientation. The second contact surface contacts the first load generator where the first cam part is in the second orientation, and the first contact surface is closer to the pivot axis than the second contact surface.

With the operating device according to the fourth aspect, it is possible to reliably maintain the selected operating load of the first operating member.

In accordance with a fifth aspect of the present disclosure, the operating device according to the fourth aspect is configured so that each of the first contact surface and the second contact surface includes a flat contact surfaces that selectively contacts the first load generator.

With the operating device according to the fifth aspect, it is possible to more reliably maintain the selected operating load of the first operating member.

In accordance with a sixth aspect of the present disclosure, the operating device according to any one of the first to fifth aspects is configured so that the first load generator is provided without applying a biasing force to the first operating member until after the first operating member is operated.

With the operating device according to the sixth aspect, it is possible to easily adjust the operating load of the first operating member.

In accordance with a seventh aspect of the present disclosure, the operating device according to any one of the first to sixth aspects further comprises a first biasing member arranged to bias the first operating member towards a non-operated position.

With the operating device according to the seventh aspect, the first operating member is configured to automatically return to its non-operated position after being operated.

In accordance with an eighth aspect of the present disclosure, the operating device according to any one of the first to seventh aspects further comprises a first clicker movably operatively disposed between the first operating member and the first electric switch and being moved to activate the first electric switch by movement of the first operating member.

With the operating device according to the eighth aspect, it is possible to provide a relatively compact and simple structure for activating the first electric switch by movement of the first operating member.

In accordance with a ninth aspect of the present disclosure, the operating device according to the eighth aspect is configured so that the first clicker is pivotally mounted relative to the base about a pivot axle. The first load generator includes a first torsion spring biasing the first clicker away from the first electric switch. The first torsion spring has a coiled portion disposed around the pivot axle, a first leg portion contacting the operating load adjuster and a second leg portion contacting the first clicker.

With the operating device according to the ninth aspect, it is possible to provide a simple structure for the first load generator.

In accordance with a tenth aspect of the present disclosure, the operating device according to the ninth aspect is configured so that the first clicker includes a first recess, and the coiled portion of the first torsion spring is disposed in the first recess of the first clicker.

With the operating device according to the tenth aspect, it is possible to provide a relatively compact structure for the first load generator.

In accordance with an eleventh aspect of the present disclosure, the operating device according to any one of the first to tenth aspects further comprises a second operating member, a second electric switch and a second load generator. The second operating member is movably arranged with respect to the base. The second electric switch is provided to the base and arranged to be activated by movement of the second operating member. The second load generator is configured to generate an operating load applied to the second operating member. The operating load adjuster is configured to adjust a transition of the operating load applied to the second operating member from a third load transition to a fourth load transition different from the third load transition.

With the operating device according to the eleventh aspect, the versatility of the operating device increases by providing the second operating member in which a user can adjust an operating load of the second operating member according to riding conditions.

In accordance with a twelfth aspect of the present disclosure, the operating device according to the eleventh aspect is configured so that the operating load adjuster includes a first cam part, a second cam part and an operating part. The first cam part contacts the first load generator. The second cam part contacts the second load generator. The operating part protrudes outwardly relative to the first cam part and the second cam part.

With the operating device according to the twelfth aspect, it is possible for a user to adjust the operating loads of the first operating member and the second operating member without using tools.

In accordance with a thirteenth aspect of the present disclosure, the operating device according to the twelfth aspect is configured so that the first cam part and the second cam part are pivotally arranged with respect to the base about a pivot axis between a first orientation and a second orientation. The first cam part establishes the first load transition, and the second cam part establishes the third load transition where the first cam part and the second cam part are in the first orientation. The first cam part establishes the second load transition, and the second cam part establishes the fourth load transition where the first cam part and the second cam part are in the second orientation.

With the operating device according to the thirteenth aspect, it is possible to adjust the operating loads of the first operating member and the second operating member with relatively few additional parts.

In accordance with a fourteenth aspect of the present disclosure, the operating device according to the thirteenth aspect is configured so that the first cam part includes a first contact surface that contacts the first load generator where the first cam part is in the first orientation and a second contact surface that contacts the first load generator where the first cam part is in the second orientation. The second cam part includes a third contact surface that contacts the second load generator where the second cam part is in the first orientation and a fourth contact surface that contacts the second load generator where the second cam part is in the second orientation. The first contact surface is closer to the pivot axis than the second contact surface. The third contact surface is closer to the pivot axis than the fourth contact surface.

With the operating device according to the fourteenth aspect, it is possible to reliably maintain the selected operating loads of the first operating member and the second operating member.

In accordance with a fifteenth aspect of the present disclosure, the operating device according to the fourteenth aspect is configured so that each of the first contact surface and the second contact surface includes a flat contact surfaces that selectively contacts the first load generator. Each of the third contact surface and the fourth contact surface includes a flat contact surfaces that selectively contacts the second load generator.

With the operating device according to the fifteenth aspect, it is possible to more reliably maintain the selected operating loads of the first operating member and the second operating member.

In accordance with a sixteenth aspect of the present disclosure, the operating device according to any one of the eleventh to fifteenth aspects is configured so that the first load generator is provided without applying a biasing force to the first operating member until after the first operating member is operated. The second load generator is provided without applying a biasing force to the second operating member until after the second operating member is operated.

With the operating device according to the sixteenth aspect, it is possible to easily adjust the operating loads of the first operating member and the second operating member.

In accordance with a seventeenth aspect of the present disclosure, the operating device according to any one of the eleventh to sixteenth aspects further comprises a first biasing member and a second biasing member. The first biasing member is arranged to bias the first operating member towards a non-operated position. The second biasing member is arranged to bias the second operating member towards a non-operated position.

With the operating device according to the seventeenth aspect, the first operating member and the second operating member are configured to automatically return to their non-operated positions after being operated.

In accordance with an eighteenth aspect of the present disclosure, the operating device according to any one of the eleventh to seventeenth aspects further comprises a first clicker and a second clicker. The first clicker is movably operatively disposed between the first operating member and the first electric switch and is moved to activate the first electric switch by movement of the first operating member. The second clicker is movably operatively disposed between the second operating member and the second electric switch and is moved to activate the second electric switch by movement of the second operating member.

With the operating device according to the eighteenth aspect, it is possible to provide a relatively compact and simple structure for activating the first electric switch by movement of the first operating member and for activating the second electric switch by movement of the second operating member.

In accordance with a nineteenth aspect of the present disclosure, the operating device according to the eighteenth aspect is configured so that the first clicker and the second clicker are pivotally mounted relative to the base about a pivot axle. The first load generator includes a first torsion spring biasing the first clicker away from the first electric switch. The first torsion spring has a coiled portion disposed around the pivot axle, a first leg portion contacting the operating load adjuster and a second leg portion contacting the first clicker. The second load generator includes a second torsion spring biasing the second clicker away from the second electric switch. The second torsion spring has a coiled portion disposed around the pivot axle, a first leg portion contacting the operating load adjuster and a second leg portion contacting the second clicker.

With the operating device according to the nineteenth aspect, it is possible to provide simple structures for the first load generator and the second load generator.

In accordance with a twentieth aspect of the present disclosure, the operating device according to the nineteenth aspect is configured so that the operating load adjuster is disposed between the first torsion spring and the second torsion spring.

With the operating device according to the twentieth aspect, it is possible to locate the operating load adjuster for easily adjusting the first load generator and the second load generator.

In accordance with a twenty-first aspect of the present disclosure, the operating device according to the nineteenth or twentieth aspect is configured so that the first clicker includes a first recess. The coiled portion of the first torsion spring is disposed in the first recess of the first clicker. The second clicker includes a second recess. The coiled portion of the second torsion spring is disposed in the second recess of the second clicker.

With the operating device according to the twenty-first aspect, it is possible to provide relatively compact structures for the first load generator and the second load generator.

In accordance with a twenty-second aspect of the present disclosure, the operating device any one of the eleventh to twenty-first aspects is configured so that the first load generator includes a first torsion spring. The second load generator includes a second torsion spring. Each of the first torsion spring and the second torsion spring has a coiled portion supported on a pivot axle coupled to the base.

With the operating device according to the twenty-second aspect, it is possible to simplify the arrangement of the first load generator and the second load generator by mounting the first torsion spring and the second torsion spring using a single pivot axle.

In accordance with a twenty-third aspect of the present disclosure, the operating device according to any one of the eleventh to twenty-second aspects is configured so that the first operating member includes a first operating lever. The second operating member includes a second operating lever. The first operating lever and the second operating lever are pivotally and coaxially mounted to the base.

With the operating device according to the twenty-third aspect, it is possible for a user to easily operate the first operating member and the second operating member and provide a relatively compact and simple operating device by coaxially mounting the first operating member and the second operating member to the base.

Also, other objects, features, aspects and advantages of the disclosed operating device will become apparent to those skilled in the art from the following detailed description, which, taken in conjunction with the annexed drawings, discloses preferred embodiments of the operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
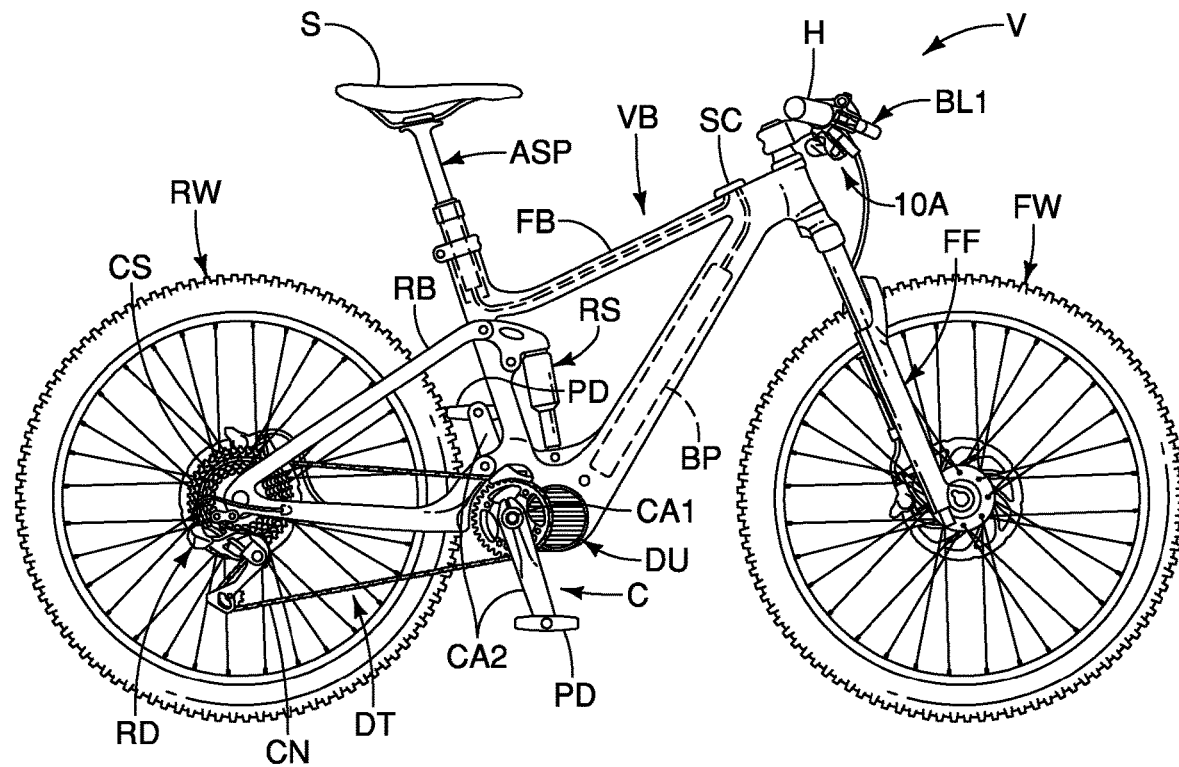
FIG. 1 is a side elevational view of a human-powered vehicle including a control system having a pair of operating devices for operating a plurality of vehicle components in accordance with one illustrated embodiment.

Referring initially to FIG. 1, an operating device 10A is provided for a human-powered vehicle V in accordance with one illustrated embodiment. Here, in the illustrated embodiment, the operating device 10A is an electric operating device that is provided to the human-powered vehicle V for operating at least two vehicle components in response to user inputs. Here, the human-powered vehicle V is an electric assist bicycle (E-bike). Alternatively, the human-powered vehicle V can be a road bicycle, a city bike, a cargo bike, and a recumbent bike, or another type of off-road bicycle such as a cyclocross bicycle. The number of wheels on the human-powered vehicle V is not limited. The human-powered vehicle V includes, for example, a monocycle and a vehicle having three or more wheels. Here, the human-powered vehicle V is a bicycle that at least partially uses human power as a driving power for traveling and includes an electric drive unit assisting the human power. In particular, a vehicle using solely an internal combustion engine as driving power is not included in the human-powered vehicle of this disclosure.

As seen in FIG. 1, the human-powered vehicle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column or steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The human-powered vehicle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CA1. A pedal PD is rotatably coupled to the distal end of each of the crank arms CA2. The drivetrain DT can be selected from any type, and can be a belt-drive type or a shaft-drive type. Here, the human-powered vehicle V further includes a rear derailleur RD that is attached to the rear frame body RB for shifting the chain CN between the rear sprockets CS. The rear derailleur RD is one type of gear changing device. Here, the rear derailleur RD is an electric derailleur.

The electric drive unit DU has an electric motor that provides a drive assist force to the front sprocket FS. The electric drive unit DU can be actuated to assist in the propulsion of the human-powered vehicle V in a conventional manner. The electric drive unit DU is actuated, for example, in accordance with a human driving force applied to the pedals PD. The electric drive unit DU is actuated by electric power supplied from a main battery pack BP that is mounted on a downtube of the human-powered vehicle V. The main battery pack BP can provide electrical power to other vehicle components such as the rear derailleur RD, the height adjustable seatpost ASP, the rear shock absorber RS, the front fork FF and any other vehicle component that uses electrical power.

The human-powered vehicle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the human-powered vehicle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the human-powered vehicle V. The cycle computer SC will be discussed in more detail later.

Figure 2:
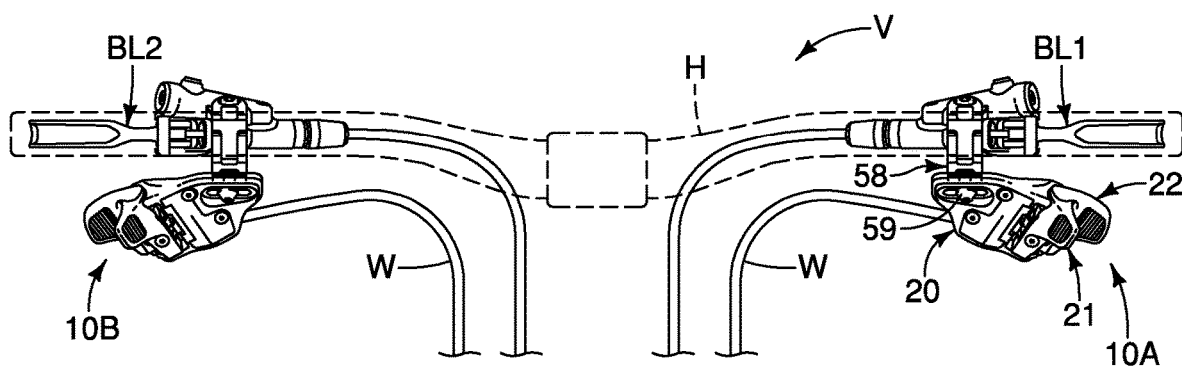
FIG. 2 is a rear elevational view of a portion of a handlebar of the human-powered vehicle illustrated in FIG. 1 that includes the operating devices.

Referring now to FIG. 2, the human-powered vehicle V further includes an operating device 10B. The operating devices 10A and 10B are electric operating devices that are mounted to the handlebar H of the human-powered vehicle V. Since the operating devices 10A and 10B are used by a rider to operate one or more components of the human-powered vehicle V, each of the operating devices 10A and 10B can also be referred to as a user operable input device. Basically, as seen in FIG. 2, the operating device 10A is a right hand side operating device that is operated by the rider's right hand, while the operating device 10B is a left hand side operating device that is operated by the rider's left hand. The operating devices 10A and 10B can be mounted to the human-powered vehicle V in a variety of ways. Here, for example, the operating device 10A is mounted to the handlebar H via a brake operating device BL1, and the operating device 10B is mounted to the handlebar H via a brake operating device BL2. However, the operating devices 10A and 10B can each be provided with a dedicated handlebar clamp or other mounting structure for mounting to the handlebar H. Each of the operating devices 10A and 10B is connected directly or indirectly to an electric vehicle component by an electrical wire W.

In the illustrated embodiment, the operating devices 10A and 10B are identical in construction, except that they are mirror images of each other. The basic programming of the operating devices 10A and 10B is the same. However, the user or rider can set up the operating devices 10A and 10B for controlling different vehicle components and/or controlling the same vehicle component differently. Thus, the descriptions of the operating device 10A apply to the operating device 10B, and for the sake of simplicity, the operating device 10B will not be described in further detail herein.

Figure 3:
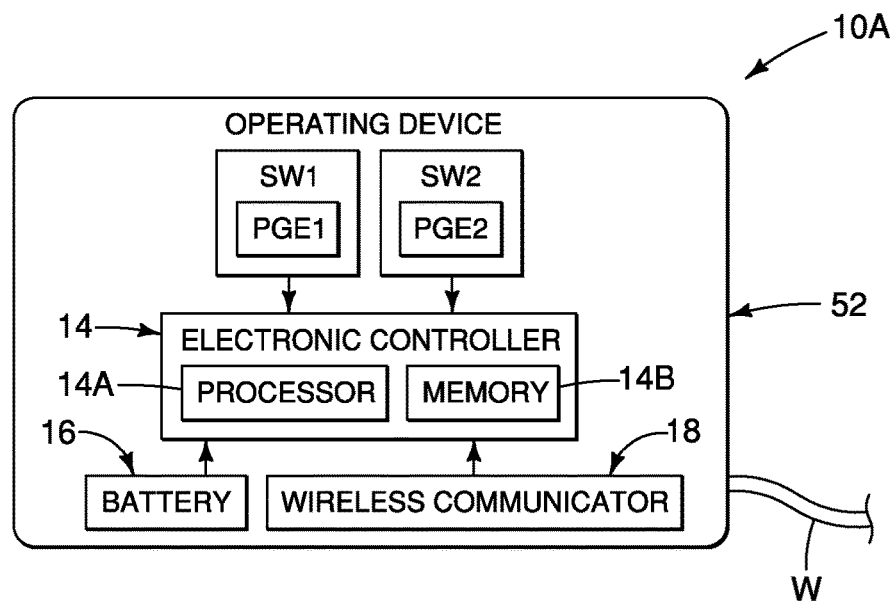
FIG. 3 is an electrical block diagram of one of the operating devices of the human-powered vehicle illustrated in FIG. 1.

As seen in FIG. 3, the operating devices 10A further comprises an electronic controller 14. Here, the electronic controller 14 is formed of one or more semiconductor chips that are mounted on a circuit board. The term "electronic controller" as used herein refers to hardware that executes a software program, and does not include a human. In any case, the electronic controller 14 is preferably a microcomputer that includes at least one processor 14A (i.e., a central processing unit) and at least one memory 14B (i.e., a computer storage device). The processor 14A can be one or more integrated circuits having firmware for causing the circuitry to complete the activities described herein. The memory 14B is any computer storage device or any non-transitory computer-readable medium with the sole exception of a transitory, propagating signal. For example, the memory 14B can include nonvolatile memory and volatile memory, and can includes a ROM (Read Only Memory) device, a RAM (Random Access Memory) device, a hard disk, a flash drive, etc.

Here, each of the operating devices 10A and 10B includes an electronic controller. However, the electronic controller 14 can be located remotely from the operating devices 10A and 10B, and shared by both of the operating devices 10A and 10B. Alternatively, each of the operating devices 10A and 10B can communicate with its own dedicated electronic controller that is remotely located from the operating devices 10A and 10B. In any case, one or more electronic controllers can be provided when using one or more operating devices. In the illustrated embodiment, each of the operating devices 10A and 10B includes the electronic controller 14 that is described herein.

As seen in FIG. 3, the operating device 10A further comprises a first electric switch SW1. The first electric switch SW1 is electrically connected to the electronic controller 14 such that an input signal is sent to the electronic controller 14 upon activation of the first electric switch SW1. Here, the operating device 10A further comprises a second electric switch SW2. The second electric switch SW2 is also electrically connected to the electronic controller 14 such that an input signal is sent to the electronic controller 14 upon activation of the second electric switch SW2. The first electric switch SW1 and the second electric switch SW2 are, for example, mounted on a circuit board that includes the electronic controller 14. Here, the first electric switch SW1 and the second electric switch SW2 are push operated electric switches that are electrically connected to a circuit board of the electronic controller 14. Preferably, as seen in FIG. 3, the first electric switch SW1 is provided with a first power generating element PGE1 and the second electric switch SW2 is provided with a second power generating element PGE2. Each of the first and second power generating elements PGE1 and PGE2 can be, for example, a piezoelectric element that generates electrical power each time the corresponding one of the first and second electric switches SW1 and SW2 is operated. The first and second power generating elements PGE1 and PGE2 are one example of an electric power supply for providing electric power to the components of the operating device 10A.

As seen in FIG. 3, the operating device 10A further comprises a battery 16 that provides electric power to the components of the operating device 10A. The battery 16 is another example of an electric power supply for providing electric power to the components of the operating device 10A. Preferably, the battery 16 includes at least one of a coin battery, a rechargeable battery and a power generating element. Here, the battery 16 is preferably, a rechargeable coin battery that is provide on the circuit board that includes the electronic controller 14, the first electric switch SW1 and the second electric switch SW2. However, the battery 16 is not limited to a rechargeable coin battery. Also, the battery 16 can be remotely located from the operating device 10A.

Also, in the illustrated embodiment, the operating device 10A further comprises a wireless communicator 18. The wireless communicator 18 is configured to output wirelessly signals in response to a user operating the operating device 10A. In this way, the operating device 10A can be a separate, self-contained component that is not connected by a wire to any other component. Alternatively, the operating devices 10A and 10B can be connected to the vehicle components via the electrical wire W, as illustrated in FIG. 2. The electronic controller 14 outputs signals to the wireless communicator 18 in response to one of the first electric switch SW1 and the second electric switch SW2 being activated. Thus, here, the electronic controller 14 wirelessly communicates with any one of the height adjustable seatpost ASP, the rear shock absorber RS, the front fork FF, the cycle computer SC and the electric drive unit DU (collectively referred to as the vehicle components). However, the electronic controller 14 can be configured to communicate with the vehicle components by a wireless connection and/or by a wired connection as needed and/or desired.

Here, the wireless communicator 18 can be a one-way wireless communication device such as a transmitter, or a two-way wireless communication device such as a transceiver. In the case of the wireless communicator 18 being a transceiver, the wireless communicator 18 wirelessly communicates with the other vehicle components such that output signals from the vehicle components are received by the wireless communicator 18 and transmitted to the cycle computer SC. In any case, the wireless communication signals of the wireless communicator 18 can be radio frequency (RF) signals, ultra-wide band communication signals, or Bluetooth® communications, ANT® communications, ANT+® communications or any other type of signal suitable for short range wireless communications as understood in the human-power vehicle field. Alternatively, the wireless communicator 18 can be omitted and the operating device 10A can be connected to the vehicle components and the battery 16 by the electrical wire W. In such a case, the vehicle components and the battery 16 are configured to communicate with the electronic controller 14 of the operating device 10A through, for example, power line communication (PLC), a controller area network (CAN), or a universal asynchronous receiver/transmitter (UART).

Figure 4:
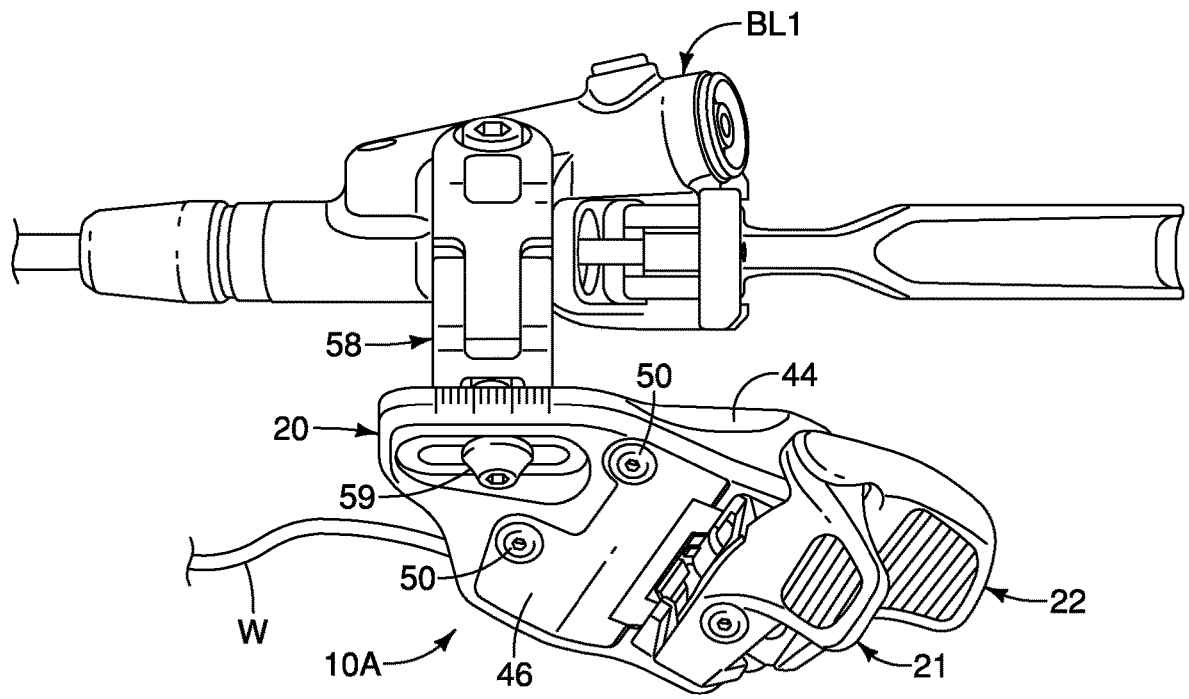
FIG. 4 is an enlarged, rear elevational view of the right operating device illustrated in FIG. 2 in which the operating device is mounted to another operating device in the form of a hydraulic brake operating device.

Referring to FIGS. 2 and 4, the operating device 10A comprises a base 20. The base 20 is configured to mount the operating device 10A to the human-powered vehicle V. Here, for example, the base 20 is mounted to the handlebar H via a brake operating device BL1. However, the base 20 can be provided with a dedicated handlebar clamp or other mounting structure for mounting to the handlebar H. The operating device 10A further comprises a first operating member 21. The first electric switch SW1 is provided to the base 20 and arranged to be activated by movement of the first operating member 21. The first operating member 21 is configured to be operated by a user, and thus, is an example of a first user operated input. The first operating member 21 is movably arranged with respect to the base 20. As explained below, the first operating member 21 is configured to selectively activate the first electric switch SW1 and the second electric switch SW2.

Here, the operating device 10A further comprises a second operating member 22 The second operating member 22 is configured to be operated by a user, and thus, is an example of a second user operated input. The second operating member 22 is movably arranged with respect to the base 20. The second electric switch SW2 is provided to the base 20 and arranged to be activated by movement of the second operating member 22. The first operating member 21 is a separate member from the second operating member 22. Thus, as explained below, the first operating member 21 can be at least partially operated and moved with respect to the base 20 without moving the second operating member 22. Likewise, the second operating member 22 can be at least partially operated and moved with respect to the base 20 without moving the first operating member 21. Also, as explained below, the second operating member 22 is configured to selectively activate the first electric switch SW1 and the second electric switch SW2.

In the illustrated embodiment, the base 20 includes a pivot axle 24. The pivot axle 24 defines a first pivot axis P1. The first operating member 21 is pivotally supported on the pivot axle 24. The second operating member 22 is pivotally supported on the pivot axle 24. In other words, the first operating member 21 and the second operating member 22 are pivotally mounted on the pivot axle 24 of the base 20. Thus, here, the first operating member 21 and the second operating member 22 pivot relative to the base 20 about the pivot axle 24. Basically, the first operating member 21 and the second operating member 22 are configured to selectively operate a vehicle component such the rear derailleur RD or the height adjustable seatpost ASP.

Figure 5:
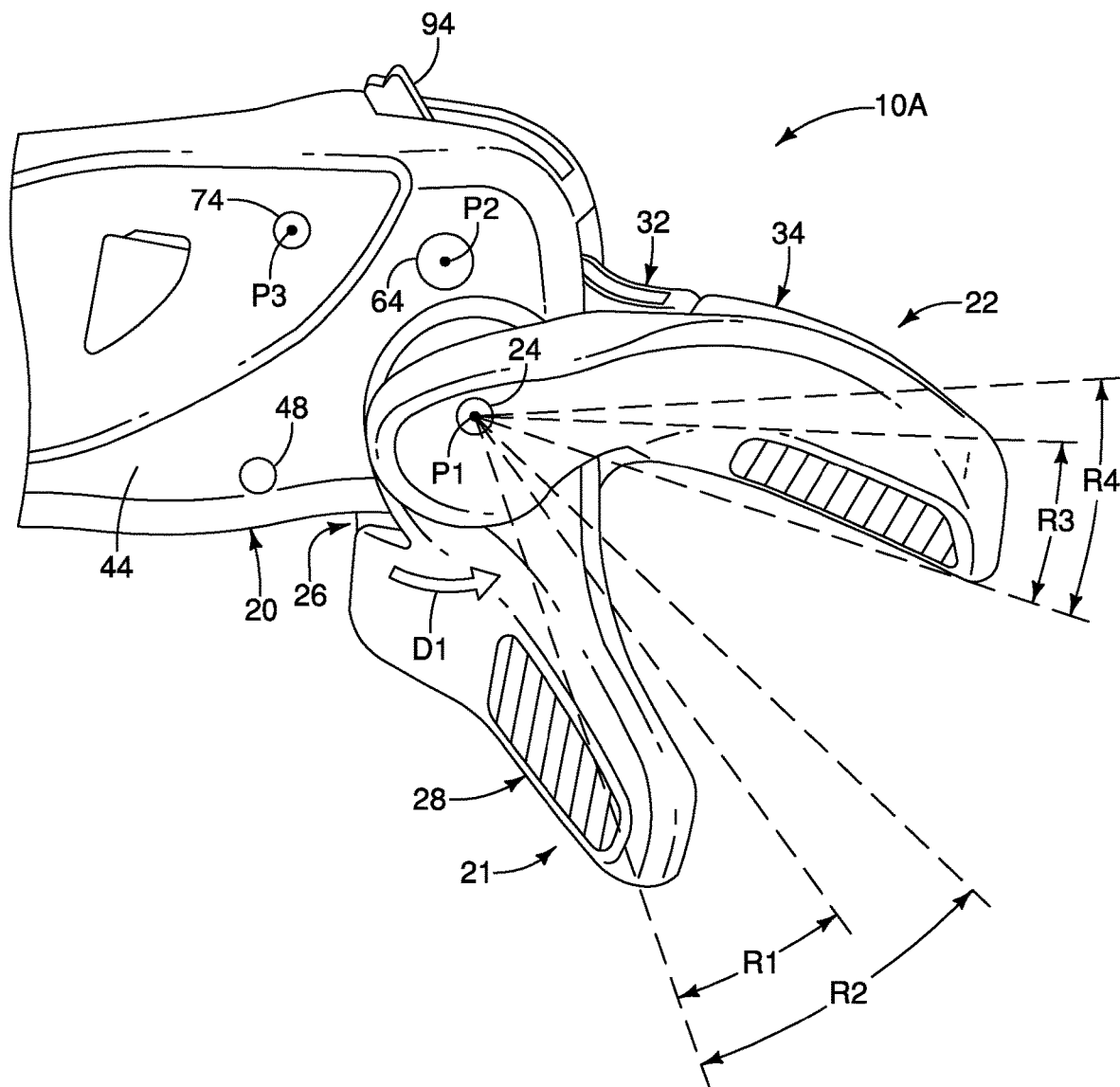
FIG. 5 is a partial isometric view of a portion of the right operating device illustrated in FIG. 4 as viewed along a pivot axle of a first operating member and a second operating member in which the first operating member and the second operating member are in their non-operated positions.
Figure 6:
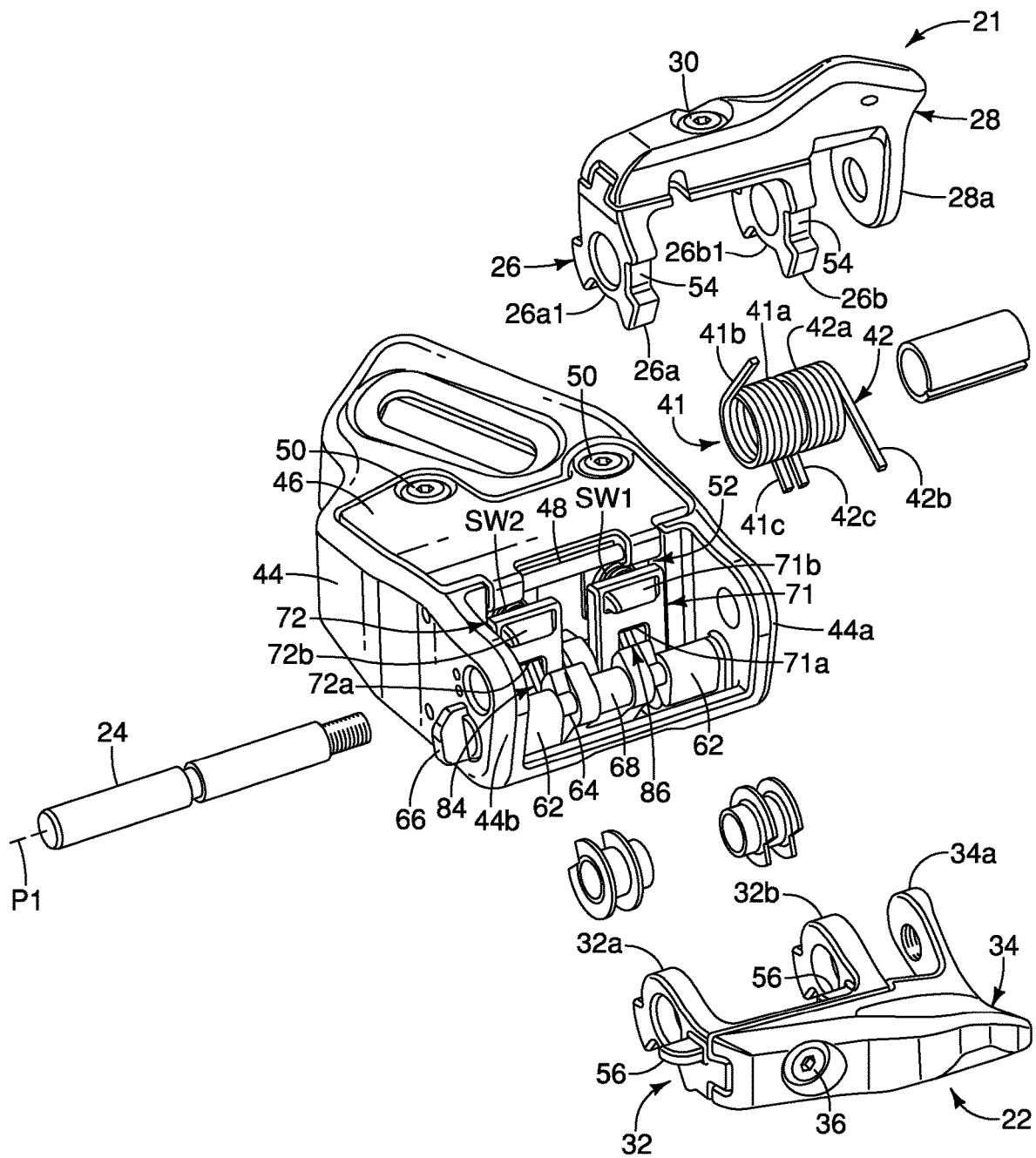
FIG. 6 is a partial exploded isometric view of the right operating device illustrated in FIGS. 4 and 5.

As seen in FIGS. 5 and 6, the first operating member 21 includes a first mounting portion 26 that is pivotally mounted on a pivot axle 24 of the base 20. The first operating member 21 further includes a first operating lever 28. The first operating lever 28 is detachably and reattachably coupled to the first mounting portion 26. Here, the first mounting portion 26 and the first operating lever 28 are coupled together by a tongue and groove connection in which a groove of the first operating lever 28 mates with a tongue of the first mounting portion 26 by a sliding motion. Then, a fastener 30 (e.g., a screw) secures the first operating lever 28 to the first mounting portion 26. The first operating lever 28 extends from the first mounting portion 26, and is configured as a user interface for a user to operate the first operating member 21.

Also, the second operating member 22 includes a second mounting portion 32 that is pivotally mounted on the pivot axle 24 of the base 20. The second operating member 22 further includes a second operating lever 34. The second operating lever 34 is detachable and reattachable coupled to the second mounting portion 32. Here, the second mounting portion 32 and the second operating lever 34 are coupled together by a tongue and groove connection in which a groove of the second operating lever 34 mates with a tongue of the second mounting portion 32 by a sliding motion. Then, a fastener 36 (e.g., a screw) secures the second operating lever 34 to the second mounting portion 32. Similar to the first operating lever 28, the second operating lever 34 extends from the second mounting portion 32, and is configured as a user interface for a user to operate the second operating member 22.

Referring to FIG. 5, the first operating member 21 and the second operating member 22 are pivotally mounted on the pivot axle 24 of the base 20 to pivot about the first pivot axis P1. Here, the first operating lever 28 and the second operating lever 34 are pivotally and coaxially mounted to the base 20. As explained below, the first operating lever 28 and the second operating lever 34 are each biased to a rest or non-operated position with respect to the base 20. The terms "rest position" and "non-operated position" as used herein refers to a state in which a part (e.g., the first operating lever 28 or the second operating lever 34) remains stationary without the need of a user holding the part in that state. On the other hand, the terms "operated position" and "operating position" as used herein refers to a temporary state in which a part (e.g., the first operating lever 28 or the second operating lever 34) is temporarily held in a position due to an external force being inputted into the operating device 10A. The first operating lever 28 and the second operating lever 34 can be pivoted by a user from their rest position about the first pivot axis P1 in an operating direction D1.

As illustrated in FIG. 5, the first operating member 21 can be operated with a first predetermined distance R1 in the operating direction D1 from its rest position to an intermediate operating position to activate only the first electric switch SW1. In other words, the first electric switch SW1 is depressed as a result of the first operating member 21 being moved in the operating direction D1 from its rest position to the intermediate operating position. Here, the first operating member 21 is movable relative to the base 20 in the operating direction D1 from its rest position to the intermediate operating position without moving the second operating member 22. Also, the first operating member 21 can be operated with a second predetermined distance R2 in the operating direction D1 from its rest position to an additional operating position to sequentially activate the first electric switch SW1 and then the second electric switch SW2. Namely, the first operating member 21 is configured to move the second operating member 22 upon the first operating member 21 being moved relative to the base 20 further than the first predetermined distance R1 in the operating direction D1. In particular, the first operating member 21 is moved relative to the base 20 in the operating direction D1 from its rest position to the additional operating position such that the first electric switch SW1 is depressed and then the second electric switch SW2 is depressed while the first electric switch SW1 remains depressed.

Likewise, as illustrated in FIG. 5, the second operating member 22 can be operated with a third predetermined distance R3 in the operating direction D1 from its rest position to an intermediate operating position to activate only the second electric switch SW2. In other words, the second electric switch SW2 is depressed as a result of the second operating member 22 being moved in the operating direction D1 from its rest position to the intermediate operating position. Here, the second operating member 22 is movable relative to the base 20 in the operating direction D1 from its rest position to the intermediate operating position without moving the first operating member 21. Also, the second operating member 22 can be operated a fourth predetermined distance R4 in the operating direction D1 from its rest position to an additional operating position to sequentially activate the second electric switch SW2 and then the first electric switch SW1. Namely, the second operating member 22 is configured to move the first operating member 21 upon the second operating member 22 being moved relative to the base 20 further than the third predetermined distance R3 in the operating direction D1. In particular, the second operating member 22 is moved relative to the base 20 in the operating direction D1 from its rest position to the additional operating position such that the second electric switch SW2 is depressed and then the first electric switch SW1 is depressed while the second electric switch SW2 remains depressed. Here, the first predetermined distance R1 and the third predetermined distance R3 are substantially equal. Similarly, the second predetermined distance R2 and the fourth predetermined distance R4 are substantially equal.

In the case where the operating device 10A is used to operate or control the rear derailleur RD, the first operating member 21 is used for downshifting the rear derailleur RD while the second operating member 22 is used for upshifting the rear derailleur RD. For downshifting the rear derailleur RD, the first operating member 21 is operated to either the intermediate operating position or to the additional operating position. For example, when the first operating member 21 is moved the first predetermined distance R1 from its rest position to the intermediate operating position, the first electric switch SW1 is depressed such that the electronic controller 14 outputs a single gear downshift signal to the rear derailleur RD. On the other hand, for example, when the first operating member 21 is moved the second predetermined distance R2 from its rest position to the additional operating position, the second electric switch SW2 is depressed while the first electric switch SW1 remains depressed such that the electronic controller 14 outputs a double gear downshift signal to the rear derailleur RD. For upshifting the rear derailleur RD, the second operating member 22 is operated to either the intermediate operating position or to the additional operating position. For example, when the second operating member 22 is moved the third predetermined distance R3 from its rest position to the intermediate operating position, the second electric switch SW2 is depressed such that the electronic controller 14 outputs a single gear upshift signal to the rear derailleur RD. On the other hand, for example, when the second operating member 22 is moved the fourth predetermined distance R4 from its rest position to the additional operating position, the first electric switch SW1 is depressed while the second electric switch SW2 remains depressed such that the electronic controller 14 outputs a double gear upshift signal to the rear derailleur RD.

Referring to FIG. 6, the operating device 10A further comprises a first biasing member 41. The first biasing member 41 is arranged to bias the first operating member 21 towards a non-operated position. The operating device 10A further comprises a second biasing member 42. The second biasing member 42 is arranged to bias the second operating member 22 towards a non-operated position. Here, the first biasing member 41 includes a first torsion spring that has a coiled portion 41a that is disposed around the pivot axle 24. The first torsion spring of the first biasing member 41 further includes a first leg 41b that is configured to contact the first operating member 21 and a second leg 41c that operatively contacts a part (discussed below) of the base 20. Similarly, the second biasing member 42 includes a second torsion spring that has a coiled portion 42a disposed around the pivot axle 24. The second torsion spring of the second biasing member 42 further includes a first leg 42b that is configured to contact the second operating member 22 and a second leg 42c that operatively contacts a part (discussed below) of the base 20.

Figure 8:
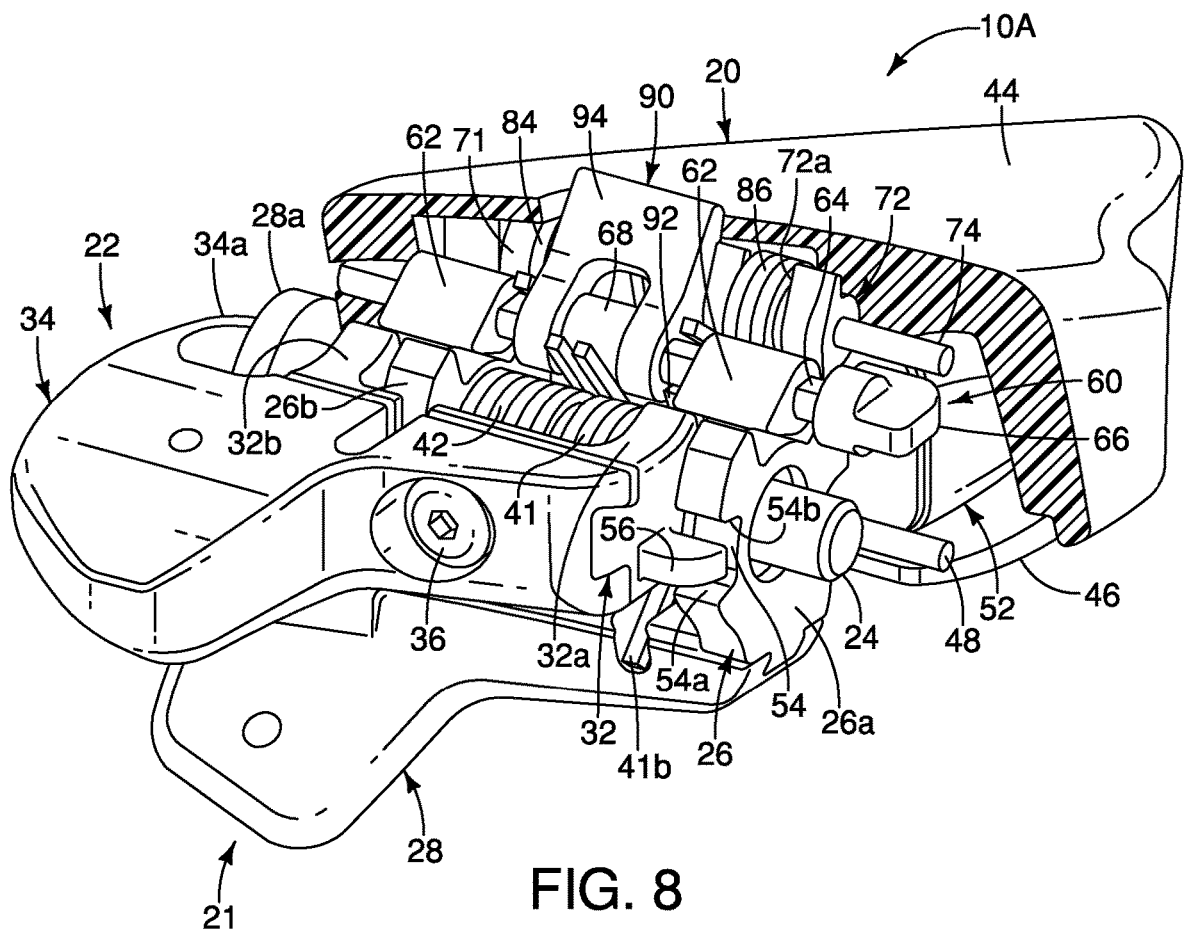
FIG. 8 is an isometric view of the right operating device in which a portion of a base of the right operating device has been broken away and in which the right operating device is set to the short stroke mode.
Figure 9:
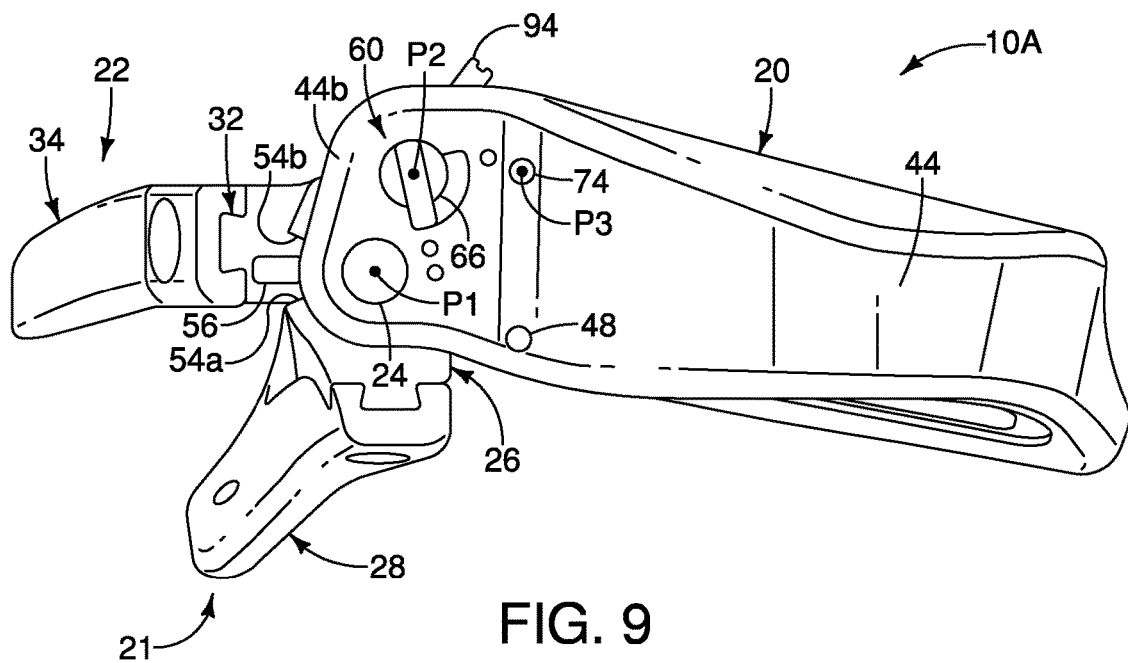
FIG. 9 is an isometric view, similar to FIG. 7, of the right operating device in which the right operating device is set to a long stroke mode such that the first operating member can activate the first electric switch, the second operating member can activate the second electric switch and each of the first operating member and the second operating member can activate both of the first electric switch and the second electric switch at the same time.
Figure 10:
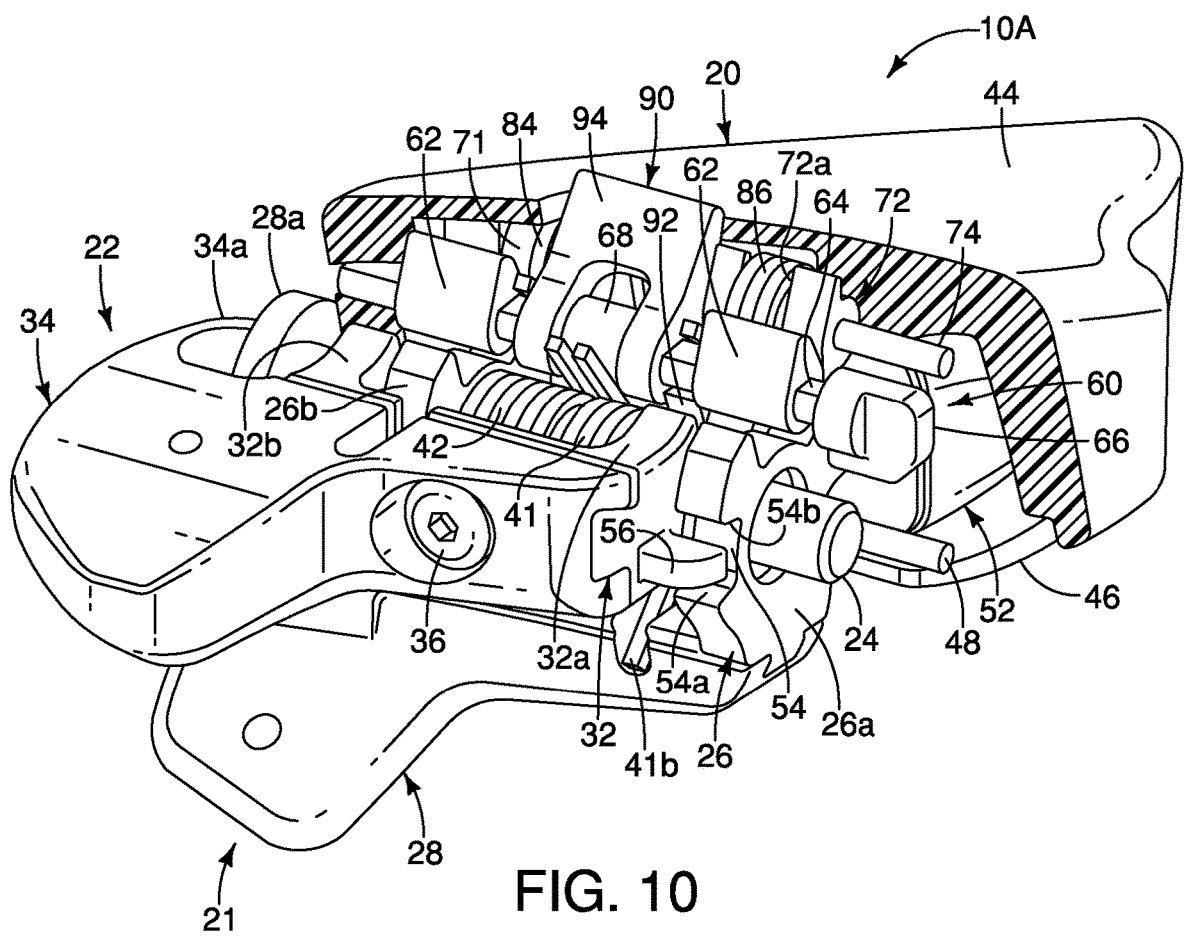
FIG. 10 is an isometric view, similar to FIG. 8, of the right operating device in which a portion of a base of the right operating device has been broken away and in which the right operating device is set to the long stroke mode.

Referring mainly to FIGS. 6 and 8, the base 20 includes a housing 44 and a lid 46. The lid 46 is pivotally mounted to the housing 44 by a pivot axle 48 to move between a closed state and an opened state. The lid 46 is secured in a closed state with respect to the housing 44 by a pair of fasteners 50 (e.g., a pair of screws in the illustrated embodiment). The housing 44 and the lid 46 can be constructed of any suitable rigid material such a rigid plastic material and/or a metallic material. The housing 44 and the lid 46 supports a control unit 52 to the base 20 as seen in FIG. 8. The control unit 52 includes the electronic controller 14, the battery (the electric power supply) 16, the wireless communicator 18, the first electric switch SW1 and the second electric switch SW2. The first electric switch SW1 and the second electric switch SW2 are exposed through the housing 44 to be operable by the first operating member 21 and the second operating member 22. In this way, the first electric switch SW1 is provided to the base 20. Likewise, in this way, the second electric switch SW2 is provided to the base 20. Here, the control unit 52 is removably disposed between the housing 44 and the lid 46.

Here, as seen in FIG. 6, the base 20 includes a first pivot support 44a and a second pivot support 44b. For example, the first pivot support 44a and the second pivot support 44b are integral parts of the housing 44. The first pivot support 44a supports the pivot axle 24 at a first location. The second pivot 44b support supports the pivot axle 24 at a second location that is axially spaced from the first location along the pivot axle 24. The first operating member 21 includes at least two connection portions supported on the pivot axle 24. Likewise, the second operating member 22 includes at least two connection portions supported on the pivot axle 24.

In the illustrated embodiment, the at least two connection portions of the first operating member 21 includes a first connection portion 26a, a second connection portion 26b and a third connection portion 28a that are pivotally supported on the pivot axle 24. The first connection portion 26a and the second connection portion 26b are integral parts of the first mounting portion 26 of the first operating member 21, while the third connection portion 28a is an integral part of the first operating lever 28 of the first operating member 21. The first biasing member 41 is located axially on the pivot axle 24 between the at least two connection portions of the first operating member 21. In particular, in the illustrated embodiment, the first biasing member 41 is located axially on the pivot axle 24 between the first connection portion 26a and the second connection portion 26b. Also, the first connection portion 26a and the second connection portion 26b of the first operating member 21 are located on the pivot axle 24 axially between the first pivot support 44a and the second pivot support 44b of the base 20. On the other hand, the third connection portion 28a of the first operating member 21 is located on the pivot axle 24 at a side of one of the first pivot support 44a and the second pivot support 44b that faces away from the other of the pivot support 44a and the second pivot support 44b. In the illustrated embodiment, the third connection portion 28a is located on the pivot axle 24 at a side of the first pivot support 44a that faces away from the second pivot support 44b.

In the illustrated embodiment, the at least two connection portions of the second operating member 22 includes a first connection portion 32a, a second connection portion 32b and a third connection portion 34a that are pivotally supported on the pivot axle 24. The first connection portion 32a and the second connection portion 32b are integral parts of the second mounting portion 32 of the second operating member 22, while the third connection portion 34a is an integral part of the second operating lever 34 of the second operating member 22. The second biasing member 42 is located on the pivot axle 24 axially between the at least two connection portions of the second operating member 22. In particular, in the illustrated embodiment, the second biasing member 42 is located axially on the pivot axle 24 between the first connection portion 32a and the second connection portion 32b. Also, the first connection portion 32a and the second connection portion 32b of the second operating member 22 are located on the pivot axle 24 axially between the first pivot support 44a and the second pivot support 44b of the base 20. On the other hand, the third connection portion 34a of the second operating member 22 is located on the pivot axle 24 at a side of one of the first pivot support 44a and the second pivot support 44b that faces away from the other of the pivot support 44a and the second pivot support 44b. In the illustrated embodiment, the third connection portion 34a is located on the pivot axle 24 at the side of the first pivot support 44a that faces away from the second pivot support 44b.

Figure 7:
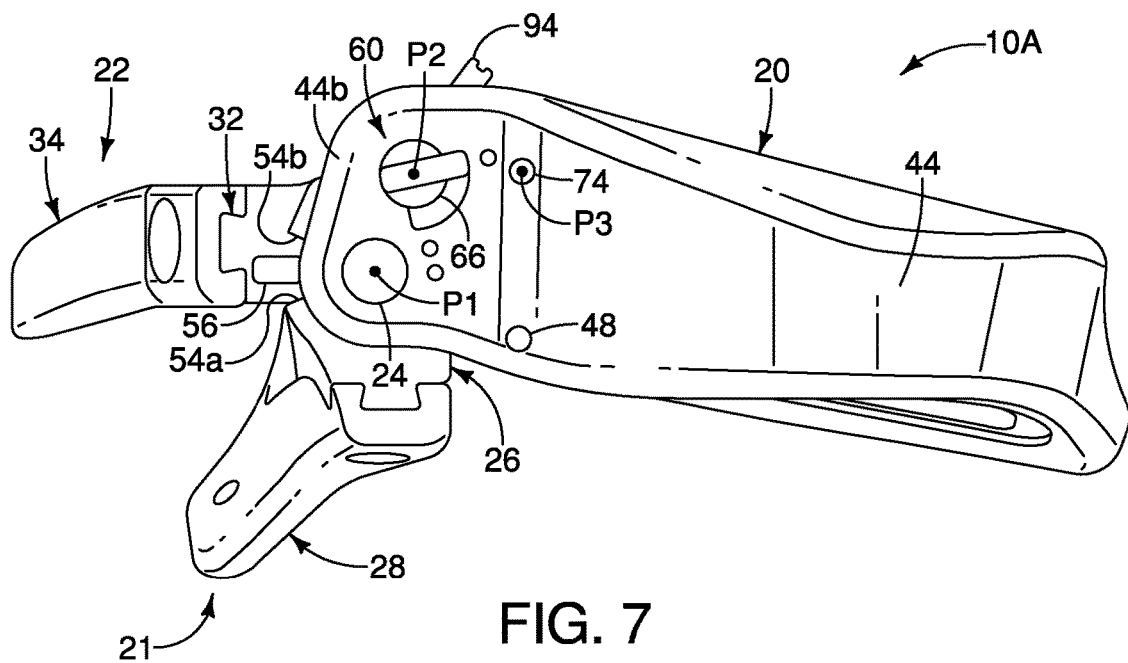
FIG. 7 is an isometric view of the right operating device in which the right operating device is set to a short stroke mode such that the first operating device can only activate a first electric switch and the second operating device can only activate a second electric switch.

Here, as seen in FIG. 6, the first mounting portion 26 of the first operating member 21 is provided with a pair of recesses 54. As seen in FIGS. 7 and 8, each of recesses 54 defines a first abutment 54a and a second abutment 54b. On the other hand, as seen in FIG. 6, the second mounting portion 32 of the second operating member 22 is provided with a pair of third abutments 56. As seen in FIGS. 7 and 8, the third abutments 56 are positioned in the recesses 54 between the first abutments 54a and the second abutments 54b of the first operating member 21. The first abutments 54a are configured to contact the third abutments 56 of the second operating member 22 such that the first operating member 21 and the second operating member 22 pivot together on the pivot axle 24 as the first operating member 21 pivots from the intermediate operating position to the additional operating position (see FIG. 5). The second abutments 54b are configured to be contacted by the third abutments 56 of the second operating member 22 such that the first operating member 21 and the second operating member 22 pivot together on the pivot axle 24 as the second operating member 22 pivots from the intermediate operating position to the additional operating position (see FIG. 5).

As mentioned above, the base 20 is configured to mount the operating device 10A to the handlebar H of the human-powered vehicle V. More specifically, in the illustrated embodiment, as seen in FIG. 4, the operating device 10A further comprises a handlebar clamp 58 coupled to the base 20. The handlebar clamp 58 is configured to be detachable and attachable with respect to the base 20. For example, the base 20 is attached to the handlebar clamp 58 by a suitable fastener such as a fixing bolt 59.

Here, the handlebar clamp 58 is a part of a brake operating device BL1, which is a hydraulic brake operating device in the illustrated embodiment. Since the brake operating device BL1 has relatively conventional functions in the human-powered vehicle field, only the handlebar clamp 58 of the brake operating device BL1 will be discussed herein. The handlebar clamp 58 supports both the operating device 10A and the brake operating device BL1 on the handlebar H, which is a bicycle handlebar in the illustrated embodiment. Alternatively, the handlebar clamp 58 can be integrated into the base 20 of the operating device 10A. Further, the brake operating device BL1 can be omitted from the handlebar clamp 58 irrespective of an attachment manner between the base 20 and the handlebar clamp 58.

Here, as seen in FIGS. 6 to 14, the operating device 10A further comprises a stroke adjuster 60. The stroke adjuster 60 is configured to adjust a stroke length of at least one of the first operating member 21 and the second operating member 22 to prevent the at least one of the first operating member 21 and the second operating member 22 from reaching the additional operating position. Here, the stroke adjuster 60 is configured to simultaneously adjust a stroke length of the first operating member 21 and a stroke length of the second operating member 22. Alternatively, the stroke adjuster 60 can be configured to adjust the stroke length of only one of the first operating member 21 and the second operating member 22. Also, alternatively, the stroke adjuster 60 can be configured to individually adjust the stroke length of only one of the first operating member 21 and the second operating member 22.

Figure 11:
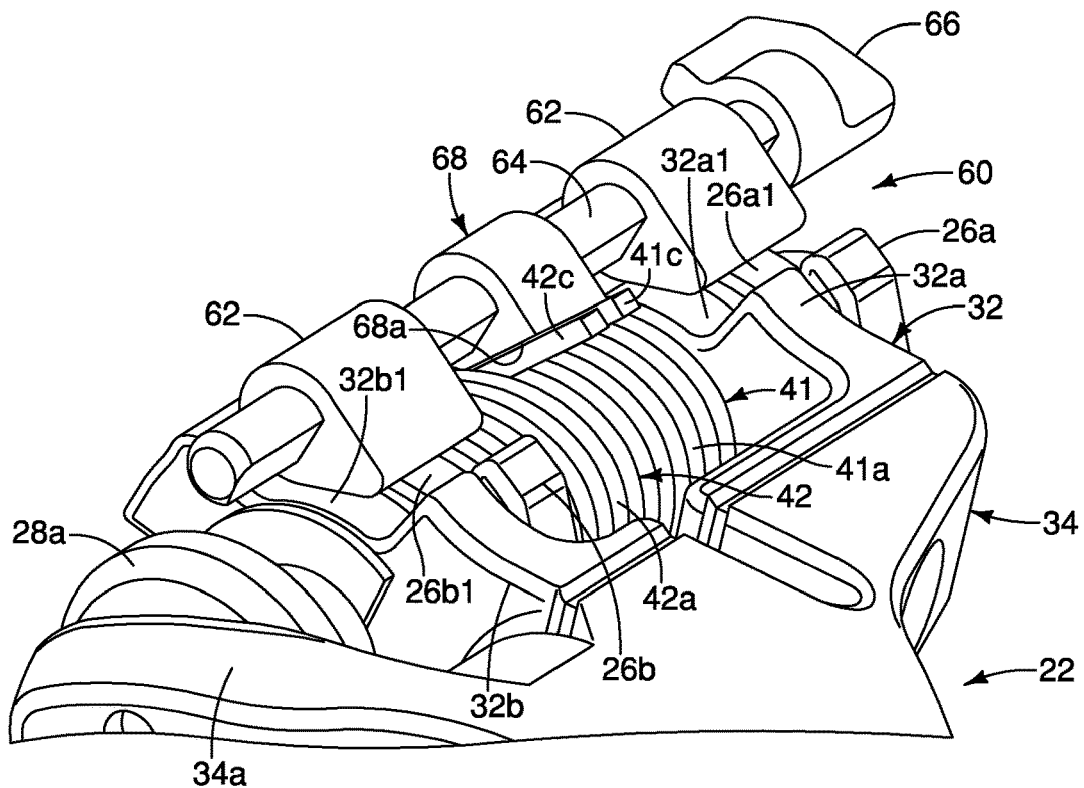
FIG. 11 is a partial isometric view of the right operating device in which the right operating device is set to the short stroke mode.
Figure 12:
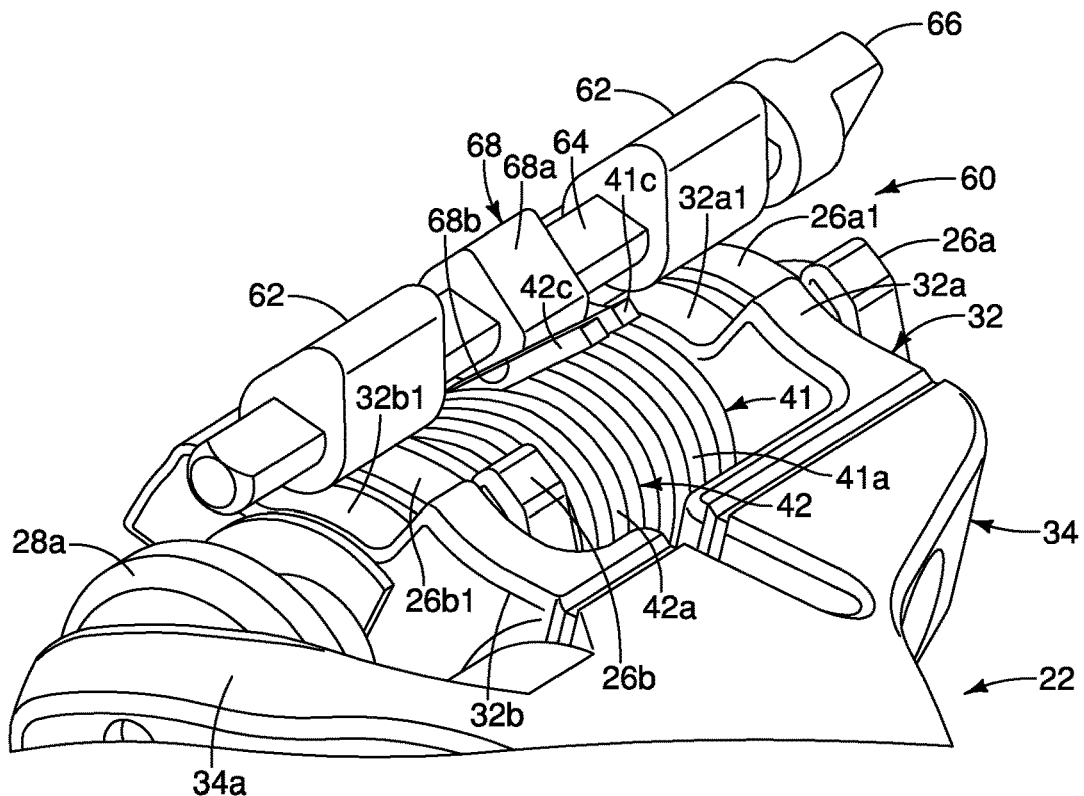
FIG. 12 is a partial isometric view of the right operating device in which the right operating device is set to the long stroke mode.

The stroke adjuster 60 includes an abutment 62. Here, the stroke adjuster 60 includes a pair of the abutments 62 for simultaneously adjusting the stroke lengths of the first operating member 21 and the second operating member 22. However, it is not necessary to provide two of the abutments 62. Rather, one of the abutments 62 is sufficient for simultaneously adjusting the stroke lengths of the first operating member 21 and the second operating member 22. The abutments 62 are each movably mounted relative to the base 20 between a first position where a first distance L1 (see FIG. 13) is provided from the abutments 62 to the first operating member 21 and the second operating member 22, and a second position where a second distance L2 (see FIG. 14) is provided from the abutments 62 to the first operating member 21 and the second operating member 22. The first distance L1 is different from the second distance L2. In particular, as seen in FIGS. 11 and 12, one of the abutments 62 are located in a first recess 26a1 of the first connection portion 26a, and a first recess 32a1 of the first connection portion 32a, while the other one of the abutments 62 is located in a second recess 26b1 of the second connection portion 26b and a second recess 32b1 of the second connection portion 32b.

Figure 13:
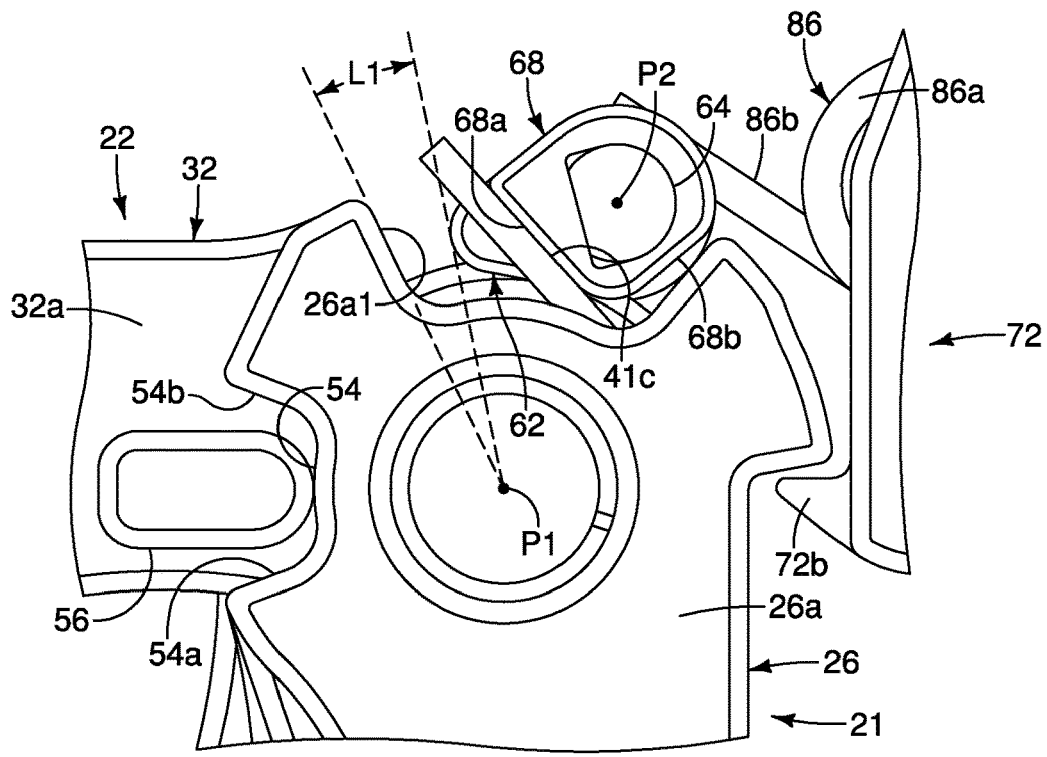
FIG. 13 is a partial view of the right operating device as viewed along a pivot axle of a first operating member and a second operating member in which the right operating device is set to the short stroke mode.
Figure 14:
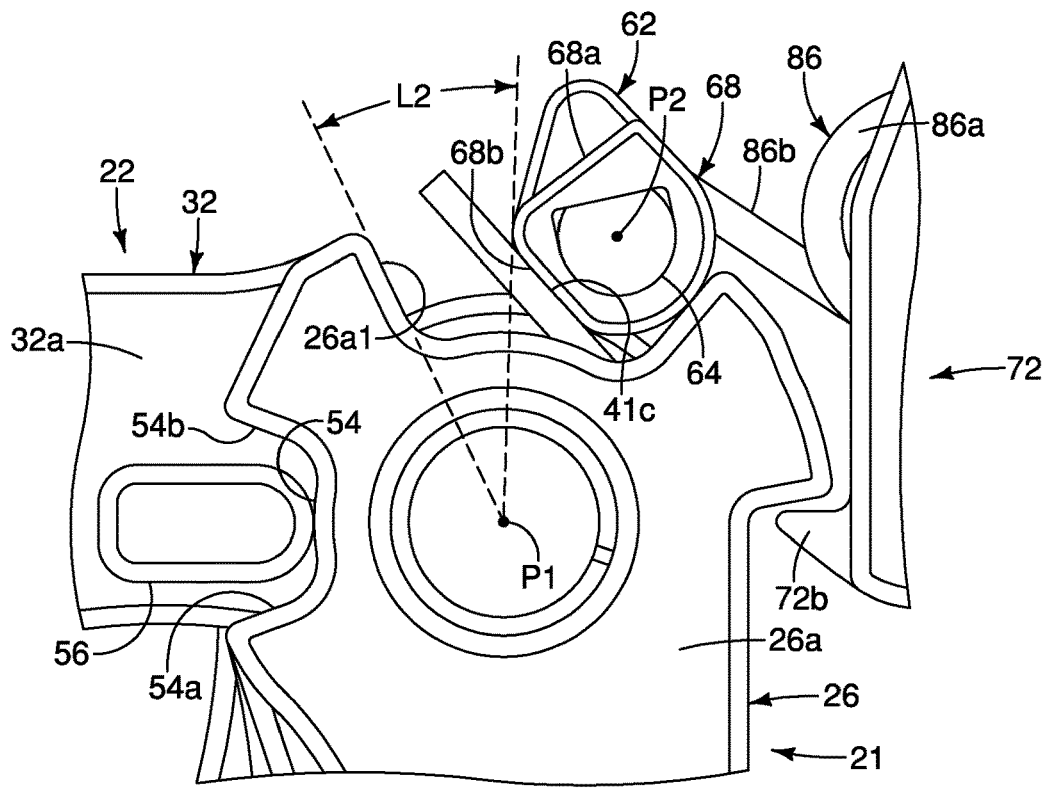
FIG. 14 is a partial view of the right operating device as viewed along a pivot axle of the first operating member and the second operating member in which the right operating device is set to the long stroke mode.

The stroke adjuster 60 further includes a pivot axle 64 that movably supports the abutments 62 relative to the base 20 between the first position (see FIG. 13) and the second position (see FIG. 14). The pivot axle 64 defines a second pivot axis P2. The second pivot axis P2 is parallel to the first pivot axis P1. The pivot axle 64 of the stroke adjuster 60 includes a user operated member 66 that protrudes from the base 20. The stroke adjuster 60 includes an indexing cam 68 engaged with at least one of the first biasing member 41 and the second biasing member 42 to selectively retains the abutments 62 in the first position and the second position.

As seen in FIGS. 13 and 14, the abutments 62 and the indexing cam 68 are non-movably disposed on the pivot axle 64. The abutments 62 limit the movement of the first operating member 21 and the second operating member 22. The user operated member 66 is attached to one end of the pivot axle 64, and protrudes from the base 20. In this way, a user can pivot the user operated member 66 relative to the base 20 such that the pivot axle 64 and the abutments 62 pivot together relative to the base 20.

More specially, the abutments 62 are movably mounted relative to the base 20 between a first position and a second position by rotating the pivot axle 64 using the user operated member 66. The indexing cam 68 is engaged with at least one of the first biasing member 41 and the second biasing member 42 to selectively retains the abutments 62 at the first position and the second position. Here, the indexing cam 68 is engaged with both of the first biasing member 41 and the second biasing member 42. Preferably, the indexing cam 68 includes a first indexing surface 68a and a second indexing surface 68b. The first indexing surface 68a and the second indexing surface 68b selectively contacts the second leg 41c of the first biasing member 41 and the second leg 42c of the second biasing member 42. In particular, the first indexing surface 68a contacts the second leg 41c of the first biasing member 41 and the second leg 42c of the second biasing member 42 to hold the abutments 62 in the first position as seen in FIG. 13. On the other hand, the second indexing surface 68b contacts the second leg 41c of the first biasing member 41 and the second leg 42c of the second biasing member 42 to hold the abutments 62 in the second position as seen in FIG. 14.

Where the abutments 62 are in the first position as seen in FIG. 13, the first operating member 21 contacts the abutments 62 after moving the first predetermined distance R1 (see FIG. 5) from the rest position to the intermediate operating position, and the second operating member 22 contacts the abutments 62 after moving the third predetermined distance R3 (see FIG. 5) from the rest position to the intermediate operating position. As a result of the abutments 62 being in the first position, the first operating member 21 can only activate the first electric switch SW1 and the second operating member 22 can only activate the second electric switch SW2.

Where the abutments 62 are in the second position as seen in FIG. 14, the first operating member 21 contacts the abutments 62 after moving the second predetermined distance R2 (see FIG. 5) from the rest position to the additional operating position, and the second operating member 22 contacts the abutments 62 after moving the fourth predetermined distance R4 (see FIG. 5) from the rest position to the additional operating position. As a result of the abutments 62 being in the second position, the first operating member 21 can sequentially activate the first electric switch SW1 and then the second electric switch SW2 while the first electric switch SW1 remains depressed. Also, as a result of the abutments 62 being in the second position, the second operating member 22 can sequentially activate the second electric switch SW2 and then the first electric switch SW1 while the second electric switch SW2 remains depressed.

Figure 15:
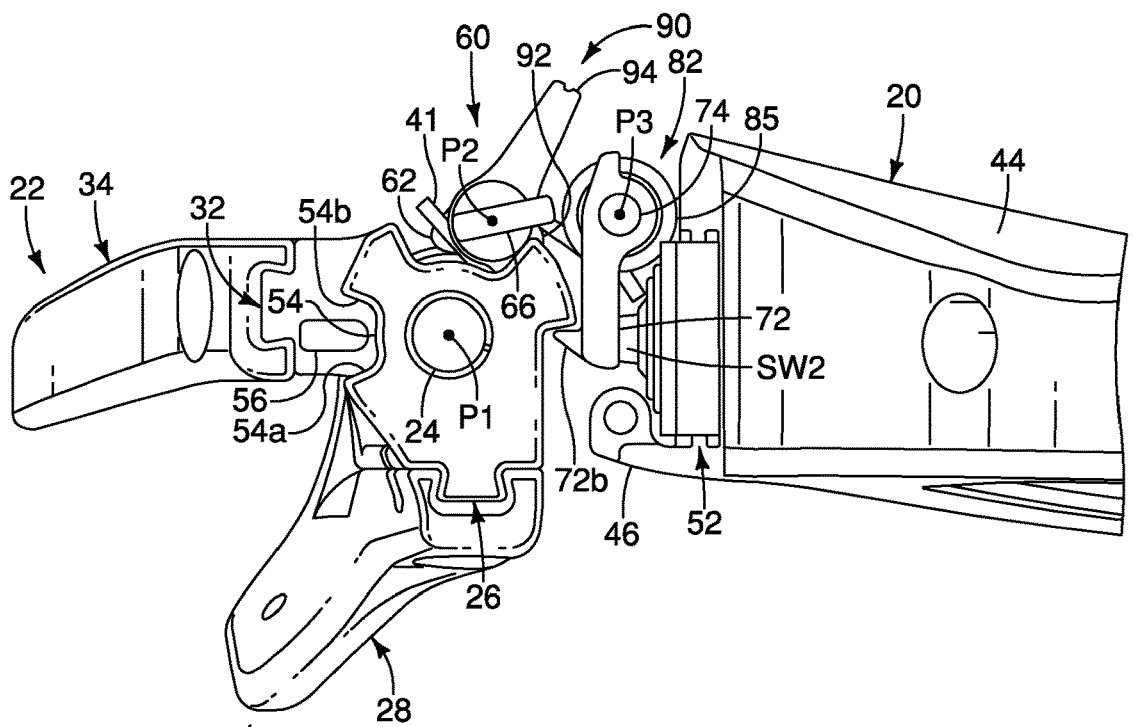
FIGS. 15 and 16 are partial isometric views of the right operating device illustrated in FIGS. 4 to 8 in which a portion of the base has been broken away to reveal various parts of the right operating device where the right operating device is set to the short stroke mode and the first operating member and the second operating member are in their non-operated positions.
Figure 16:
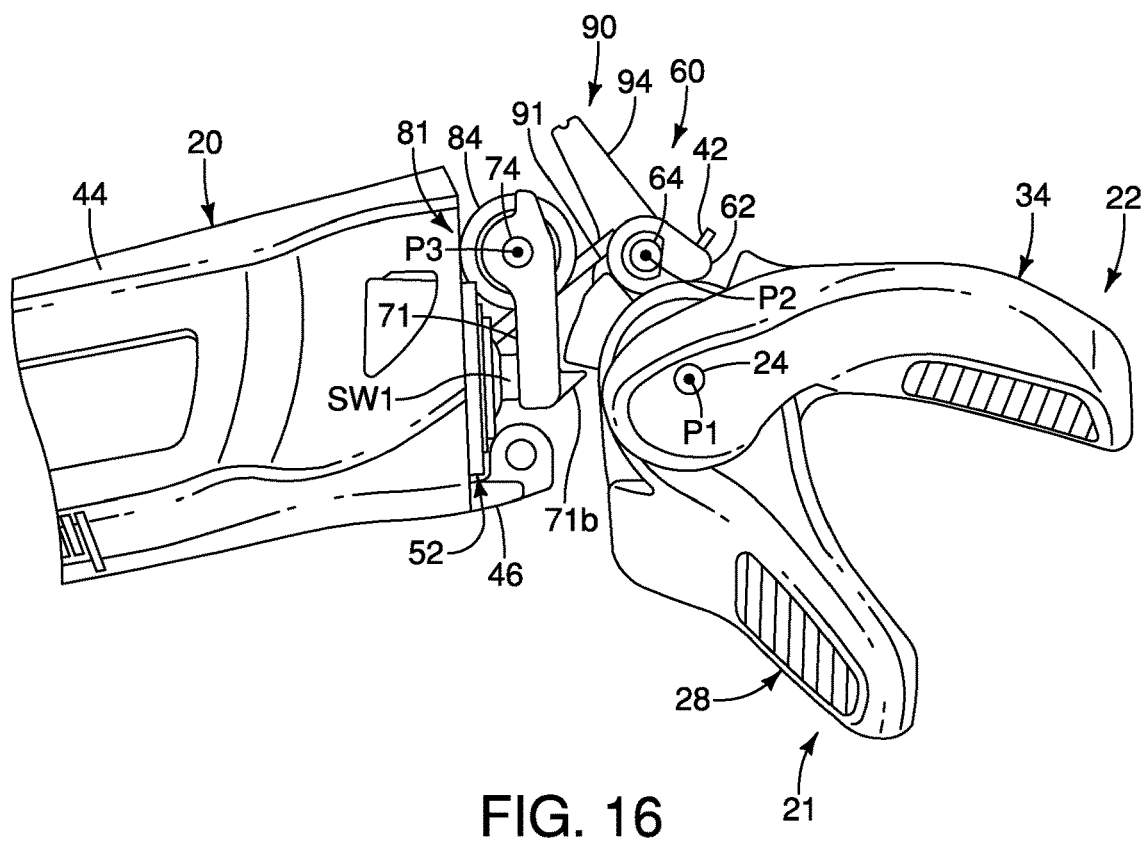
Figure 17:
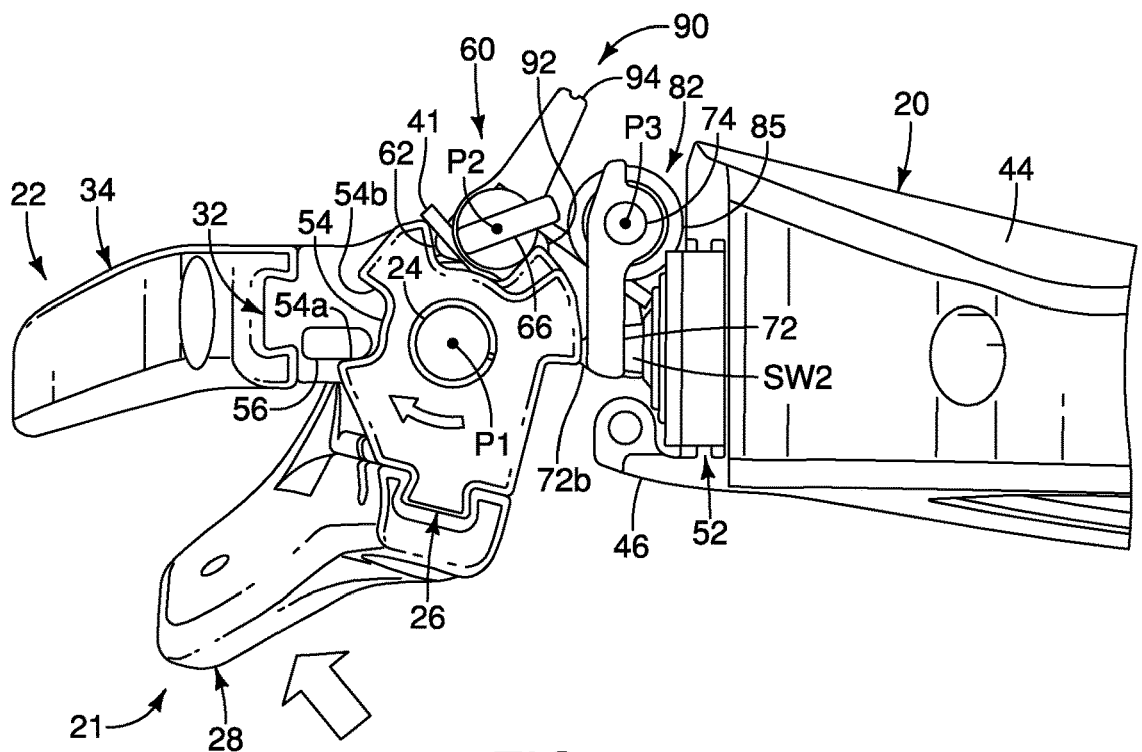
FIGS. 17 and 18 are partial isometric views, similar to FIGS. 15 and 16, of the portion of the right operating device but where the first operating member has been moved to the first activation position (an intermediate operating position) to activate the first electric switch while in the short stroke mode.
Figure 18:
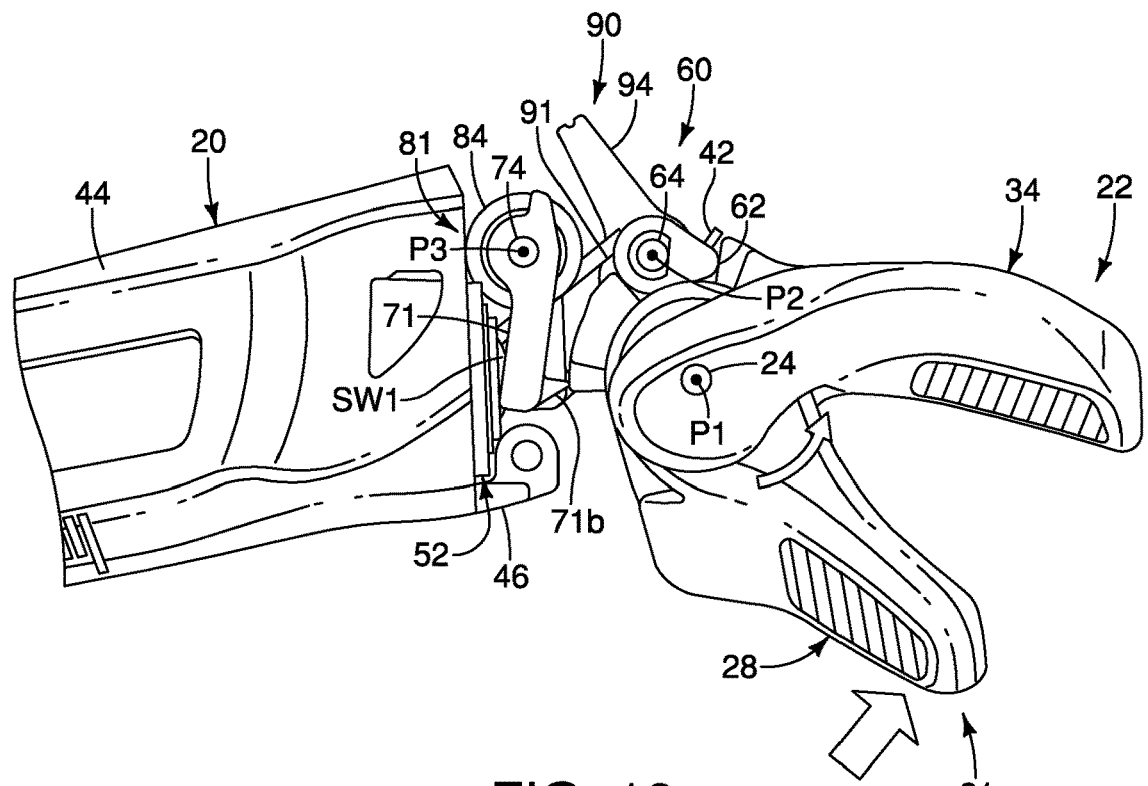
Figure 19:
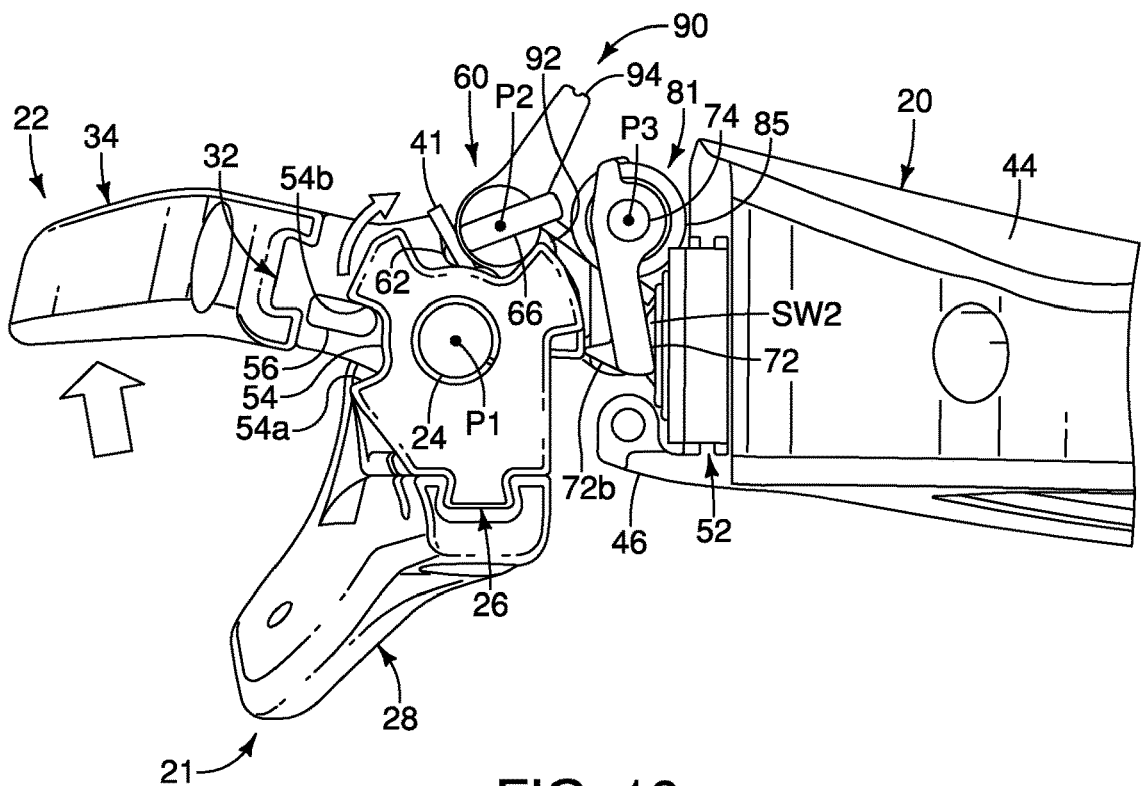
FIGS. 19 and 20 are partial isometric views, similar to FIGS. 15 and 16, of the portion of the right operating device but where the second operating member has been moved to a second activation position (an additional operating position) to activate the second electric switch while in the short stroke mode.
Figure 20:
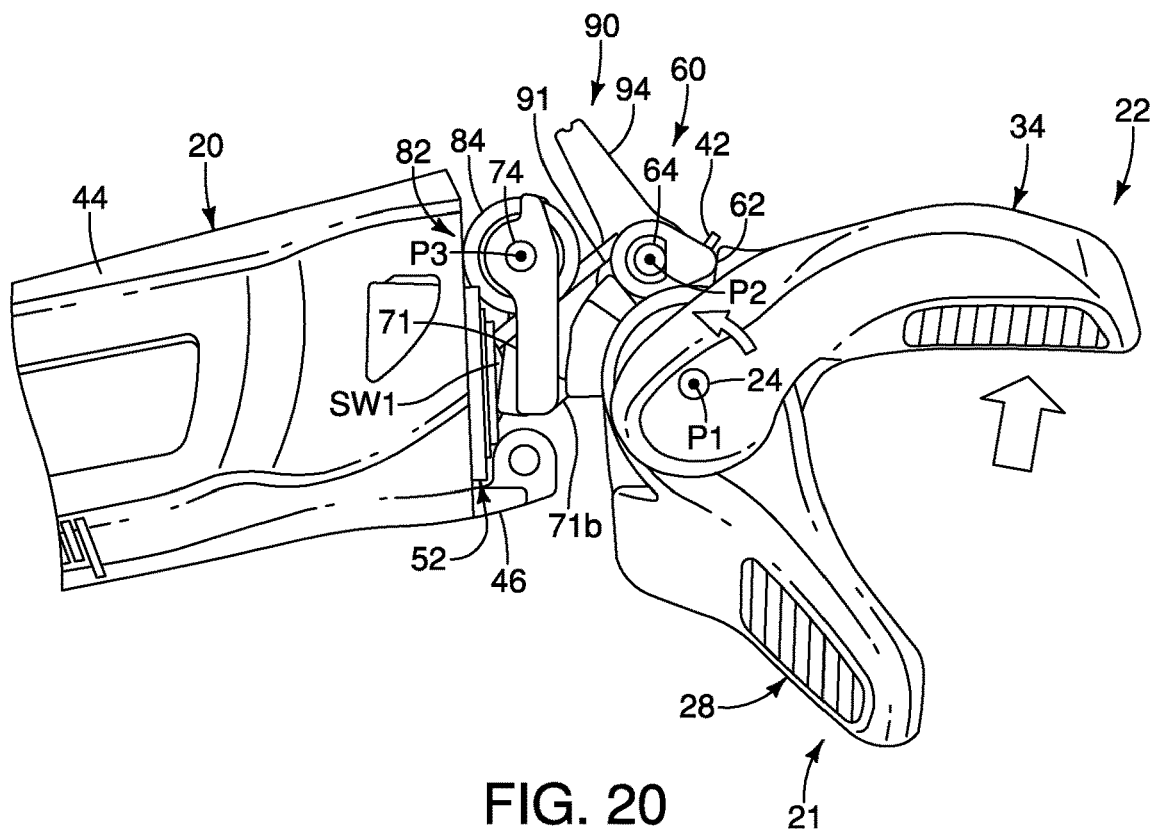

Referring now to FIGS. 15 to 20, here, the stroke adjuster 60 is set to the short stroke mode in which the abutments 62 are in the first position. As a result, in the short stroke mode, the first operating member 21 can only activate the first electric switch SW1 and the second operating member 22 can only activate the second electric switch SW2. Namely, FIGS. 15 and 16 shows the first operating member 21 and the second operating member 22 in their non-operated positions, and shows the stroke adjuster 60 in the short stroke mode. As mentioned above, in the short stroke mode, the abutments 62 are located in the first position to restrict the movement of the first operating member 21 and the second operating member 22. In FIGS. 17 and 18, the first operating member 21 has been moved to the intermediate operating position to activate the first electric switch SW1 (FIG. 18), while the second operating member 22 remains stationary (FIG. 17). In the short stroke mode, as seen in FIG. 18, the first operating member 21 abuts the abutments 62 so that the first operating member 21 cannot move past the intermediate operating position. In FIGS. 19 and 20, the second operating member 22 has been moved to the intermediate operating position to activate the second electric switch SW2 (FIG. 19), while the first operating member 21 remains stationary (FIG. 20). In the short stroke mode, as seen in FIG. 19, the second operating member 22 abuts the abutments 62 so that the second operating member 22 cannot move past the intermediate operating position.

Figure 21:
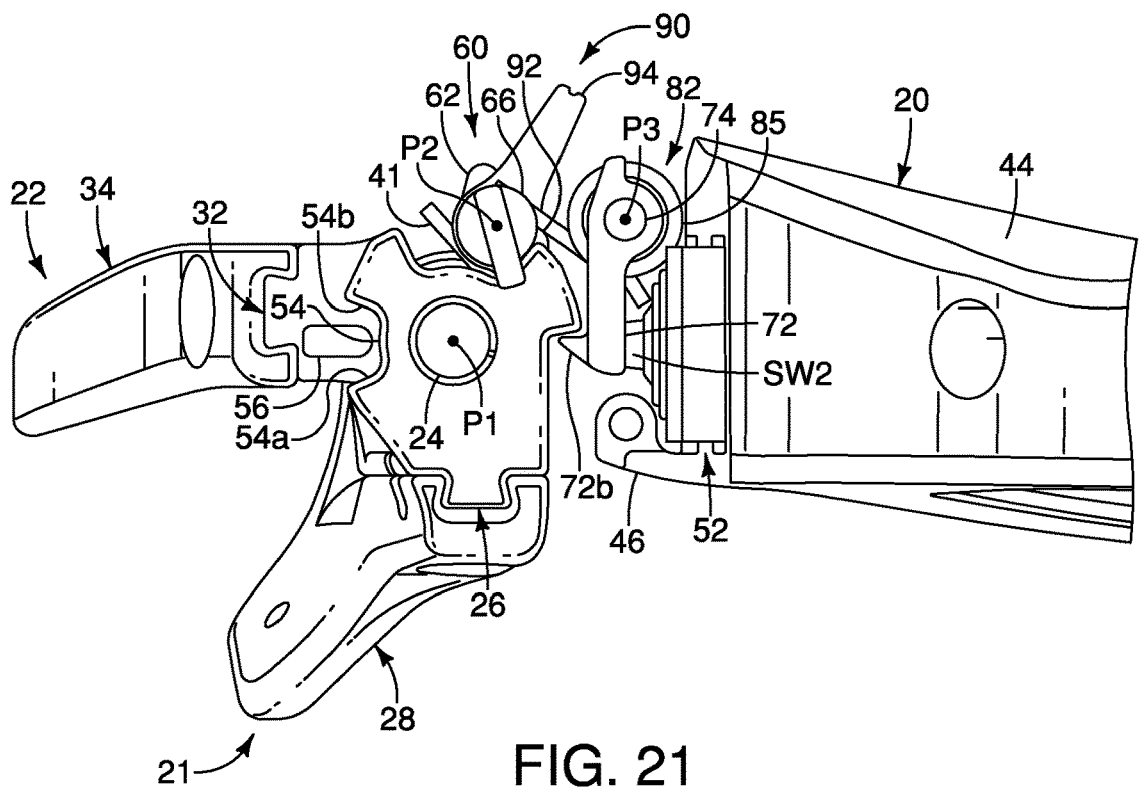
FIGS. 21 and 22 are partial isometric views, similar to FIGS. 15 and 16, of the portion of the right operating device but where the right operating device is set to the long stroke mode and the first user operated member and the second user operated member are in their rest positions.
Figure 22:
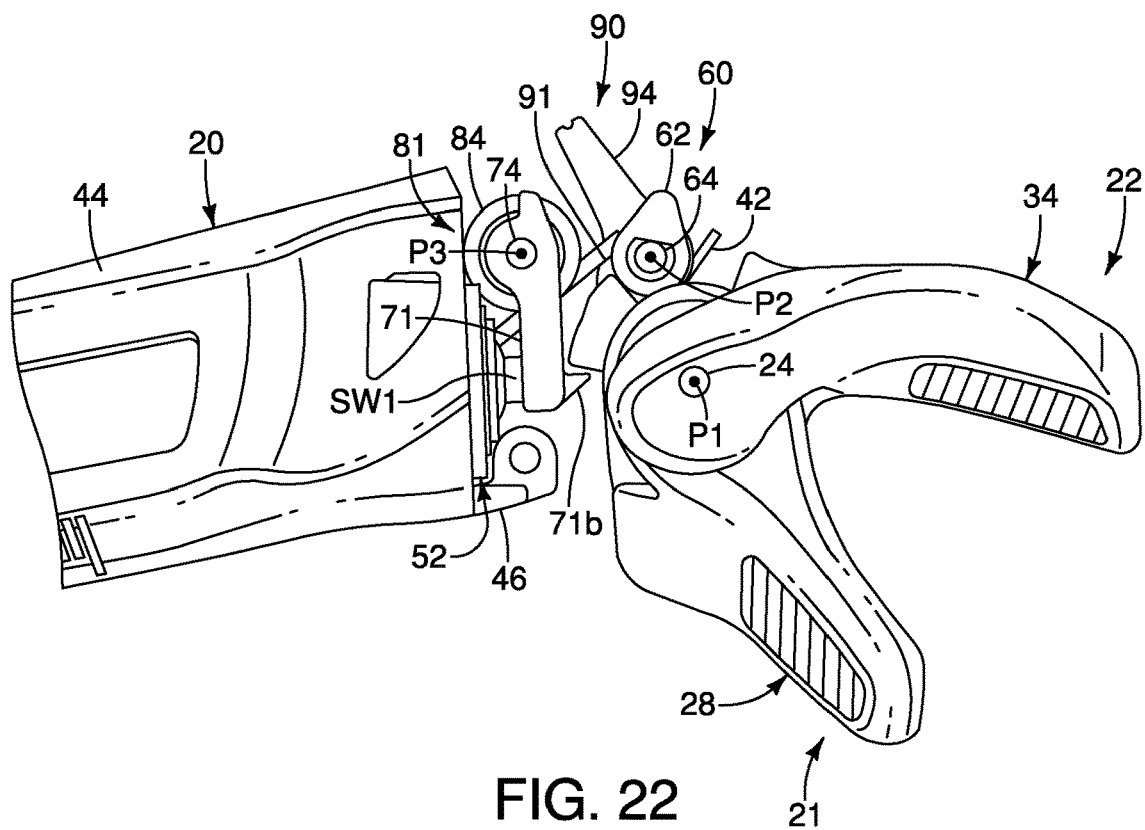
Figure 23:
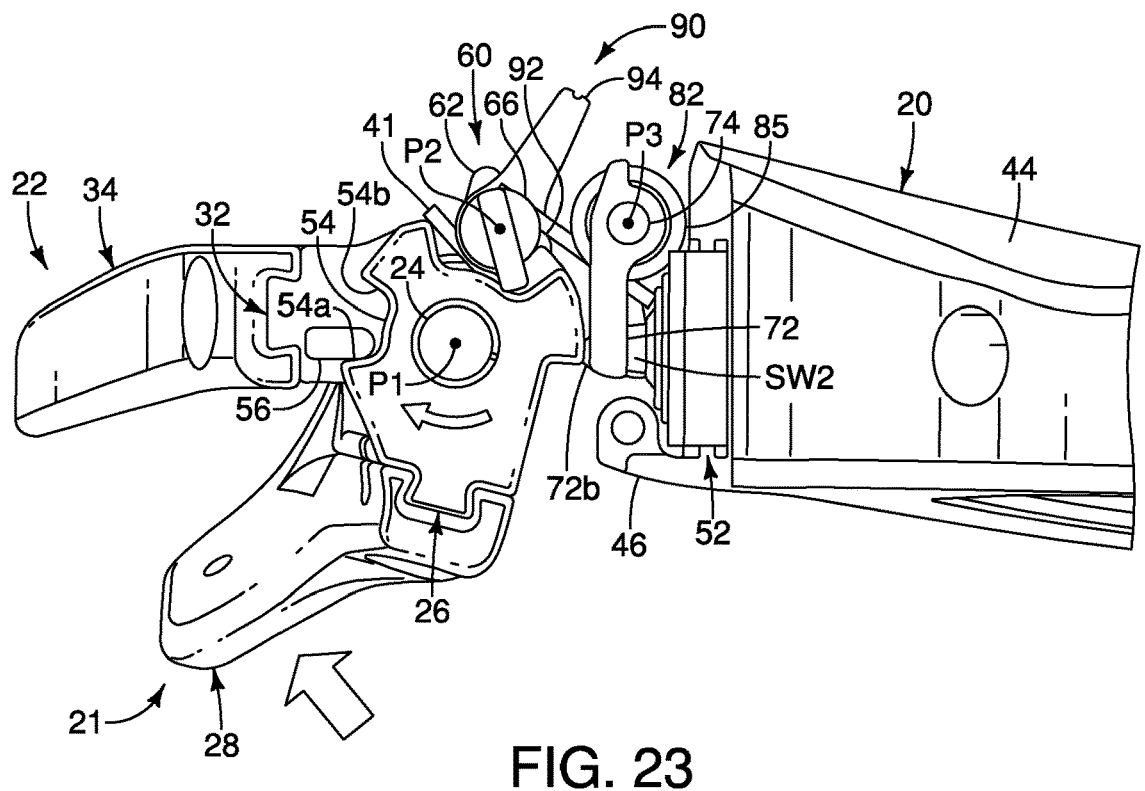
FIGS. 23 and 24 are partial isometric views, similar to FIGS. 15 and 16, of the portion of the right operating device but where the first operating member has been moved to a first activation position (an intermediate operating position) to activate the first electric switch while in the long stroke mode.
Figure 24:
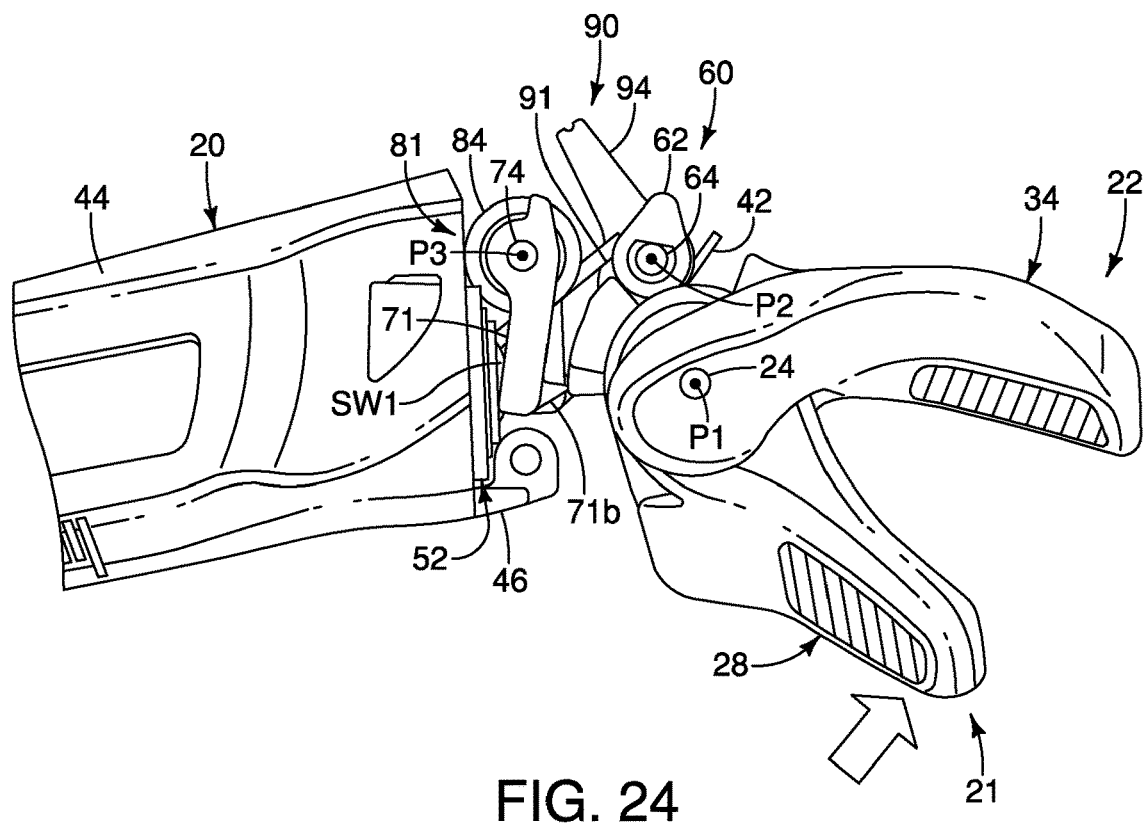
Figure 25:
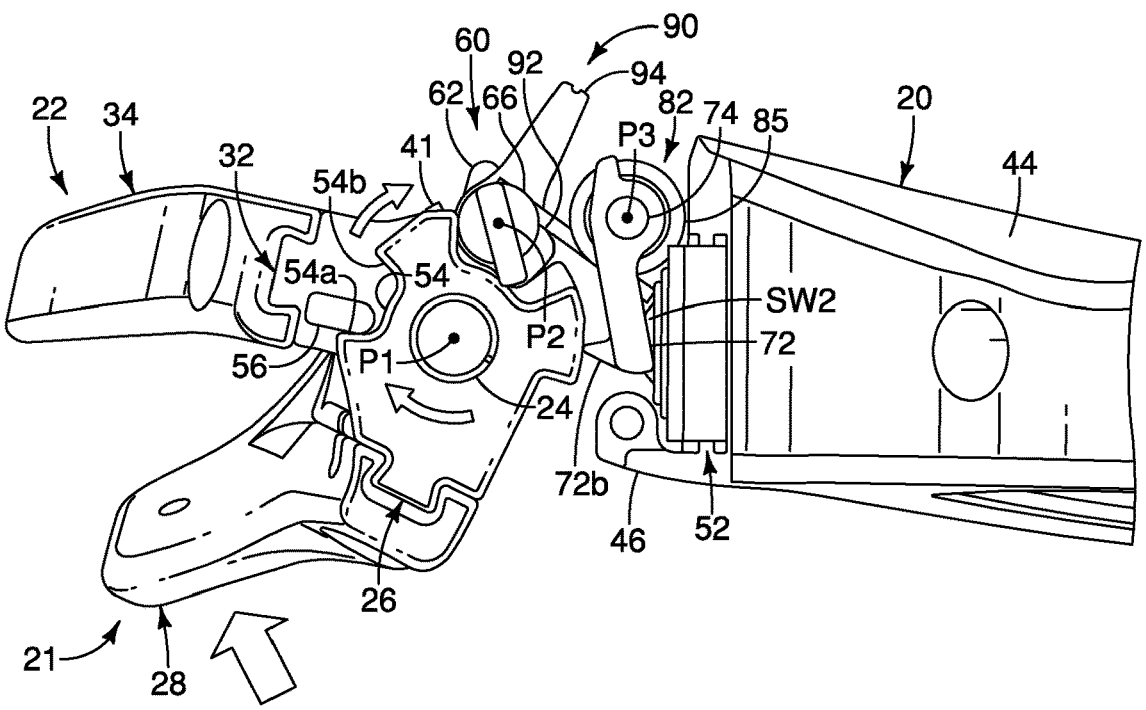
FIGS. 25 and 26 are partial isometric views, similar to FIGS. 15 and 16, of the portion of the right operating device but where the first operating member has been moved to a second activation position (an additional operating position) to activate both the first electric switch and the second electric switch while in the long stroke mode.
Figure 26:
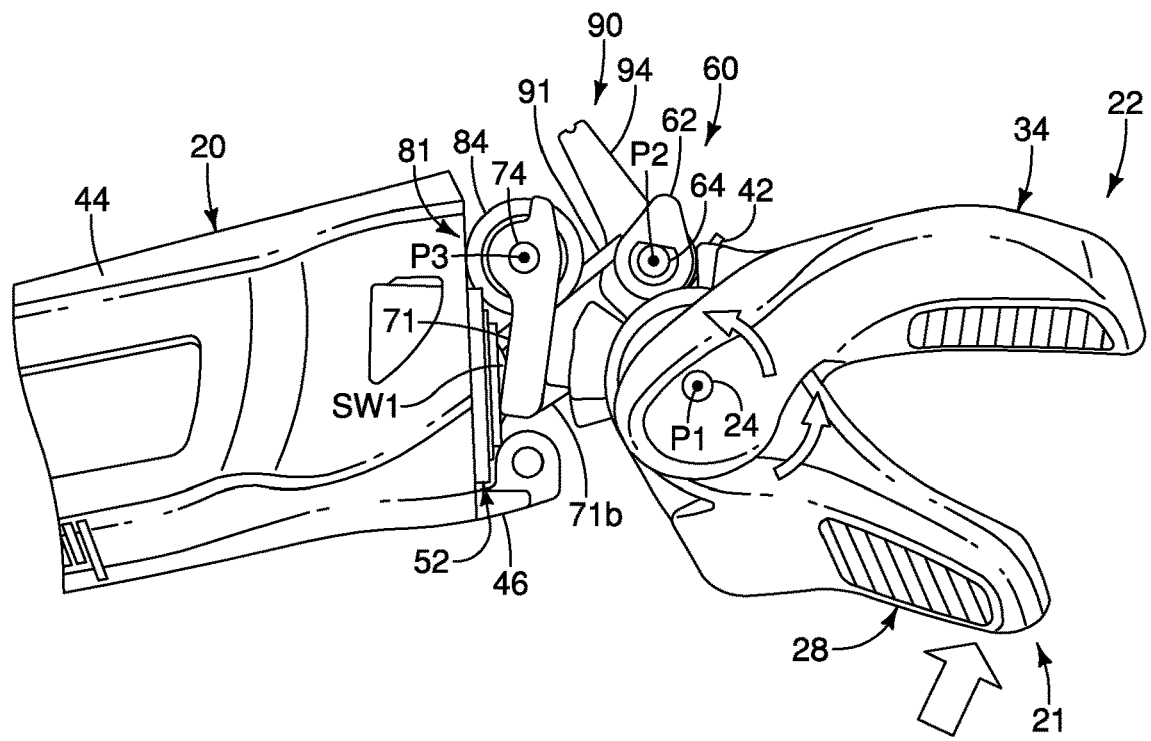

Referring now to FIGS. 21 to 30, here, the stroke adjuster 60 is set to the long stroke mode in which the abutments 62 are in the second position. As a result, in the long stroke mode, the first operating member 21 can sequentially activate the first electric switch SW1 and the second electric switch SW2, and the second operating member 22 can sequentially activate the second electric switch SW2 and the first electric switch SW1. Namely, FIGS. 21 and 22 shows the first operating member 21 and the second operating member 22 in their non-operated positions, and shows the stroke adjuster 60 in the long stroke mode. In FIGS. 23 and 24, the first operating member 21 has been moved to the intermediate operating position to activate the first electric switch SW1 (FIG. 24), while the second operating member 22 remains stationary (FIG. 23). Without moving the first operating member 21 in the opposite direction, as seen in FIGS. 25 and 26, the first operating member 21 can be moved in a progressive movement from the intermediate operating position to the additional operating position. In this way, the first operating member 21 is movably arranged with respect to the base 20 to activate the first electric switch SW1 as the first operating member 21 moves from the non-operated position to the intermediate operating position, and then activate the second electric switch SW2 as the first operating member 21 moves from the intermediate operating position to an additional operating position. In particular, as seen in FIGS. 25 and 26, the first operating member 21 is configured to move the second operating member 22 as the first operating member 21 moves from the intermediate operating position to the additional operating position such the first operating member 21 activates the second electric switch SW2 by movement of the second operating member 22. Thus, as seen in FIGS. 25 and 26, the first operating member 21 is movably arranged with respect to the base 20 to activate the second electric switch SW2 as the first operating member 21 moves from the intermediate operating position to the additional operating position while the first electric switch SW1 remains activated.

Figure 27:
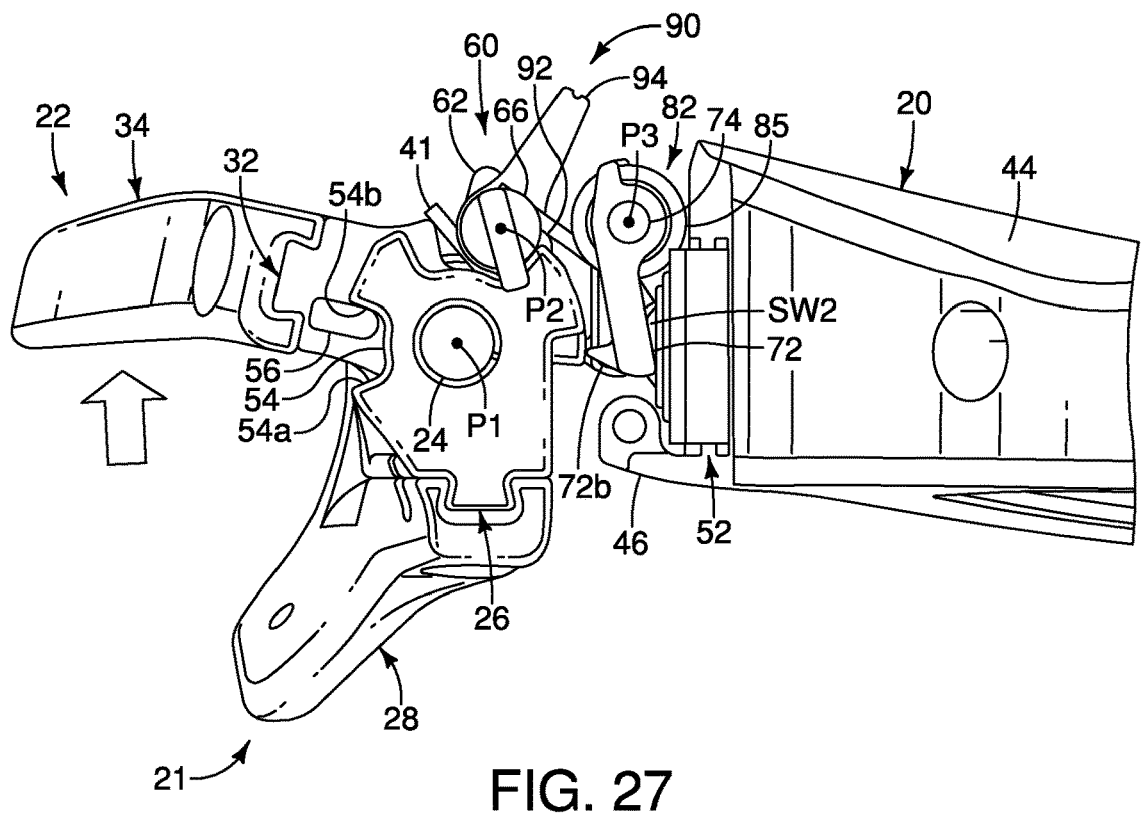
FIGS. 27 and 28 are partial isometric views, similar to FIGS. 15 and 16, of the portion of the right operating device but where the second operating member has been moved to a first activation position (an intermediate operating position) to activate the second electric switch while in the long stroke mode.
Figure 28:
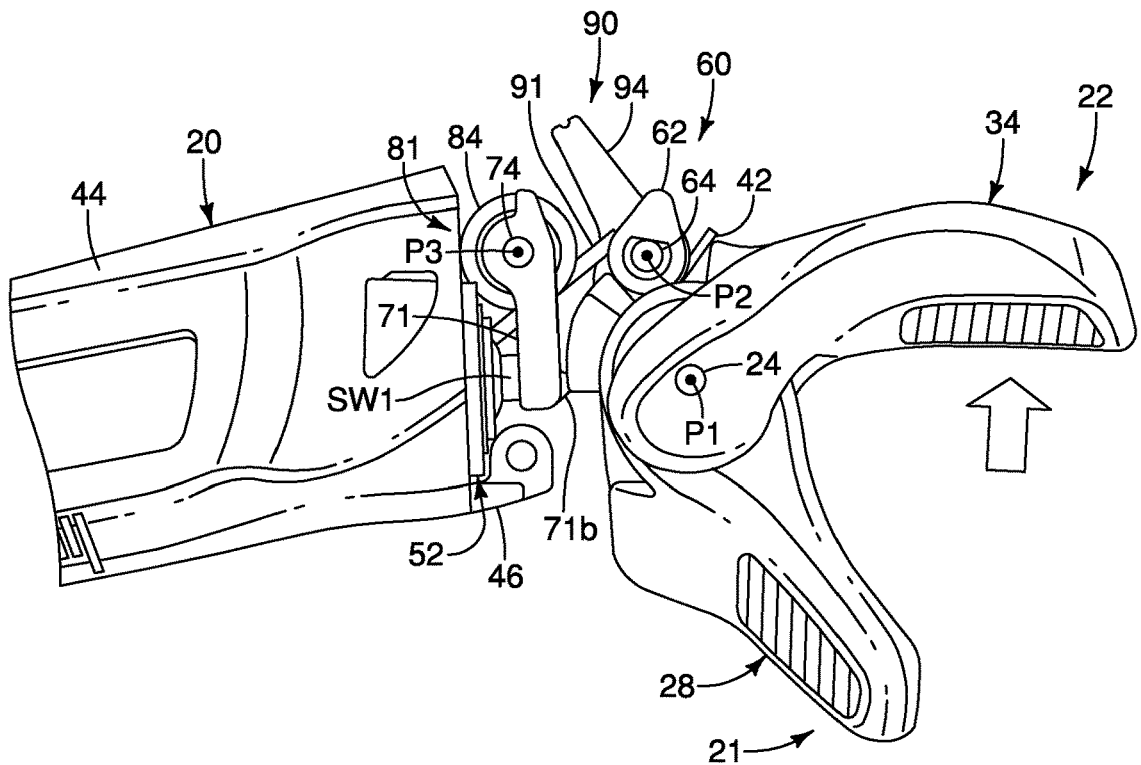
Figure 29:
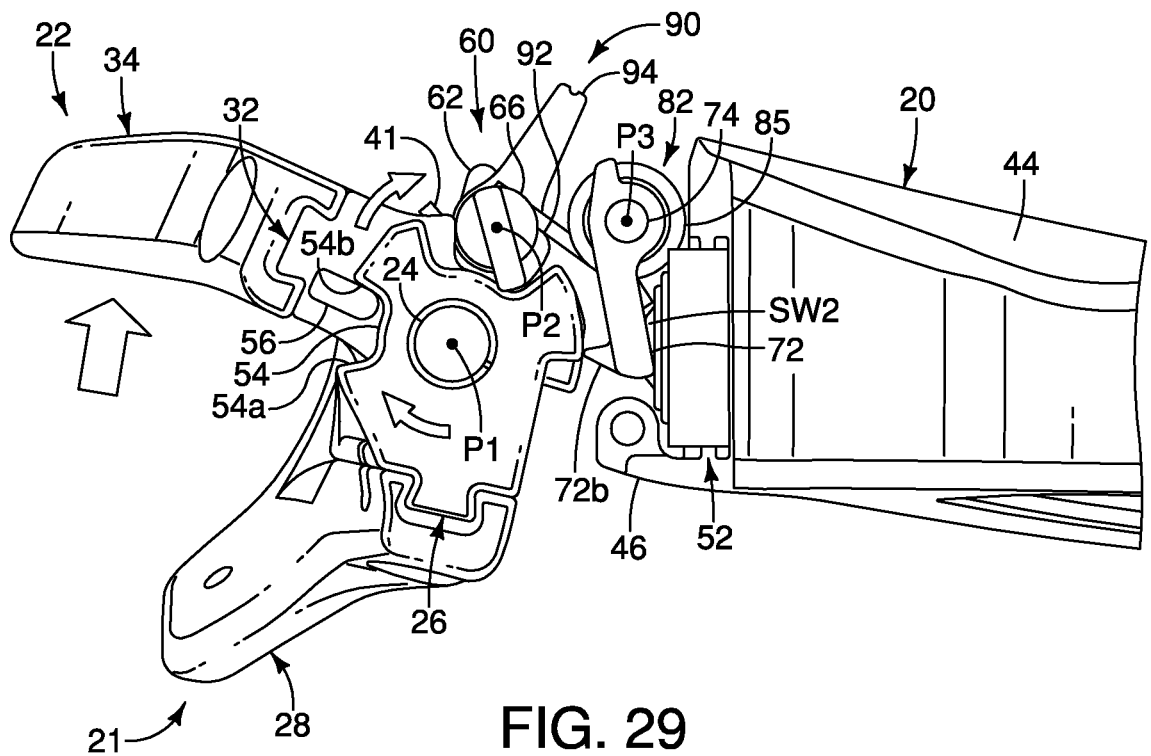
FIGS. 29 and 30 are partial isometric views, similar to FIGS. 15 and 16, of the portion of the right operating device but where the second operating member has been moved to a second activation position (an additional operating position) to activate both the first electric switch and the second electric switch while in the long stroke mode.
Figure 30:
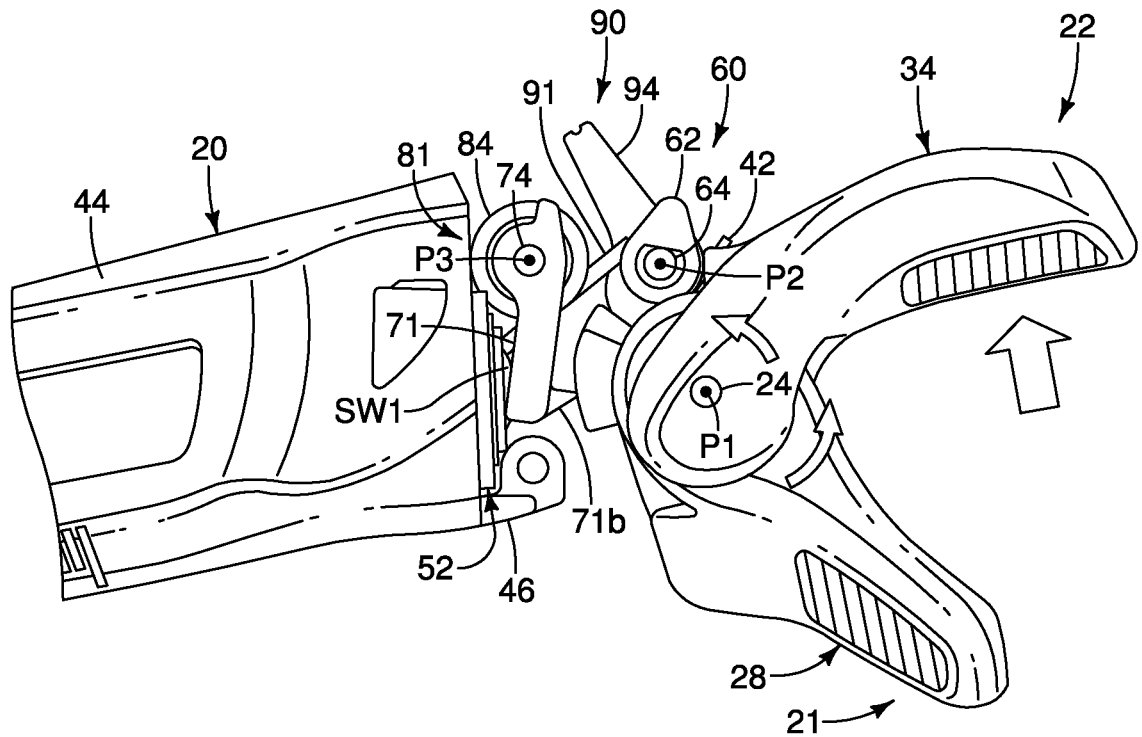
Figure 31:
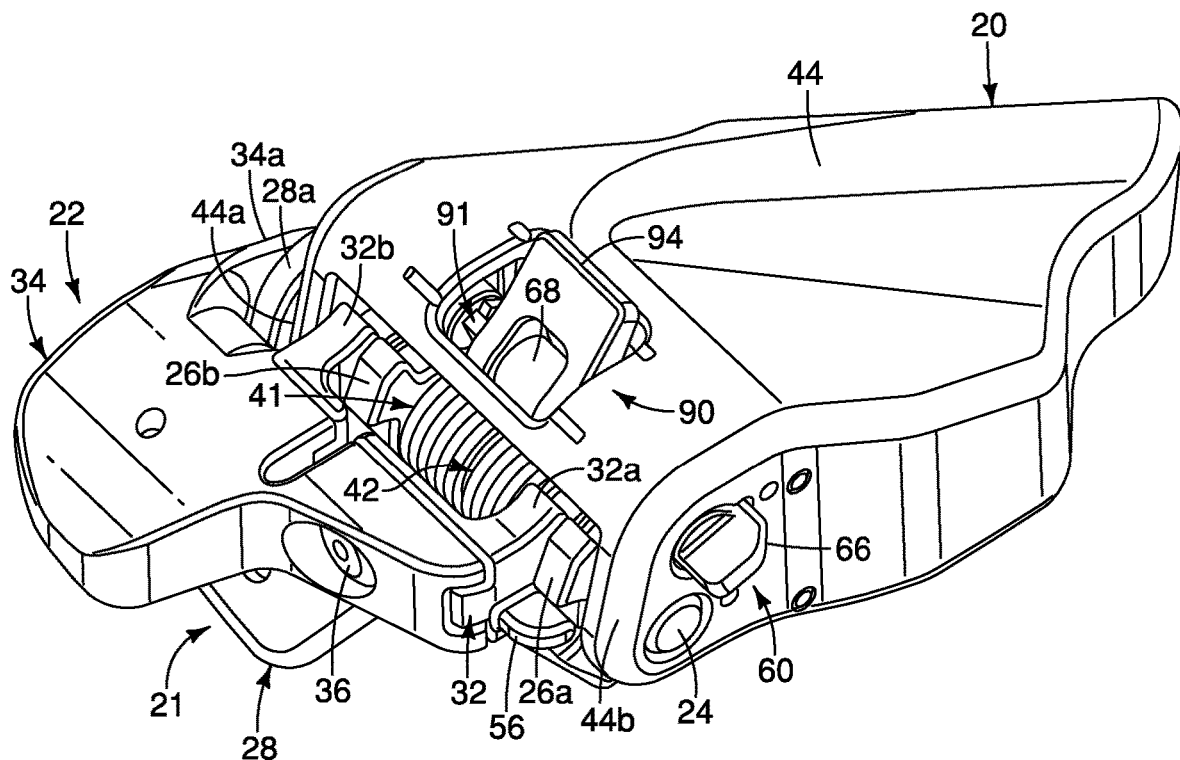
FIG. 31 is an isometric view of the right operating device illustrated in FIGS. 4 to 30 in which an operating load adjuster of the right operating device is set to a low operating load mode.
Figure 32:
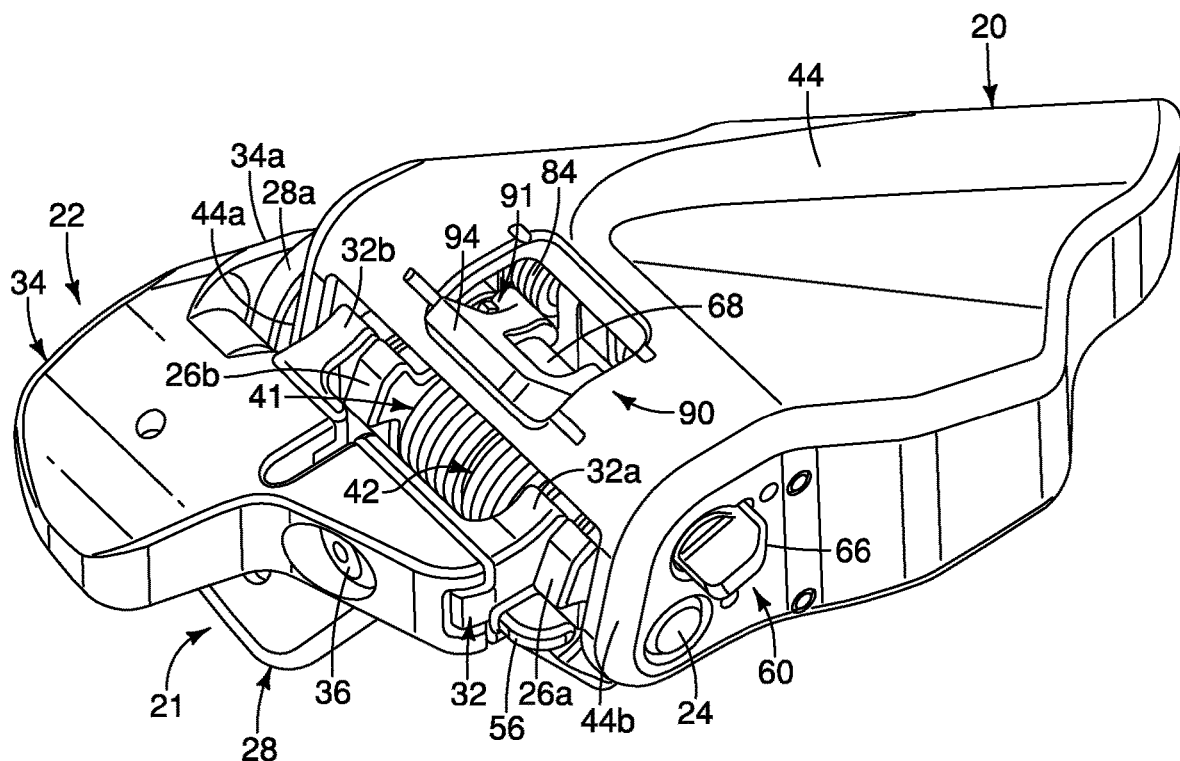
FIG. 32 is an isometric view, similar to FIG. 31, of the right operating device in which the operating load adjuster of the right operating device is set to a high operating load mode.

In FIGS. 27 and 28, the second operating member 22 has been moved to the intermediate operating position to activate the second electric switch SW2 (FIG. 27), while the first operating member 21 remains stationary (FIG. 28). Without moving the second operating member 22 in the opposite direction, as seen in FIGS. 29 and 30, the second operating member 22 can be moved in a progressive movement from the intermediate operating position to the additional operating position. In this way, the second operating member 22 is movably arranged with respect to the base 20 to activate the second electric switch SW2 as the second operating member 22 moves from a non-operated position to an intermediate operating position, and then activate the first electric switch SW1 as the second operating member 22 moves from the intermediate operating position of the second operating member 22 to an additional operating position. In particular, as seen in FIGS. 29 and 30, the second operating member 22 is configured to move the first operating member 21 as the second operating member 22 moves from the intermediate operating position to the additional operating position such the second operating member 22 activates the first electric switch SW1 by movement of the first operating member 21. Thus, as seen in FIGS. 29 and 30, the second operating member 22 movably arranged with respect to the base 20 to activate the first electric switch SW1 as the second operating member 22 moves from the intermediate operating position of the second operating member 22 to the additional operating while the second electric switch SW2 remains activated.

Referring to FIGS. 6, 18, 33 and 34, the operating device 10A further comprises a first clicker 71. The first clicker 71 is movably operatively disposed between the first operating member 21 and the first electric switch SW1. As seen in FIG. 18, the first clicker 71 is moved to activate the first electric switch SW1 by movement of the first operating member 21. In other words, when a user pivots the first operating member 21 from the rest position to the intermediate operating position, the first clicker 71 is moved to activate the first electric switch SW1. Here, the first clicker 71 is pivotally mounted relative to the base 20 about a pivot axle 74. The pivot axle 74 defines a third pivot axis P3 that is parallel to the first pivot axis P1 and the second pivot axis P2. Thus, the first clicker 71 is pivoted by the pivotal movement of the first operating member 21 to activate the first electric switch SW1. Also, the first clicker 71 can be pivoted by the pivotal movement of the second operating member 22 to activate the first electric switch SW1 when the second operating member 22 is pivoted to the additional operating position.

Referring to FIGS. 6, 27, 35 and 36, the operating device 10A further a second clicker 72. The second clicker 72 is movably operatively disposed between the second operating member 22 and the second electric switch SW2. As seen in FIG. 27, the second clicker 72 is moved to activate the second electric switch SW2 by movement of the second operating member 22. In other words, when a user pivots the second operating member 22 from the rest position to the intermediate operating position, the second clicker 72 is moved to activate the second electric switch SW2. Here, the second clicker 72 is pivotally mounted relative to the base 20 about the pivot axle 74. Thus, the second clicker 72 is pivoted by the pivotal movement of the second operating member 22 to activate the second electric switch SW2. Also, the second clicker 72 can be pivoted by the pivotal movement of the first operating member 21 to activate the second electric switch SW2 when the first operating member 21 is pivoted to the additional operating position.

Figure 33:
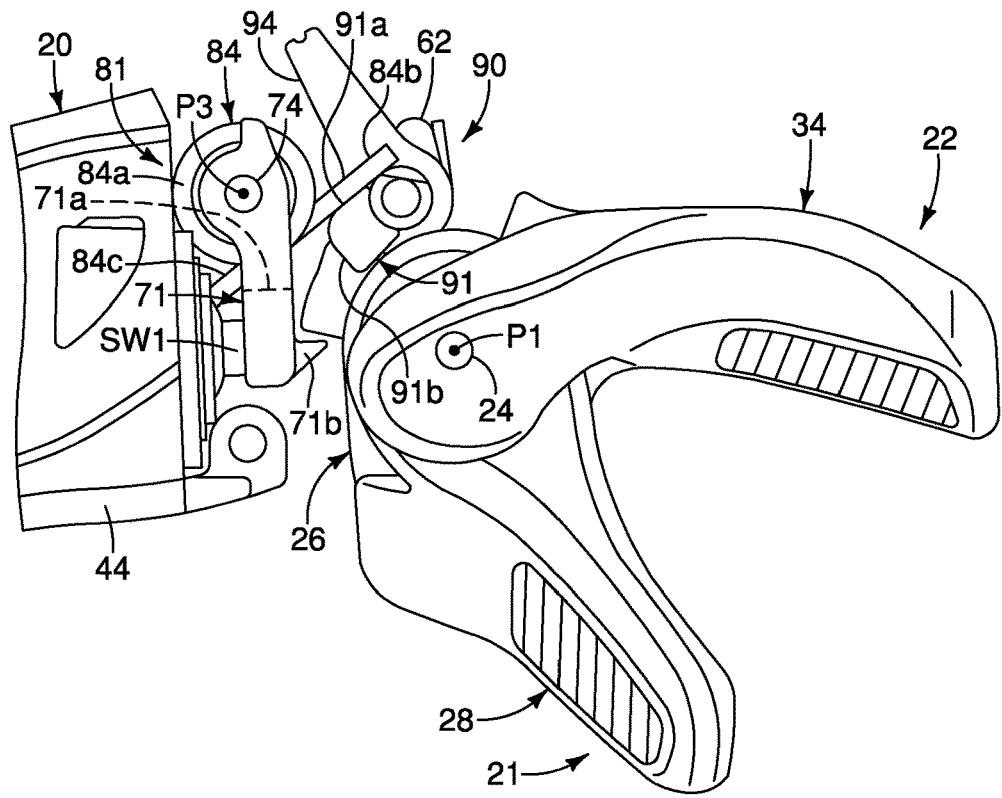
FIG. 33 is an isometric view of the right operating device illustrated in FIGS. 4 to 32 in which a portion of the base has been broken away to reveal a first load generator and the operating load adjuster that is set to the low operating load mode.
Figure 34:
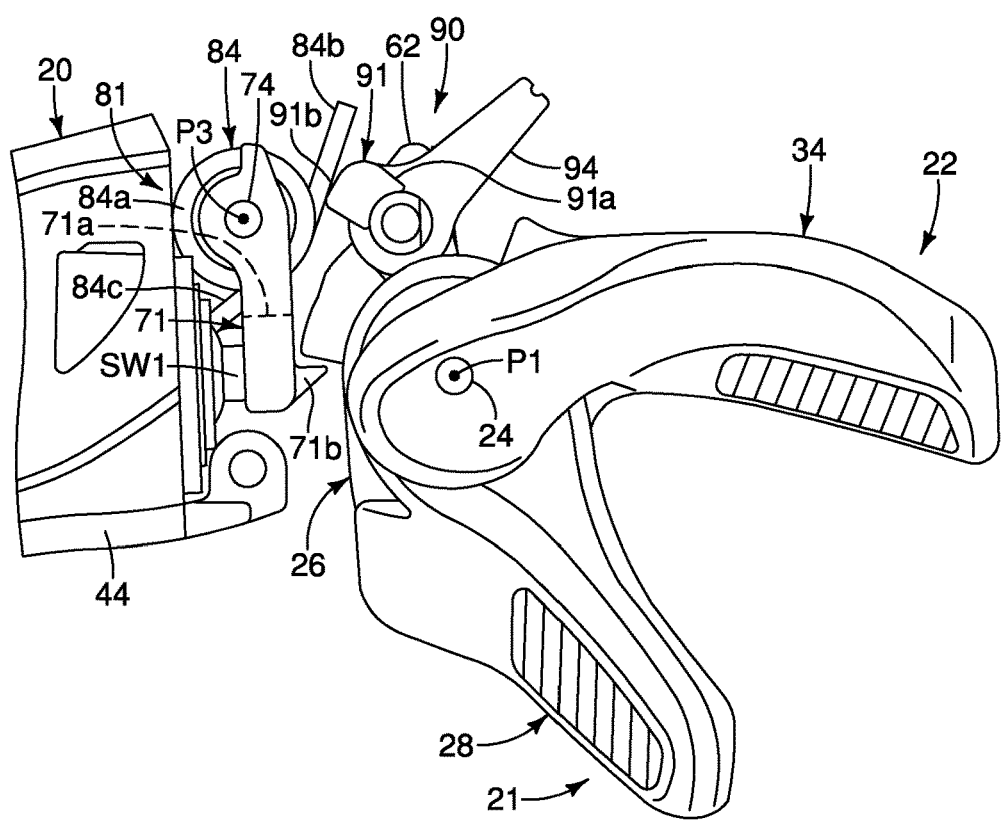
FIG. 34 is an isometric view, similar to FIG. 33, of the right operating device in which the operating load adjuster is set to the high operating load mode.

Referring to FIGS. 33 and 34, the operating device 10A further comprises a first load generator 81. The first load generator 81 is configured to generate an operating load applied to the first operating member 21. In the illustrated embodiment, the first load generator 81 is provided without applying a biasing force to the first operating member 21 until after the first operating member 21 is operated. In particular, the first load generator 81 is operatively disposed between the base 20 and the first clicker 71 to generate an operating load that is applied to the first clicker 71. Thus, when a user pivots the first operating member 21, the first operating member 21 contacts the first clicker 71 and the operating load generated by the first load generator 81 is applied to the first operating member 21. Accordingly, the operating force applied to the first operating member 21 by a user needs to overcome the operating load generated by the first load generator 81 to pivot the first clicker 71 to activate the first electric switch SW1. Also, as mentioned above, the first clicker 71 can be pivoted by the pivotal movement of the second operating member 22 to activate the first electric switch SW1 when the second operating member 22 is pivoted to the additional operating position. Thus, the operating load generated by the first load generator 81 is also applied to the second operating member 22 when the second operating member 22 is pivoted to the additional operating position.

Figure 35:
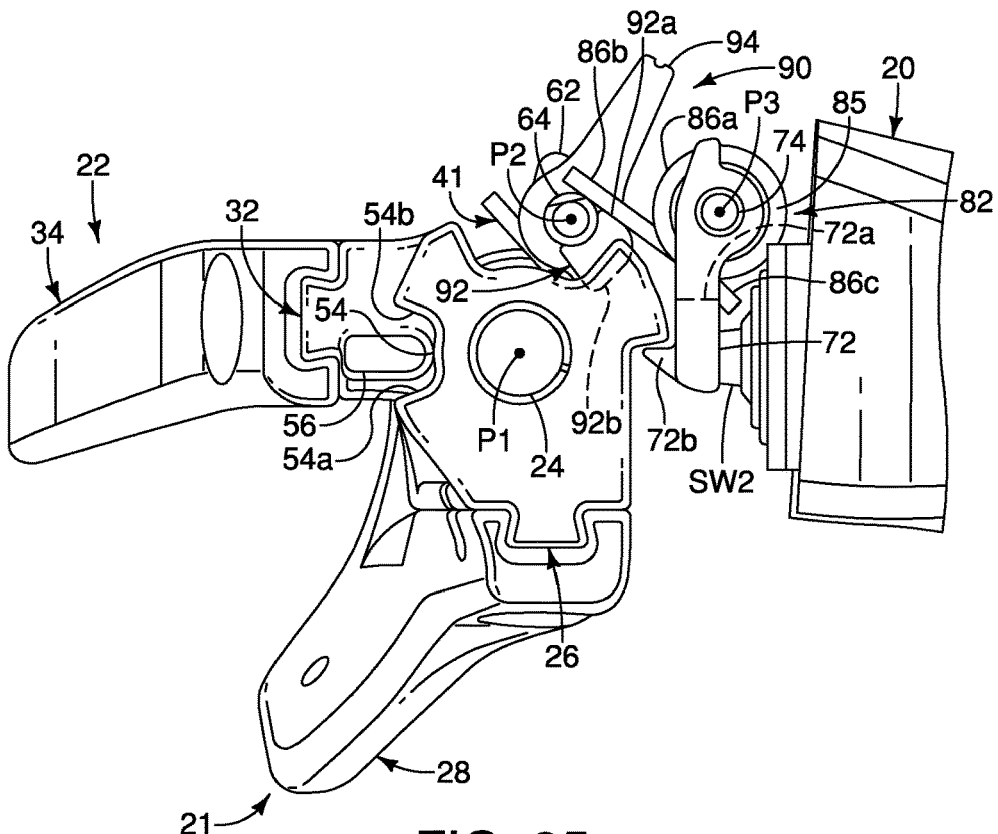
FIG. 35 is an isometric view of the right operating device illustrated in FIGS. 4 to 34 in which a portion of the base has been broken away to reveal a second load lead generator and the operating load adjuster that is set to the low operating load mode.
Figure 36:
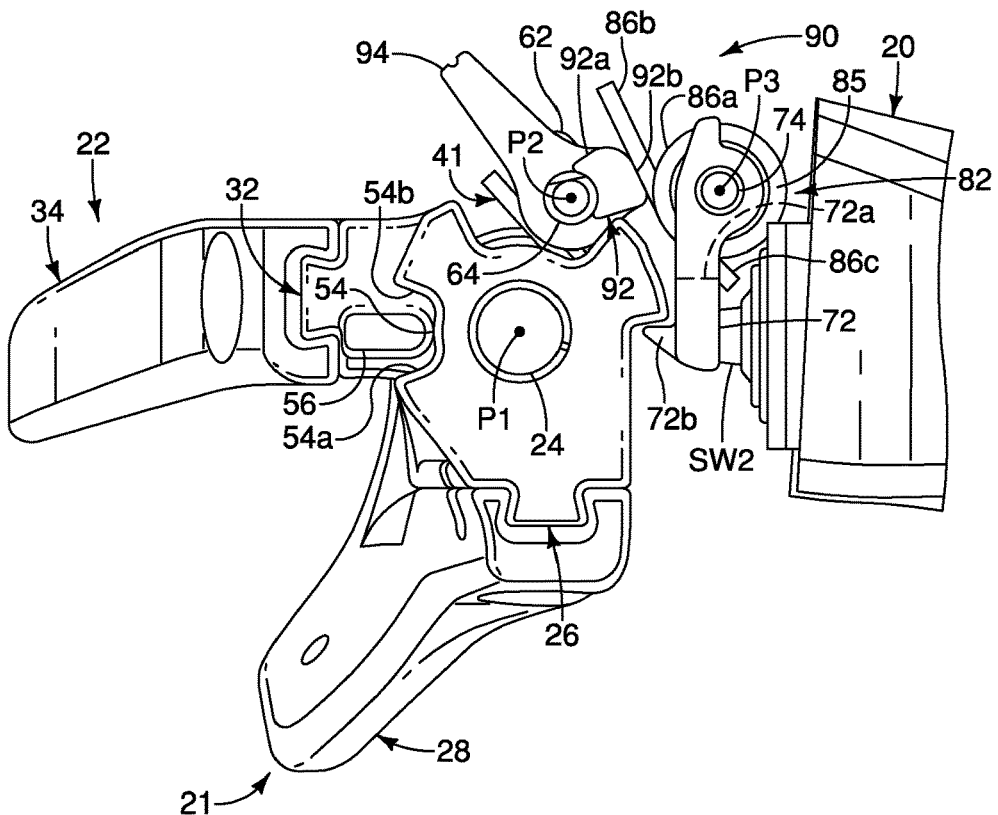
FIG. 36 is an isometric view, similar to FIG. 35, of the right operating device in which the operating load adjuster is set to the high operating load mode.
Figure 37:
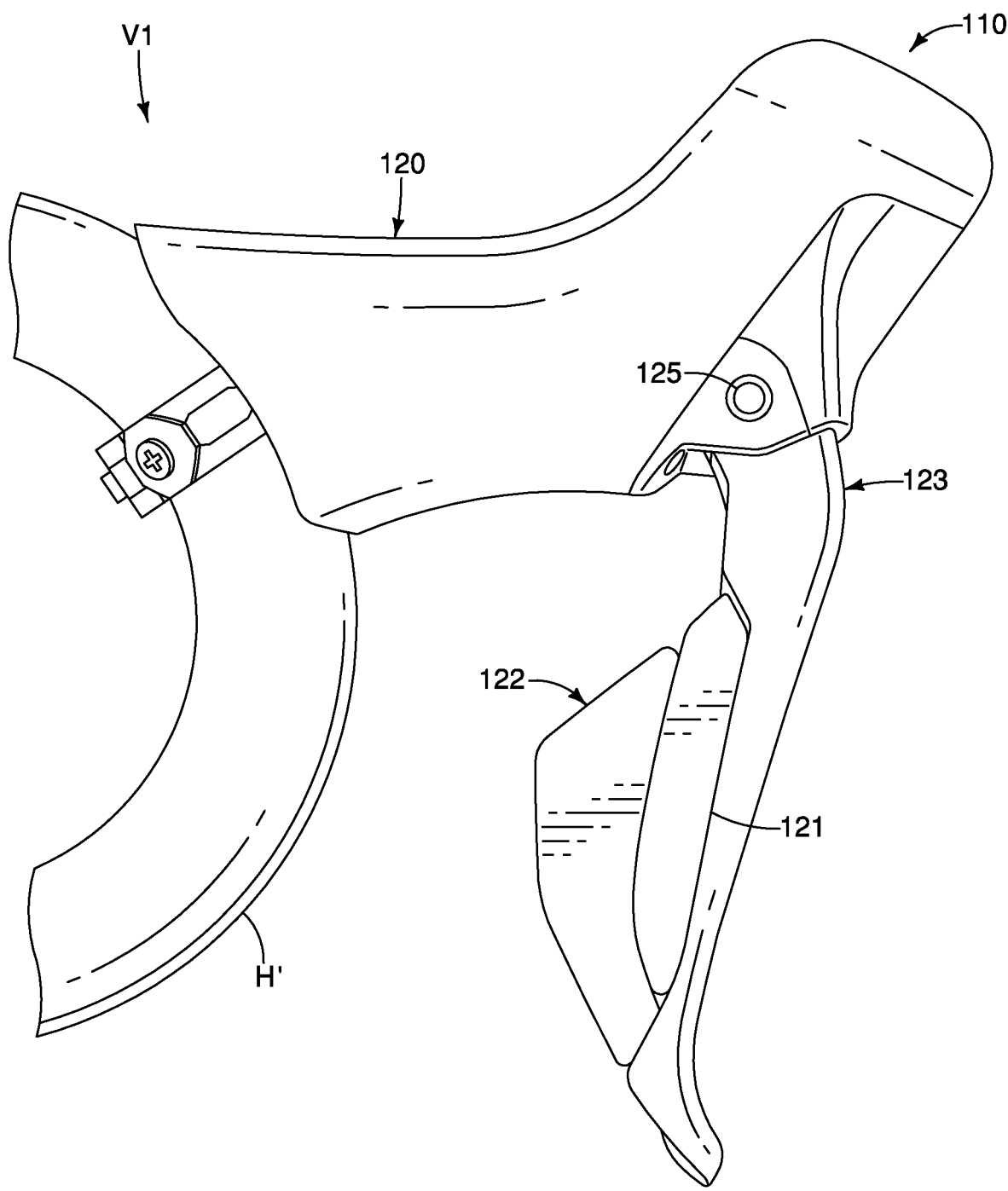
FIG. 37 is an outside elevational view of a portion of a handlebar and an operating device that is equipped with a load generator and an operating load adjuster in accordance with another embodiment.
Figure 38:
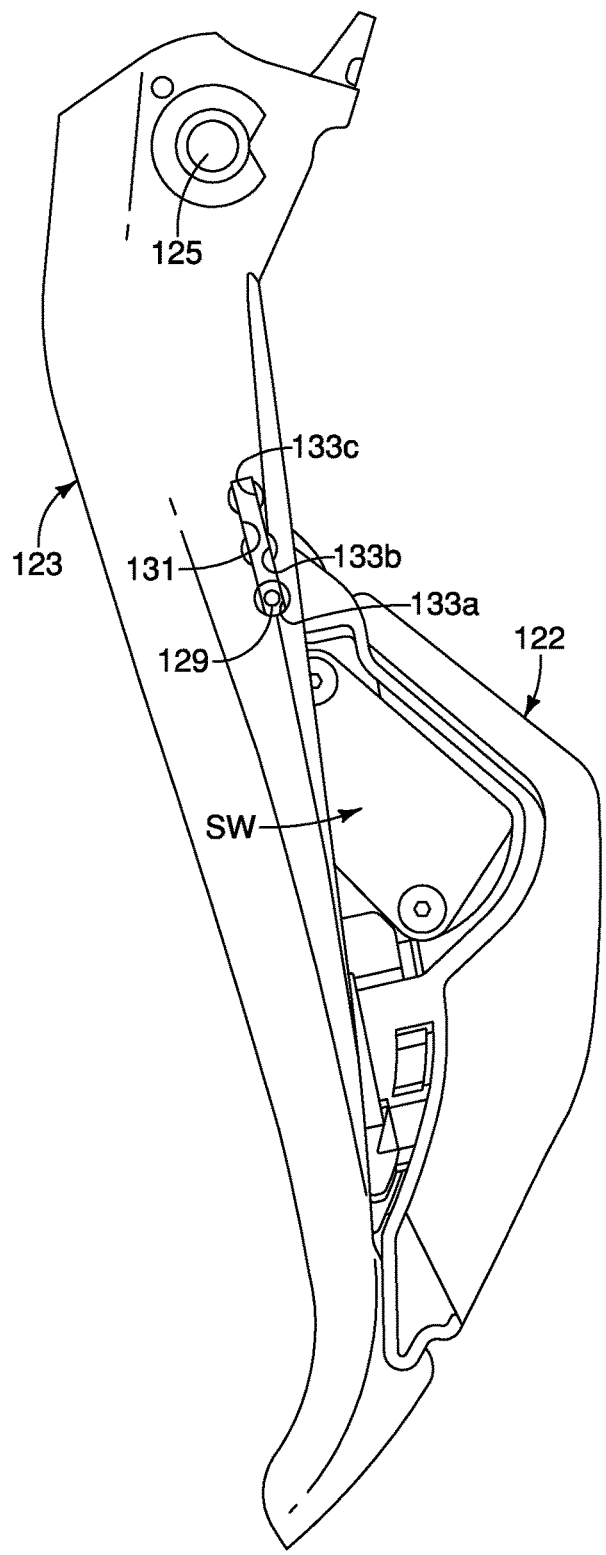
FIG. 38 is an inside elevational view of an operating portion of the operating device illustrated in FIG. 37.

Referring to FIGS. 35 and 36, here, the operating device 10A further comprises a second load generator 82. The second load generator 82 is configured to generate an operating load applied to the second operating member 22. In the illustrated embodiment, the second load generator 82 is provided without applying a biasing force to the second operating member 22 until after the second operating member 22 is operated. In particular, the second load generator 82 is operatively disposed between the base 20 and the second clicker 72 to generate an operating load that is applied to the second clicker 72. Thus, when a user pivots the second operating member 22, the second operating member 22 contacts the second clicker 72 and the operating load generated by the second load generator 82 is applied to the second operating member 22. Accordingly, the operating force applied to the second operating member 22 by a user needs to overcome the operating load generated by the second load generator 82 to pivot the second clicker 72 to activate the second electric switch SW2. Also, as mentioned above, the second clicker 72 can be pivoted by the pivotal movement of the first operating member 21 to activate the second electric switch SW2 when the first operating member 21 is pivoted to the additional operating position. Thus, the operating load generated by the second load generator 82 is also applied to the first operating member 21 when the first operating member 21 is pivoted to the additional operating position.

In the illustrated embodiment, the first load generator 81 includes a first torsion spring 84. Thus, the first torsion spring 84 is configured to generate the operating load that is applied to the first clicker 71. The first torsion spring 84 biases the first clicker 71 away from the first electric switch SW1. The operating load of the first torsion spring 84 is applied to the first operating member 21 when the first operating member 21 is pivoted to the intermediate operating position such that the first clicker 71 is pivoted to activate the first electric switch SW1. The operating load of the first torsion spring 84 is also applied to the second operating member 22 when the second operating member 22 is pivoted to the additional operating position such that the first clicker 71 is pivoted to activate the first electric switch SW1.

Also, in the illustrated embodiment, the second load generator 82 includes a second torsion spring 86. The second torsion spring 86 biasing the second clicker 72 away from the second electric switch SW2. Thus, the second torsion spring 86 is configured to generate the operating load that is applied to the second clicker 72. The operating load of the second torsion spring 86 is applied to the second operating member 22 when the second operating member 22 is pivoted to the intermediate operating position such that the second clicker 72 is pivoted to activate the second electric switch SW2. The operating load of the second torsion spring 86 is also applied to the first operating member 21 when the first operating member 21 is pivoted to the additional operating position such that the second clicker 72 is pivoted to activate the second electric switch SW2.

Each of the first torsion spring 84 and the second torsion spring 86 has a coiled portion supported on the pivot axle 74 that is coupled to the base 20. In particular, the first torsion spring 84 has a coiled portion 84*a* disposed around the pivot axle 74, a first leg portion 84*b* contacting an operating load adjuster 90 and a second leg portion 84*c* contacting the first clicker 71. The second torsion spring 86 has a coiled portion 86*a* disposed around the pivot axle 74, a first leg portion 86*b* contacting the operating load adjuster 90 and a second leg portion 86*c* contacting the second clicker 72.

In the illustrated embodiment, the first clicker 71 includes a first recess 71*a*. The coiled portion 84*a* of the first torsion spring 84 is disposed in the first recess 71*a* of the first clicker 71. Likewise, the second clicker 72 includes a second recess 72*a*. The coiled portion 86*a* of the second torsion spring 86 is disposed in the second recess 72*a* of the second clicker 72. The first clicker 71 also includes a first contact part 71*b* that is normally spaced from the first operating member 21 and the second operating member 22. The first operating member 21 contacts the first contact part 71*b* to pivot the first clicker 71 when the first operating member 21 is pivoted to the intermediate operating position. Also, the second operating member 22 contacts the first contact part 71*b* to pivot the first clicker 71 when the second operating member 22 is pivoted to the additional operating position. Likewise, the second clicker 72 includes a second contact part 72*b* that is normally spaced from the first operating member 21 and the second operating member 22. The second operating member 22 contacts the second contact part 72b to pivot the second clicker 72 when the second operating member 22 is pivoted to the intermediate operating position. Also, the first operating member 21 contacts the second contact part 72b to pivot the second clicker 72 when the first operating member 21 is pivoted to the additional operating position.

Referring to FIGS. 31 to 36, the operating device 10A further comprises the operating load adjuster 90. The operating load adjuster 90 is pivotally mounted on the pivot axle 74. The operating load adjuster 90 is disposed between the first torsion spring 84 and the second torsion spring 86. Basically, the operating load adjuster 90 is configured to adjust the operating load of the first torsion spring 84 of the first load generator 81, and is configured to adjust the operating load of the second torsion spring 86 of the second load generator 82. In other words, the operating load adjuster 90 is configured to adjust the operating load applied to the first clicker 71 by the first torsion spring 84 and to adjust the operating load applied to the second clicker 72 by the second torsion spring 86.

For the first load generator 81, the operating load adjuster 90 is configured to adjust a transition of the operating load from a first load transition to a second load transition that is different from the first load transition. Here, to adjust a transition of the operating load from the first load transition to the second load transition for the first load generator 81, the operating load adjuster 90 includes a first cam part 91. For the second load generator 82, the operating load adjuster 90 is configured to adjust a transition of the operating load from a third load transition to a fourth load transition different from the third load transition. Here, to adjust a transition of the operating load from the third load transition to the fourth load transition for the second load generator 82, the operating load adjuster 90 includes a second cam part 92. The operating load adjuster 90 further includes an operating part 94 that protrudes outwardly relative to the first cam part 91. In the illustrated embodiment, the operating part 94 protrudes outwardly relative to the first cam part 91 and the second cam part 92. By pivoting the operating load adjuster 90 on the pivot axle 74, the operating load applied to the first operating member 21 by the first torsion spring 84 is either increased or decreased by changing the engagement of the first cam part 91 with the first torsion spring 84. Also, by pivoting the operating load adjuster 90 on the pivot axle 74, the operating load applied to the second operating member 22 by the second torsion spring 86 is either increased or decreased by changing the engagement of the second cam part 92 with the second torsion spring 86.

In the illustrated embodiment, the first cam part 91 contacts the first load generator 81. The first cam part 91 is pivotally arranged with respect to the base 20 about the third pivot axis P3 between a first orientation and a second orientation. The first orientation of the first cam part 91 establishes the first load transition and the second orientation of the first cam part 91 establishes the second load transition. Stated differently, the first cam part 91 establishes the first load transition where the first cam part 91 is in the first orientation, and the first cam part 91 establishes the second load transition where the first cam part 91 is in the second orientation. More specifically, the first cam part 91 includes a first contact surface 91a and a second contact surface 91b. The first contact surface 91a contacts the first load generator 81 where the first cam part 91 is in the first orientation. The second contact surface 91b contacts the first load generator 81 where the first cam part 91 is in the second orientation. As seen FIGS. 33 and 34, each of the first contact surface 91a and the second contact surface 91b includes a flat contact surface that selectively contacts the first load generator 81. The first contact surface 91a is closer to the third pivot axis P3 than the second contact surface 91b. In the way, the operating load of the first torsion spring 84 is increased when the first leg portion 84b contacts the second contact surface 91b as compared to when the first leg portion 84b contacts the first contact surface 91a.

In the illustrated embodiment, the second cam part 92 contacts the second load generator 82. The second cam part 92 is pivotally arranged with respect to the base 20 about the third pivot axis P3 between a first orientation and a second orientation. The first orientation of the second cam part 92 establishes the third load transition and the second orientation of the second cam part 92 establishes the fourth load transition. Stated differently, the second cam part 92 establishes the third load transition where the second cam part 92 is in the first orientation, and the second cam part 92 establishes the fourth load transition where the second cam part 92 is in the second orientation. More specifically, the second cam part 92 includes a third contact surface 92a and a fourth contact surface 92b. The third contact surface 92a contacts the second load generator 82 where the second cam part 92 is in the first orientation. The fourth contact surface 92b contacts the second load generator 82 where the second cam part 92 is in the second orientation. As seen FIGS. 35 and 36, each of the third contact surface 92a and the fourth contact surface 92b includes a flat contact surfaces that selectively contacts the second load generator 82. The third contact surface 92a is closer to the third pivot axis P3 than the fourth contact surface 92b. In the way, the operating load of the second torsion spring 86 is increased when the first leg portion 86b contacts the fourth contact surface 92b as compared to when the first leg portion 86b contacts the third contact surface 92a.

Referring now to FIGS. 37 to 41, an operating device 110 is illustrated for a human-powered vehicle V1 (only a portion of a drop handlebar H' is shown). Here, the operating device 110 is configured as a road brifter (i.e. a combined road shifter and brake operating device) in that they are configured to carry out both a braking operation and a shifting operation. The operating device 110 is mounted on a right-hand side on the handlebar H' in a conventional manner. The operating device 110 basically includes a base 120, a first operating member 121, a second operating member 122 and a third operating member 123.

Figure 39:
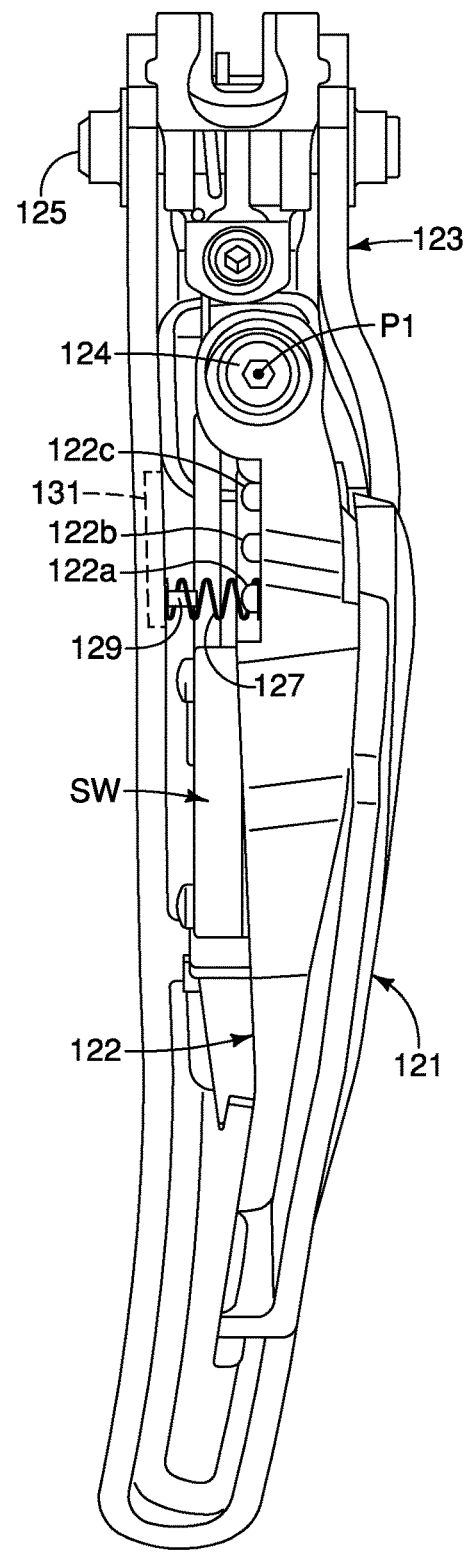
FIG. 39 is a rear view of the operating portion of the operating device illustrated in FIG. 38.

Here, the third operating member 123 is a brake operating lever that is pivotally mounted to the base 120 by a pivot axle 125. As seen in FIG. 39, the first operating member 121 is movably provided on the third operating member 123 to pivot about the first pivot axis P1. In this way, the first operating member 121 is movably arranged with respect to the base 120. The second operating member 122 is also movably provided on the third operating member 123 to pivot about the first pivot axis P1. In this way, the second operating member 122 is movably arranged with respect to the base 120.

Here, the third operating member 123 also has a switch unit SW that includes a first electric switch that is operated by the first operating member 121 and a second electric switch that is operated by the second operating member 122. The first electric switch and the second electric switch of the switch unit SW are conventional push type switches. The first electric switch of the switch unit SW is activated by the pivotal movement of the first operating member 121 to an intermediate operating position. The first operating member 121 also operates the second electric switch of the switch unit SW by pivoting the first operating member 121 past the intermediate operating position to an additional operating position. Here, the pivotal movement of the first operating member 121 causes the second operating member 122 to move with the first operating member 121. On the other hand, the second operating member 122 pivots independently of the first operating member 121, and only operates the second electric switch of the switch unit SW. Each of the first operating member 121 and the second operating member 122 is biased to a non-operated position by a biasing member such as a coil compression spring.

The operating device 110 further includes a compression spring 127 (a biasing element) as a load generator that is configured to generate an operating load applied to the first operating member 121. Here, the compression spring 127 is disposed between the second operating member 122 and the third operating member 123. Thus, the compression spring 127 indirectly generates the operating load that is applied to the first operating member 121 and directly generates the operating load that is applied to the second operating member 122.

Figure 40:
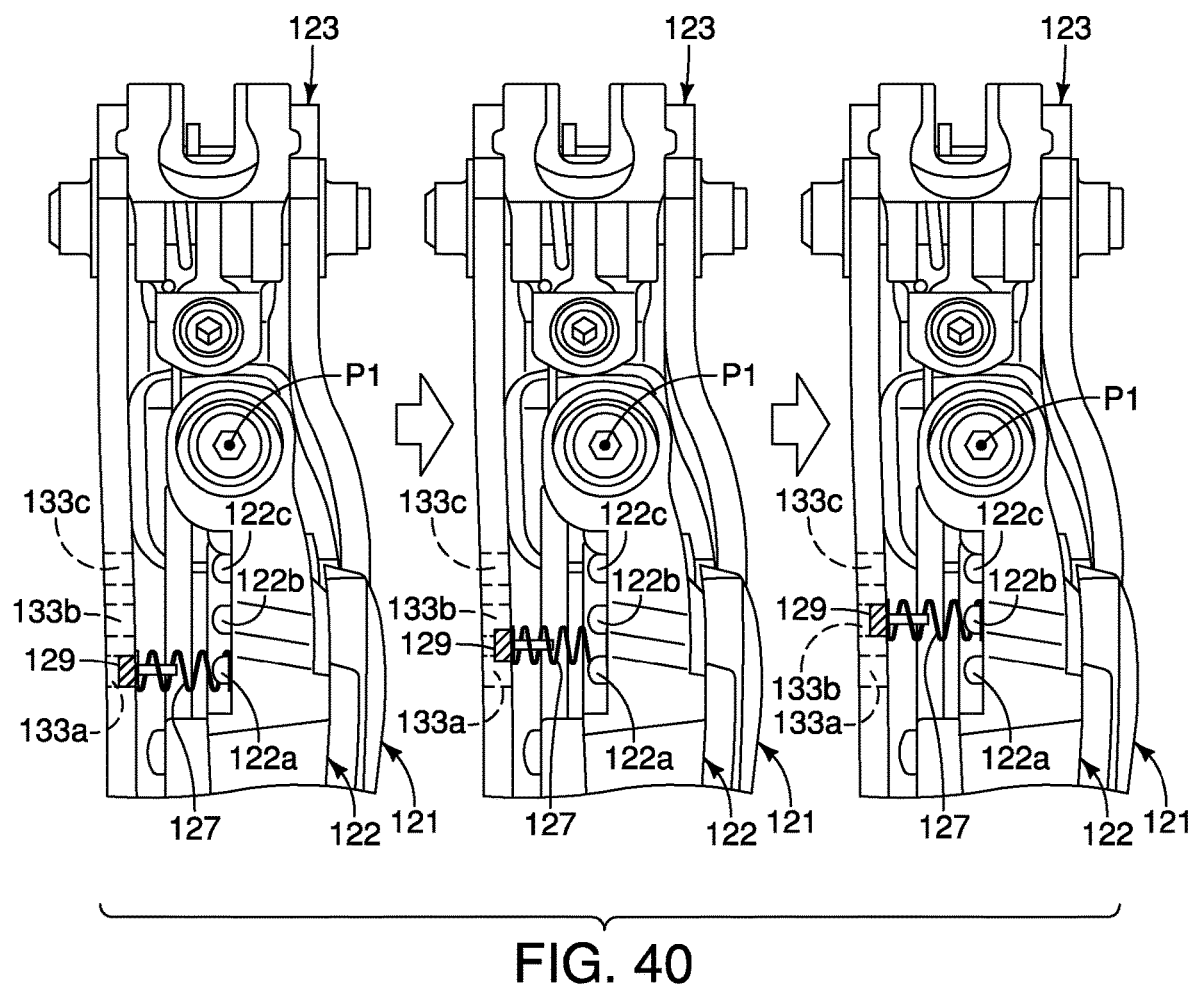
FIG. 40 is a series of partial rear views of the operating portion of the operating device illustrated in FIG. 39 showing an adjustment of the operating load of a first operating member and a second operating member.
Figure 41:
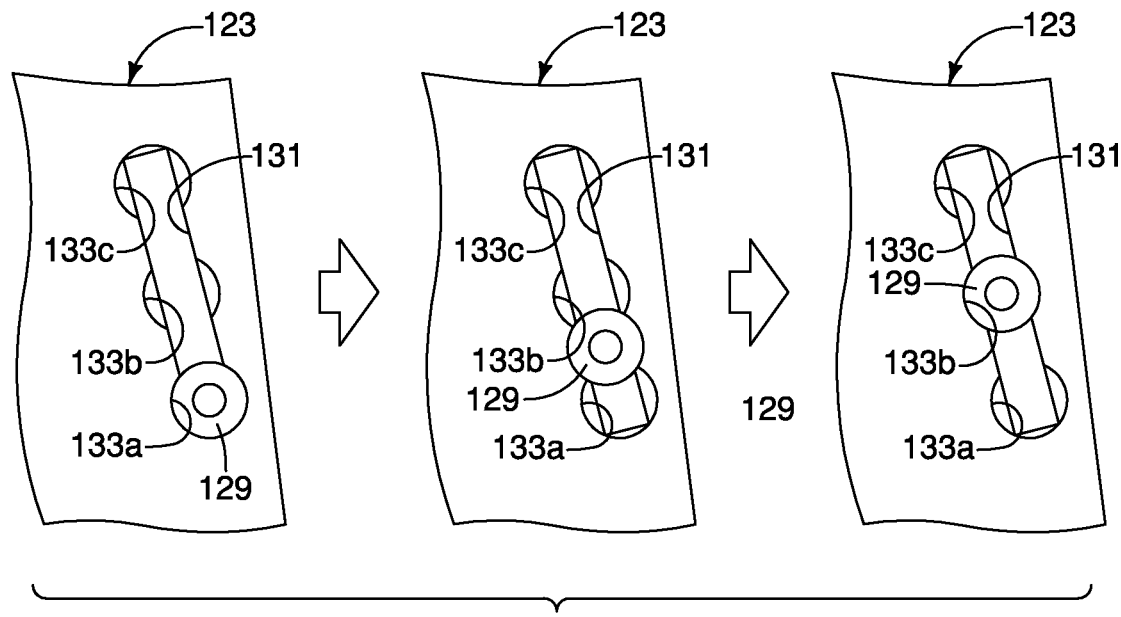
FIG. 41 is a series of partial inside elevational view of the operating portion of the operating device illustrated in FIG. 38.

The operating device 110 further includes an operating load adjuster 129 that is configured to adjust a transition of the operating load from a first load transition to a second load transition. Here, the operating load adjuster 129 is further configured to adjust a transition of the operating load from the second load transition to a third load transition. In particular, the second operating member 122 is provided with a plurality of first spring engagement members 122a, 122b and 122c. Here, the first spring engagement members 122a, 122b and 122c are protrusions that are configured to selectively receive one end of the compression spring 127. The third operating member 123 is provided with a channel 131 and a plurality of second spring engagement members 133a, 133b and 133c. Here, the second spring engagement members 133a, 133b and 133c are recesses that are configured to selectively receive one end of the compression spring 127. The channel 131 intersects with the second spring engagement members 133a, 133b and 133c so the operating load adjuster 129 can be moved from one of the second spring engagement members 133a, 133b and 133c to the next one of the second spring engagement members 133a, 133b and 133 as seen in the middle image of FIGS. 40 and 41. As seen in the left image of FIGS. 40 and 41, the compression spring 127 provides a first operating load to the first operating member 121 and the second operating member 122 by the compression spring 127 being engaged with the first spring engagement member 122a and the second spring engagement member 133a. As seen in the right image of FIGS. 40 and 41, the compression spring 127 provides a second operating load to the first operating member 121 and the second operating member 122 by the compression spring 127 being engaged with the first spring engagement member 122b and the second spring engagement member 133b. When the compression spring 127 is engaged with the first spring engagement member 122c and the second spring engagement member 133c, the compression spring 127 provides a third operating load to the first operating member 121 and the second operating member 122. Accordingly, as illustrated in FIGS. 40 and 41, the operating load to the first operating member 121 and the second operating member 122 increases by moving from a left side state of the compression spring 127 to a right side state of the compression spring 127. In other words, as a user moves the compression spring 127 closer to the first pivot axis P1, the operating load provided by the compression spring 127 to the first operating member 121 and the second operating member 122 increases by moving from the left side state of the compression spring 127 to the right side state of the compression spring 127 in FIGS. 40 and 41.

Figure 42:
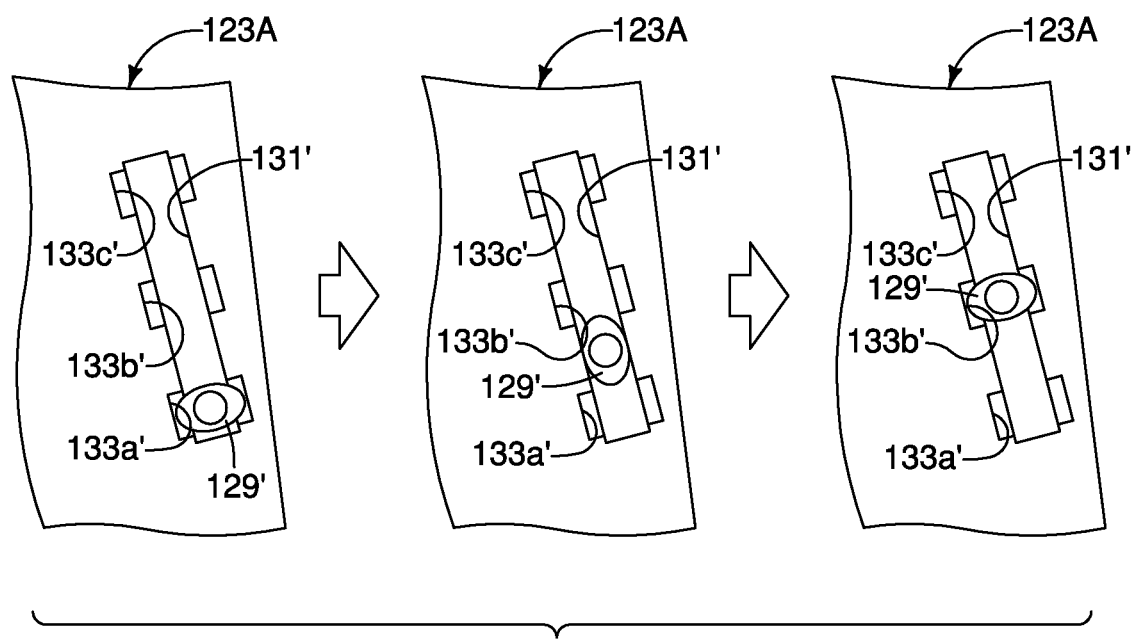
FIG. 42 is a series of partial inside elevational view of a first modified operating lever for the operating device illustrated in FIG. 37.

Referring now to FIG. 42, a modified operating member 123A is illustrated for the operating device 110 in which the operating member 123A is provided a modified operating load adjuster 129' for moving the compression spring 127. Here, the operating member 123A is a brake operating lever that is the same as the third operating member 123 except that the operating member 123A is provided with a channel 131' and a plurality of second spring engagement members 133a', 133b' and 133c'. The operating load adjuster 129' is configured to be rotated ninety degrees from an engagement position shown in the left image of FIG. 42 to a transitioning position shown in the middle image of FIG. 42. Then, the operating load adjuster 129' is rotated again ninety degrees from the transitioning position shown in the middle image of FIG. 42 to the engagement position shown in the right image of FIG. 42. Thus, the operating load to the first operating member 121 and the second operating member 122 can be adjusted in substantially the same way as the embodiment of FIGS. 37 to 41. Accordingly, as illustrated in FIG. 42, the operating load to the first operating member 121 and the second operating member 122 increases by moving from the left side state to the right side state in the same manner as FIGS. 40 and 41.

Figure 43:
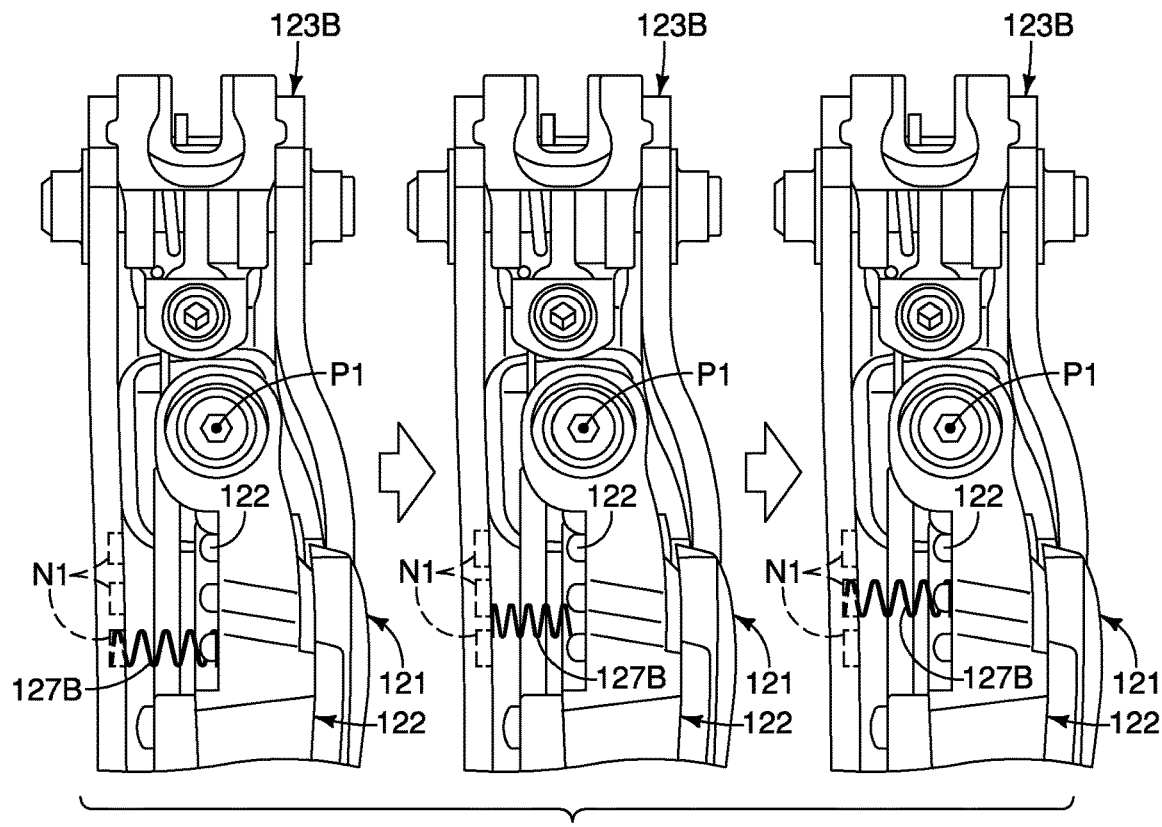
FIG. 43 is a series of partial rear views of a second modified operating lever for the operating device illustrated in FIG. 37 showing a modified adjustment of the operating load of the first operating member and the second operating member.

Referring now to FIG. 43, a modified operating member 123B is illustrated for the operating device 110. The operating member 123B includes the first operating member 121, the second operating member 122 and the switch unit SW of the operating device 110. Here, a compression spring 127B (a biasing element) is provided as a load generator that is configured to generate an operating loads applied to the first operating member 121 and the second operating member 122 in substantially the same way as the embodiment of FIGS. 37 to 41. However, here, the channel 131 and the second spring engagement members 133a, 133b and 133c have been replaced with a plurality of second spring engagement members N1 which are in the form of recesses or notches. Also, here, the operating load adjuster 129 has been omitted. The operating load to the first operating member 121 and the second operating member 122 can be adjusted by a user changing an engagement position of the compression spring 127B with the first spring engagement members 122a, 122b and 122c and the second spring engagement members N1. Accordingly, as illustrated in FIG. 43, the operating load to the first operating member 121 and the second operating member 122 increases by moving from a left side state of the compression spring 127B to a right side state of the compression spring 127B. In other words, as a user moves the compression spring 127B closer to the first pivot axis P1, the operating load provided by the compression spring 127B to the first operating member 121 and the second operating member 122 increases by moving from the left side state of the compression spring 127B to the right side state of the compression spring 127B in FIG. 43.

Figure 44:
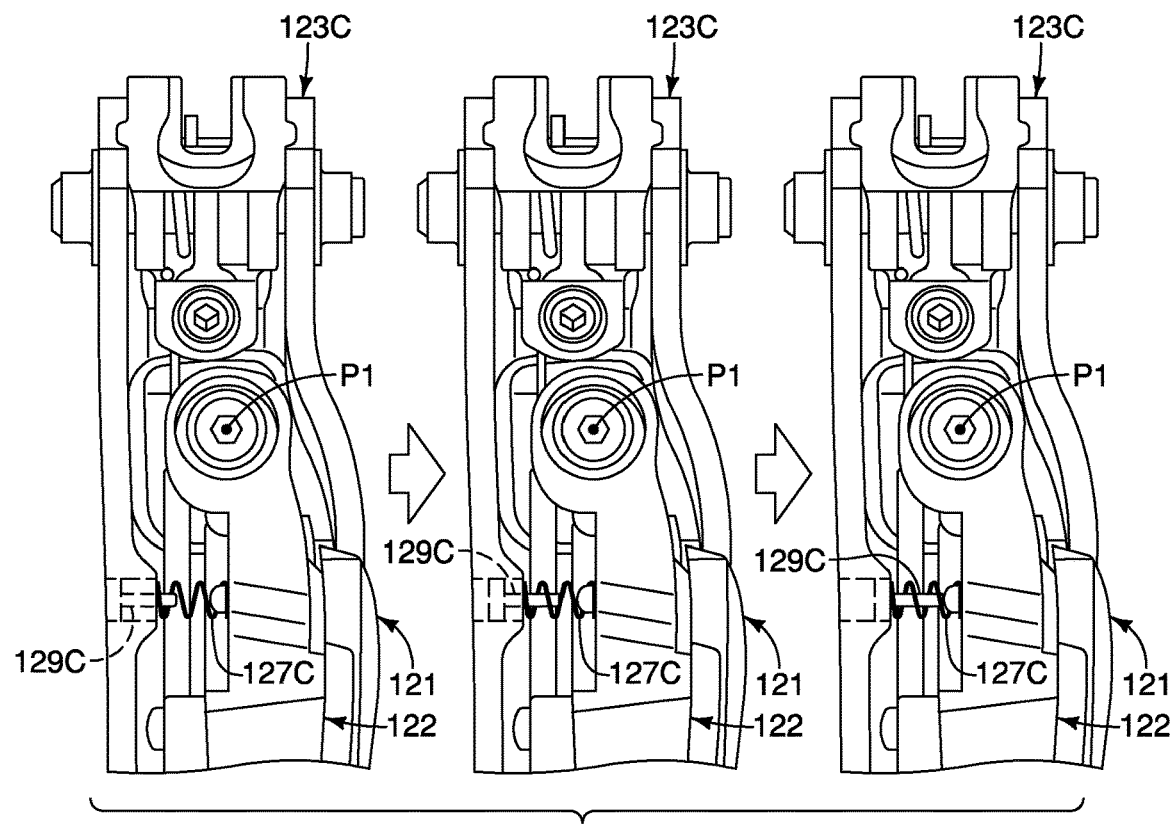
FIG. 44 is a series of partial rear views of a third modified operating lever for the operating device illustrated in FIG. 37 showing a modified adjustment of the operating load of the first operating member and the second operating member.

Referring now to FIG. 44, a modified operating member 123C is illustrated for the operating device 110. The operating member 123C includes the first operating member 121, the second operating member 122 and the switch unit SW of the operating device 110. Here, a compression spring 127C (a biasing element) is provided as a load generator that is configured to generate an operating load applied to the first operating member 121. Also, here, an operating load adjuster 129C is provided to the operating member 123C to adjust the compression amount of the compression spring 127C. In particular, the operating load adjuster 129C is threadedly into a hole in the operating member 123C to adjust the operating load by screwing or unscrewing the operating load adjuster 129C to adjust the compression amount of the compression spring 127C. Accordingly, as illustrated in FIG. 44, the operating load to the first operating member 121 and the second operating member 122 increases by moving from a left side state of the compression spring 127C to a right side state of the compression spring 127C. In other words, as a user screws the operating load adjuster 129C further into the hole in the operating member 123C, the operating load provided by the compression spring 127C to the first operating member 121 and the second operating member 122 increases by moving from the left side state of the compression spring 127C to the right side state of the compression spring 127C in FIG. 44.

Figure 45:
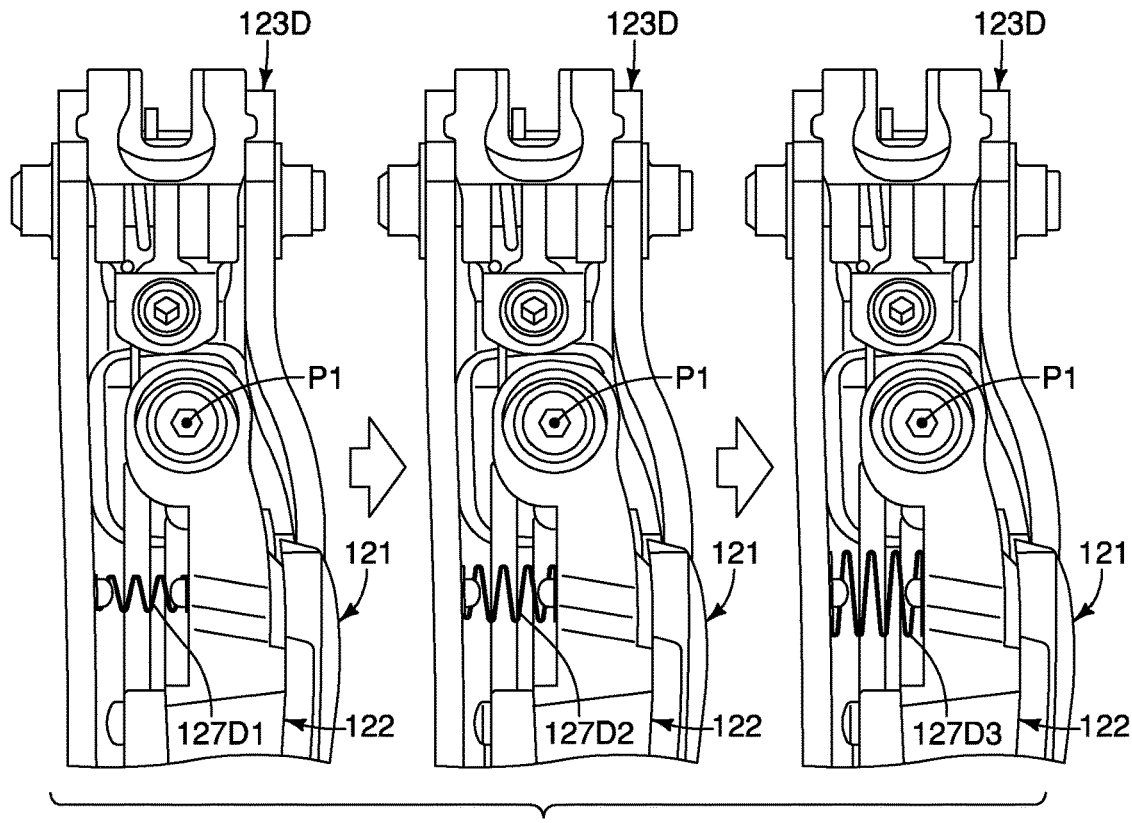
FIG. 45 is a series of partial rear views of a fourth modified operating lever for the operating device illustrated in FIG. 37 showing a modified adjustment of the operating load of the first operating member and the second operating member.

Referring now to FIG. 45, a modified operating member 123D is illustrated for the operating device 110. The operating member 123D includes the first operating member 121, the second operating member 122 and the switch unit SW of the operating device 110. Here, a user can change an operating loads applied to the first operating member 121 and the second operating member 122 by exchanging compression springs 127D1, 127D2 and 127D3. Each of the compression springs 127D1, 127D2 and 127D3 has a different spring force such that different operating loads are generated by exchanging the compression springs 127D1, 127D2 and 127D3. Accordingly, as illustrated in FIG. 45, the operating load to the first operating member 121 and the second operating member 122 by selectively providing one of the compression springs 127D1, 127D2 and 127D3 increases by moving from a left side state of the compression spring 127D1 to a right side state of the compression spring 127D3. In other words, as a user selects a spring with a higher spring force, the operating load provided to the first operating member 121 and the second operating member 122 increases by moving from the left side state of the compression spring 127D1 to the right side state of the compression spring 127D3 in FIG. 45.

Figure 46:
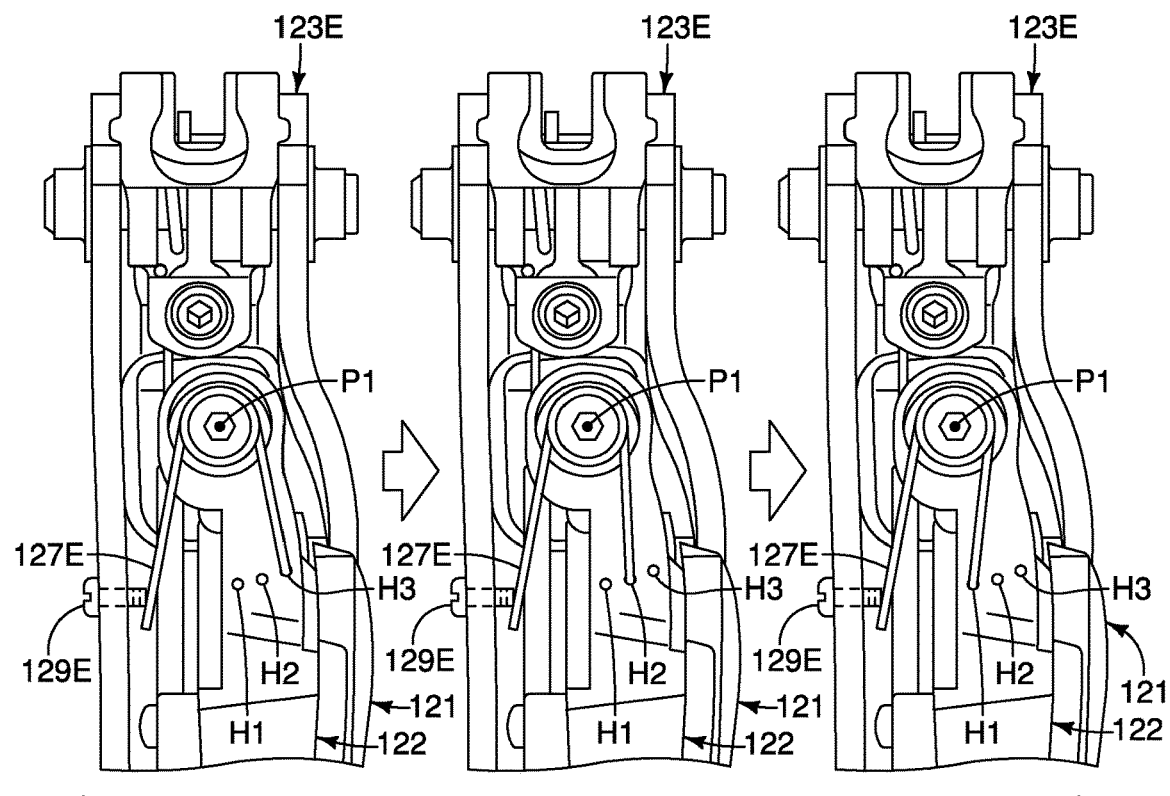
FIG. 46 is a series of partial rear views of a fifth modified operating lever for the operating device illustrated in FIG. 37 showing a modified adjustment of the operating load of the first operating member and the second operating member.

Referring now to FIG. 46, a modified operating member 123E is illustrated for the operating device 110. The operating member 123E includes the first operating member 121, the second operating member 122 and the switch unit SW of the operating device 110. Here, a torsion spring 127E (a biasing element) is provided as a load generator that is configured to generate an operating loads applied to the first operating member 121 and the second operating member 122 in substantially the same way as the embodiment of FIGS. 37 to 41. However, here, the second operating member 122 is provided with a plurality of spring engagement members H1, H2 and H3 in the form of holes, and the operating member 123E is provided with a screw 129E. By changing which one of the spring engagement members H1, H2 and H3 is engaged with the torsion spring 127E, the operating loads applied to the first operating member 121 and the second operating member 122 can be adjusted. To aid in the adjustment of the operating loads, the screw 129E is unscrewed to decrease the biasing force applied to the second operating member 122 by the torsion spring 127E. Accordingly, as illustrated in FIG. 46, the operating load to the first operating member 121 and the second operating member 122 increases by moving from a left side state of the torsion spring 127E to a right side state of the torsion spring 127E. In other words, as a user changes the engagement of the torsion spring 127E with the spring engagement members H1, H2 and H3, the operating load provided by the torsion spring 127E to the first operating member 121 and the second operating member 122 increases by moving from the left side state of the torsion spring 127E to the right side state of the torsion spring 127E in FIG. 46.

Figure 47:
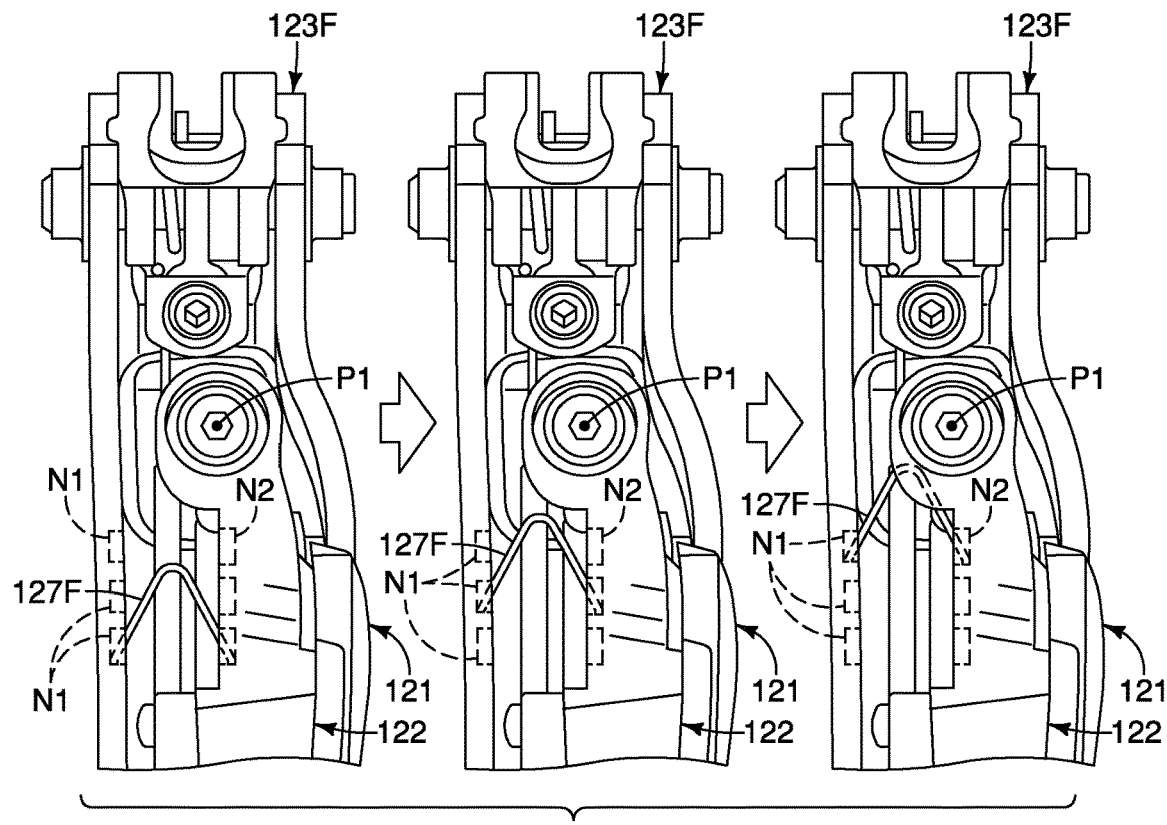
FIG. 47 is a series of partial rear views of a sixth modified operating lever for the operating device illustrated in FIG. 37 showing a modified adjustment of the operating load of the first operating member and the second operating member.

Referring now to FIG. 47, a modified operating member 123F is illustrated for the operating device 110. The operating member 123F includes the first operating member 121, the second operating member 122 and the switch unit SW of the operating device 110. Here, a V-spring 127F (a biasing element) is provided as a load generator that is configured to generate an operating loads applied to the first operating member 121 and the second operating member 122 in substantially the same way as the embodiment of FIGS. 37 to 41. However, here, the operating member 123F is provided with the second spring engagement members N1 (same as the operating member 123B of FIG. 43) in the form of recesses or notches, and the second operating member 122 is provided with a plurality of first spring engagement members N2 in the form of recesses or notches. By changing which ones of the second spring engagement members N1 and the first spring engagement members N2 are engaged with the V-spring 127F, the operating loads applied to the first operating member 121 and the second operating member 122 can be adjusted. Accordingly, as illustrated in FIG. 47, the operating load to the first operating member 121 and the second operating member 122 increases by moving from a left side state of the V-spring 127F to a right side state of the V-spring 127F. In other words, as a user moves the V-spring 127F closer to the first pivot axis P1, the operating load provided by the V-spring 127F to the first operating member 121 and the second operating member 122 increases by moving from the left side state of the V-spring 127F to the right side state of the V-spring 127F in FIG. 47.

Figure 48:
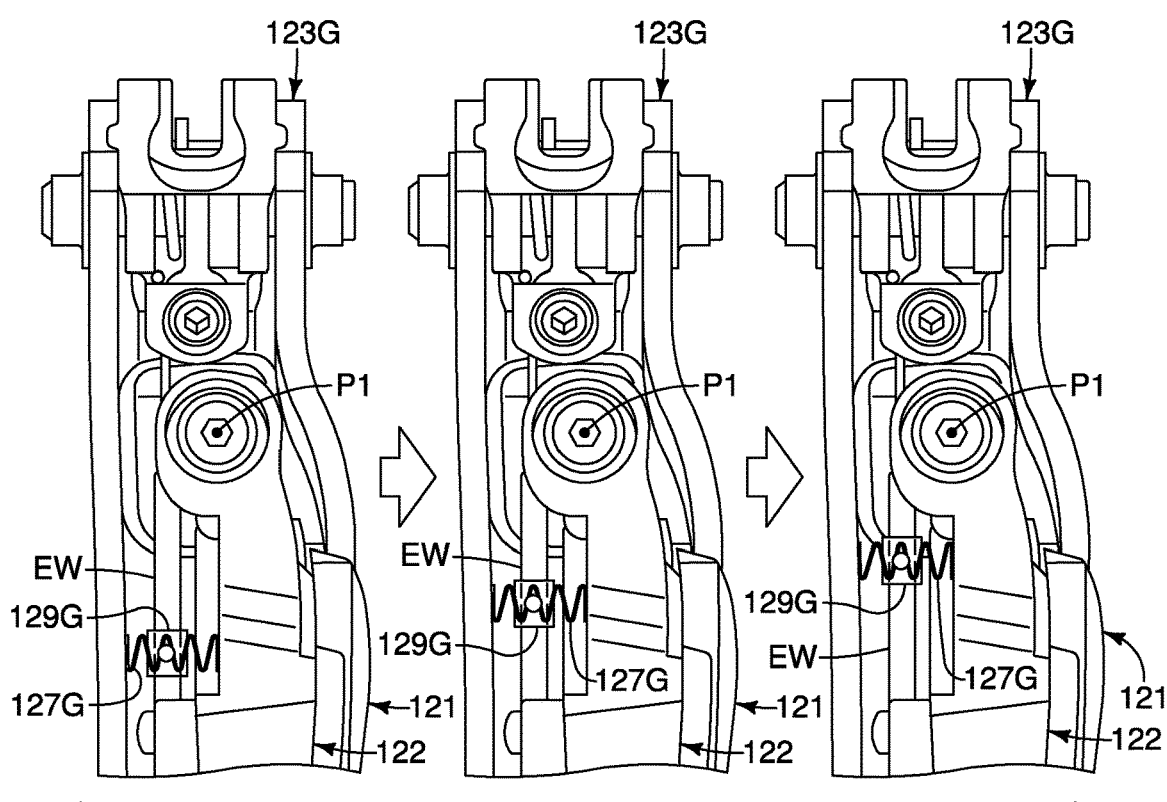
FIG. 48 is a series of partial rear views of a seventh modified operating lever for the operating device illustrated in FIG. 37 showing a modified adjustment of the operating load of the first operating member and the second operating member.

Referring now to FIG. 48, a modified operating member 123G is illustrated for the operating device 110. The operating member 123G includes the first operating member 121, the second operating member 122 and the switch unit SW of the operating device 110. Here, a compression spring 127G (a biasing element) is provided as a load generator that is configured to generate an operating loads applied to the first operating member 121 and the second operating member 122 in substantially the same way as the embodiment of FIGS. 37 to 41. However, here, the compression spring 127G is slidably mounted on an electrical wire EW of the switch unit SW by a mounting collar 129G. The compression spring 127G can be moved to various positions on the electrical wire EW to adjust the operating loads applied to the first operating member 121 and the second operating member 122. Here, the compression spring 127G is slidably attached to the electrical wire EW by friction. In other words, the compression spring 127G is maintained in a selected position by friction between the mounting collar 129G and the electrical wire EW. Accordingly, as illustrated in FIG. 48, the operating load to the first operating member 121 and the second operating member 122 increases by moving from a left side state of the compression spring 127G to a right side state of the compression spring 127G. In other words, as a user moves the compression spring 127G closer to the first pivot axis P1, the operating load provided by the compression spring 127G to the first operating member 121 and the second operating member 122 increases by moving from the left side state of the compression spring 127G to the right side state of the compression spring 127G in FIG. 48.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the operating device. Accordingly, these directional terms, as utilized to describe the operating device should be interpreted relative to a human-powered vehicle (e.g., bicycle) in an upright riding position on a horizontal surface and that is equipped with the operating device. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating device for a human-powered vehicle, the operating device comprising:
    a base;
    a first operating member movably arranged with respect to the base;
    a first electric switch provided to the base and arranged to be activated by movement of the first operating member;
    a first load generator configured to generate an operating load applied to the first operating member; and
    an operating load adjuster configured to adjust a transition of the operating load from a first load transition to a second load transition different from the first load transition.

2. The operating device according to claim 1, wherein the operating load adjuster includes a first cam part that contacts the first load generator and an operating part that protrudes outwardly relative to the first cam part.

3. The operating device according to claim 2, wherein the first cam part is pivotally arranged with respect to the base about a pivot axis between a first orientation that establishes the first load transition and a second orientation that establishes the second load transition.

4. The operating device according to claim 3, wherein the first cam part includes a first contact surface that contacts the first load generator where the first cam part is in the first orientation and a second contact surface that contacts the first load generator where the first cam part is in the second orientation, and
the first contact surface is closer to the pivot axis than the second contact surface.

5. The operating device according to claim 4, wherein each of the first contact surface and the second contact surface includes a flat contact surface that selectively contacts the first load generator.

6. The operating device according to claim 1, wherein the first load generator is provided without applying a biasing force to the first operating member until after the first operating member is operated.

7. The operating device according to claim 1, further comprising
a first biasing member arranged to bias the first operating member towards a non-operated position.

8. The operating device according to claim 1, further comprising
a first clicker movably operatively disposed between the first operating member and the first electric switch and being moved to activate the first electric switch by movement of the first operating member.

9. The operating device according to claim 8, wherein
the first clicker is pivotally mounted relative to the base about a pivot axle,
the first load generator includes a first torsion spring biasing the first clicker away from the first electric switch, and
the first torsion spring has a coiled portion disposed around the pivot axle, a first leg portion contacting the operating load adjuster and a second leg portion contacting the first clicker.

10. The operating device according to claim 9, wherein
the first clicker includes a first recess, and the coiled portion of the first torsion spring is disposed in the first recess of the first clicker.

11. The operating device according to claim 1, further comprising
a second operating member movably arranged with respect to the base;
a second electric switch provided to the base and arranged to be activated by movement of the second operating member; and
a second load generator configured to generate an operating load applied to the second operating member, wherein
the operating load adjuster is configured to adjust a transition of the operating load applied to the second operating member from a third load transition to a fourth load transition different from the third load transition.

12. The operating device according to claim 11, wherein
the operating load adjuster includes a first cam part that contacts the first load generator, a second cam part that contacts the second load generator, and an operating part that protrudes outwardly relative to the first cam part and the second cam part.

13. The operating device according to claim 12, wherein
the first cam part and the second cam part are pivotally arranged with respect to the base about a pivot axis between a first orientation and a second orientation,
the first cam part establishes the first load transition and the second cam part establishes the third load transition where the first cam part and the second cam part are in the first orientation, and
the first cam part establishes the second load transition and the second cam part establishes the fourth load transition where the first cam part and the second cam part are in the second orientation.

14. The operating device according to claim 13, wherein
the first cam part includes a first contact surface that contacts the first load generator where the first cam part is in the first orientation and a second contact surface that contacts the first load generator where the first cam part is in the second orientation,
the second cam part includes a third contact surface that contacts the second load generator where the second cam part is in the first orientation and a fourth contact surface that contacts the second load generator where the second cam part is in the second orientation,
the first contact surface is closer to the pivot axis than the second contact surface, and
the third contact surface is closer to the pivot axis than the fourth contact surface.

15. The operating device according to claim 14, wherein
each of the first contact surface and the second contact surface includes a flat contact surface that selectively contacts the first load generator, and
each of the third contact surface and the fourth contact surface includes a flat contact surface that selectively contacts the second load generator.

16. The operating device according to claim 11, wherein
the first load generator is provided without applying a biasing force to the first operating member until after the first operating member is operated, and
the second load generator is provided without applying a biasing force to the second operating member until after the second operating member is operated.

17. The operating device according to claim 11, further comprising
a first biasing member arranged to bias the first operating member towards a non-operated position, and
a second biasing member arranged to bias the second operating member towards a non-operated position.

18. The operating device according to claim 11, further comprising
a first clicker movably operatively disposed between the first operating member and the first electric switch and being moved to activate the first electric switch by movement of the first operating member, and
a second clicker movably operatively disposed between the second operating member and the second electric switch and being moved to activate the second electric switch by movement of the second operating member.

19. The operating device according to claim 18, wherein
the first clicker and the second clicker are pivotally mounted relative to the base about a pivot axle,
the first load generator includes a first torsion spring biasing the first clicker away from the first electric switch,
the first torsion spring has a coiled portion disposed around the pivot axle, a first leg portion contacting the operating load adjuster and a second leg portion contacting the first clicker,
the second load generator includes a second torsion spring biasing the second clicker away from the second electric switch, and
the second torsion spring has a coiled portion disposed around the pivot axle, a first leg portion contacting the operating load adjuster and a second leg portion contacting the second clicker.

20. The operating device according to claim 19, wherein
the operating load adjuster is disposed between the first torsion spring and the second torsion spring.

21. The operating device according to claim 19, wherein
the first clicker includes a first recess,
the coiled portion of the first torsion spring is disposed in the first recess of the first clicker,
the second clicker includes a second recess, and
the coiled portion of the second torsion spring is disposed in the second recess of the second clicker.

22. The operating device according to claim 11, wherein
the first load generator includes a first torsion spring,
the second load generator includes a second torsion spring, and
each of the first torsion spring and the second torsion spring has a coiled portion supported on a pivot axle coupled to the base.

23. The operating device according to claim 11, wherein
the first operating member includes a first operating lever,
the second operating member includes a second operating lever, and the first operating lever and the second operating lever are pivotally and coaxially mounted to the base.

\* \* \* \* \*